US010835079B2

(12) United States Patent
Wenzel et al.

(10) Patent No.: US 10,835,079 B2
(45) Date of Patent: Nov. 17, 2020

(54) COOKING GRILL RADIANT TRAY

(71) Applicant: Hestan Commercial Corporation, Anaheim, CA (US)

(72) Inventors: Hans F. Wenzel, Santa Ana, CA (US); Chris Moy, Monterey Park, CA (US); Ray Nilssen, Fairhope, AL (US)

(73) Assignee: Hestan Commercial Corporation, Anaheim, CA (US)

( * ) Notice: Subject to any disclaimer, the term of this patent is extended or adjusted under 35 U.S.C. 154(b) by 243 days.

(21) Appl. No.: 16/015,733

(22) Filed: Jun. 22, 2018

(65) Prior Publication Data

US 2018/0296033 A1    Oct. 18, 2018

Related U.S. Application Data

(63) Continuation of application No. PCT/US2016/068531, filed on Dec. 23, 2016.

(Continued)

(51) Int. Cl.
*A47J 37/06* (2006.01)
*A47J 37/07* (2006.01)

(52) U.S. Cl.
CPC ......... *A47J 37/0786* (2013.01); *A47J 37/067* (2013.01); *A47J 37/0635* (2013.01); *A47J 37/0652* (2013.01)

(58) Field of Classification Search
CPC ............... A47J 37/0635; A47J 37/0652; A47J 37/0647; A47J 37/067; A47J 37/0682; A47J 37/0713; A47J 37/0786

(Continued)

(56) References Cited

U.S. PATENT DOCUMENTS 1,969,564 A    8/1934  Klemme
2,278,734 A    4/1942  Perry
(Continued)

FOREIGN PATENT DOCUMENTS

CN    201710185 U    1/2011
FR    2598204 A1    11/1987
GB    2143029 A    1/1985

OTHER PUBLICATIONS

International Search Report issued in connection with PCT/EP2016/068531.

(Continued)

*Primary Examiner* — Reginald Alexander
(74) *Attorney, Agent, or Firm* — Akerman LLP

(57) ABSTRACT

A radiant tray system may be positioned between a burner and a grate of a cooking device. The system may include ceramic tiles and a housing having generally planar walls configured to house the tiles therebetween. The walls receive and grasp tiles between corresponding tile slots through each of the walls and thereby stably position the tile within the tile slots. The walls may also include vent ports for promoting flow of combustion gases through the housing. The housing may be symmetrical with respect to a common reference plane disposed between the walls to support selectively invertable use of the housing. Inversion of the housing after use in one orientation allows drippings to be pyrolized during continued use in the inverted orientation. The pyrolized drippings are readily scrapped or brushed from the walls and tiles.

18 Claims, 34 Drawing Sheets

Related U.S. Application Data

(60) Provisional application No. 62/387,494, filed on Dec. 23, 2015.

(58) Field of Classification Search
USPC ............... 99/401, 446, 447; 126/41 R, 25 R
See application file for complete search history.

(56) References Cited

U.S. PATENT DOCUMENTS

| | | | |
|---|---|---|---|
| 2,457,877 A | 1/1949 | Doner | |
| 2,809,282 A | 10/1957 | Cripe et al. | |
| 3,291,114 A | 12/1966 | Metcalf | |
| 3,692,013 A * | 9/1972 | Grafton | A47J 37/0713 126/41 R |
| 3,899,962 A * | 8/1975 | Federico | A21B 3/13 99/447 |
| 5,121,738 A | 6/1992 | Harris | |
| 5,536,518 A * | 7/1996 | Rummel | A47J 37/041 126/25 R |
| 5,566,607 A * | 10/1996 | Schleimer | A47J 37/0704 126/25 R |
| 5,638,743 A * | 6/1997 | Lo | A47J 37/0763 126/25 R |
| 5,676,045 A | 10/1997 | Faraj | |
| 5,735,260 A | 4/1998 | Rimback | |
| 6,079,320 A | 6/2000 | Taber et al. | |
| 6,935,327 B1 | 8/2005 | Williams et al. | |
| 8,662,068 B2 | 3/2014 | Ahmed | |
| 10,271,687 B2 | 4/2019 | Wenzel et al. | |
| 2010/0027253 A1 | 2/2010 | Home | |
| 2011/0056477 A1 | 3/2011 | Leavens | |
| 2015/0223639 A1 | 8/2015 | Hou et al. | |
| 2018/0296030 A1 | 10/2018 | Wenzel et al. | |
| 2018/0296032 A1 | 10/2018 | Wenzel et al. | |
| 2018/0303286 A1 | 10/2018 | Wenzel et al. | |
| 2019/0000268 A1 | 1/2019 | Wenzel et al. | |
| 2020/0046166 A1 | 2/2020 | Wenzel et al. | |

OTHER PUBLICATIONS

Written Opinion of the International Searching Authority issued in connection with PCT/EP2016/068531.
Canadian Intellectual Property Office, "Office Action," issued for Canadian Patent Application No. 3010662, dated May 2, 2019; document of 4 pages.

* cited by examiner

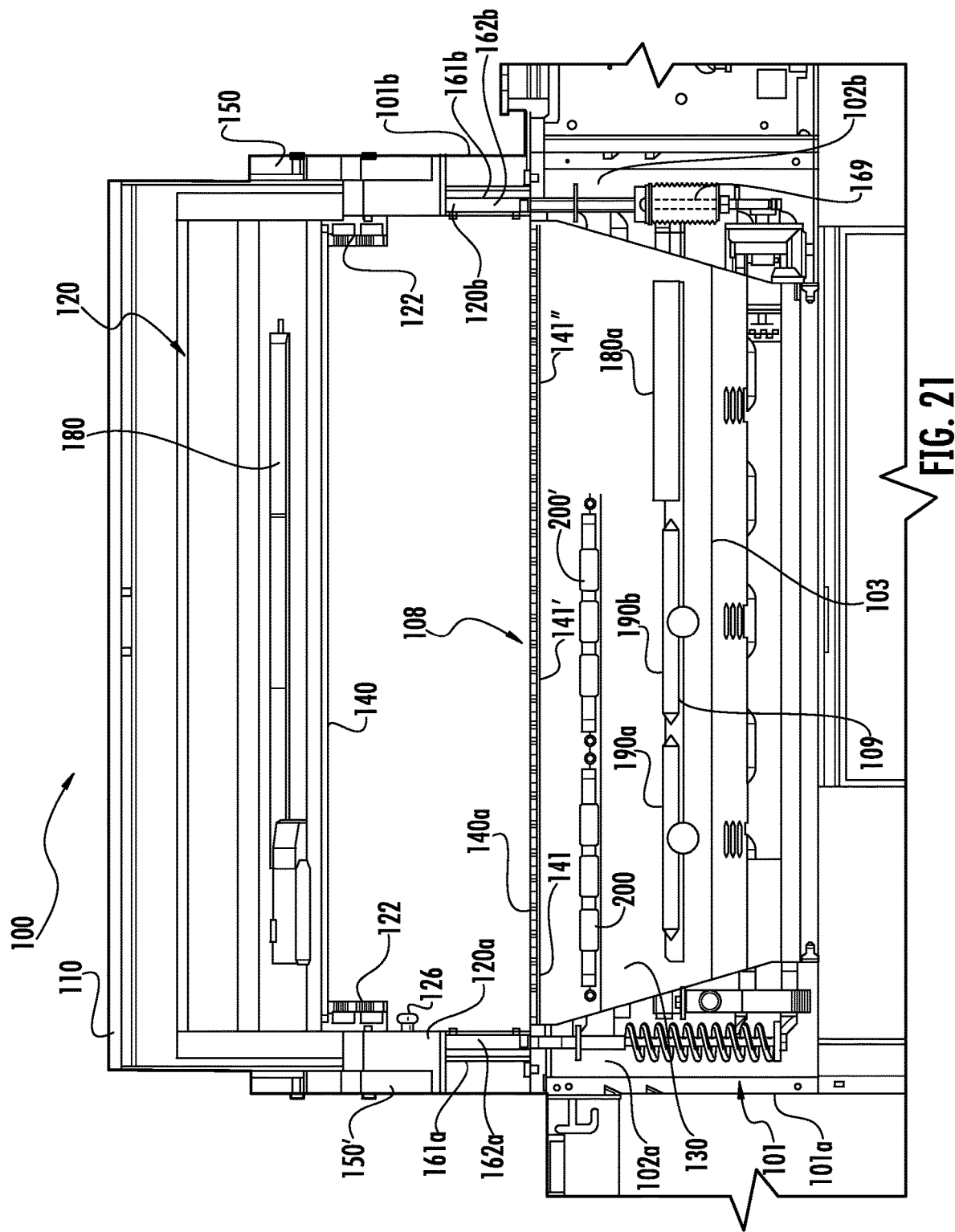

COOKING GRILL RADIANT TRAY

CROSS-REFERENCE TO RELATED APPLICATIONS

This patent application is continuation under 35 U.S.C. § 111(a) of International Application No. PCT/US2016/068531, filed Dec. 23, 2016. International Application No. PCT/US2016/068531 claims the benefit of the filing date under 35 U.S.C. § 119(e) of U.S. Provisional Patent Application No. 62/387,494, filed Dec. 23, 2015, the contents of both of which are hereby incorporated by reference into this specification.

TECHNOLOGY

The present application relates to cooking grills in which flames are used to heat a tray, which in-turn radiates the heat to food, and more particularly to such trays and components thereof.

BACKGROUND

Cooking grills, such as BBQ grills, generally deploy a firebox enclosure in which to combust fuel. A grate is positioned over the firebox to support food to be heated with the energy generated from the combusted fuel. The fuel can be wood, pellets, charcoal, but may also be natural gas or liquid propane that is fed into a lower portion of the firebox via a gas manifold. The firebox and grate may be covered with a cover or hood to conserve heat. Grills may also incorporate ceramic cones or briquettes between the location of combustion and the grate. The briquettes are typically supported by a tray directly exposed to the flames, although not necessarily in continuous contact with the flames. As the briquettes are heated, the briquettes radiate a portion of the heat toward the grate to thereby heat foods supported on the grate.

SUMMARY

In one aspect, a radiant tray system for positioning between a burner and a grate of a cooking device includes a plurality of ceramic tiles and a housing. The housing may have a generally planar first wall and a generally planar second wall and be configured to house the tiles therebetween. A plurality of corresponding tile slots may extend through the first wall and the second wall. Each pair of corresponding tile slots may be configured to cooperatively grasp a tile between the walls and thereby stably position the tile such that at least a first portion of a first end of the tile is exposed through one of the corresponding tile slots and at least a first portion of a second end of the tile is exposed through the other. A plurality of vent ports may also extend through the first and second walls. The housing may be symmetrical with respect to a common reference plane disposed between the first and second wall to support selectively invertable use of the housing.

In one configuration, the housing may include a first platen comprising the first wall and a second platen comprising the second wall. The first platen and the second platen may be attachable along flanges to engage the tiles and form the housing. According to one configuration, at least the first end or the second end of the tiles have a plurality of arcuate convex dimples disposed along a surface thereof.

In various configurations, when the housing is inverted, the tile slots through the first wall position at same relative locations as the tile slots through the second wall prior to inversion and the tile slots through the second wall position at same relative locations as the tile slots through the first wall prior to inversion. The first wall and the second wall may be configured to have lateral and longitudinal reflectional symmetry with respect to the position of the tile slots. The first portions of the first and second ends of the tiles may protrude outward of the corresponding tile slots beyond the first and second walls when grasped by the corresponding tile slots. The tiles may have a generally planar body.

In further or additional configurations, the first and second ends of the tiles are generally planar and, when grasped by the corresponding tile slots, the first and second generally planar ends position generally parallel to the first wall and second wall. A recessed ledge may extend around a perimeter of each of the first and second ends to engage respective edges of the corresponding tile slots. A chamfer may extend around a second perimeter of each of the first and second ends, outward of the recessed ledges. In one arrangement, at least the first end or the second end of the tiles have a plurality of arcuate convex dimples disposed thereon. Corresponding tile slots may be aligned along their respective edges. Tiles may define a quadrilateral cross-section.

In further or additional configurations, when grasped by respective corresponding tile slots, a central axis of each tile positions at an oblique angle with respect to the common reference plane. A second portion of the first end of the tile may be exposed through and protrude outward from the tile slot through the second wall. A second portion of the second end of the tile may be exposed through and protrude outward of the tile slot through the first wall. In one configuration, the housing comprises a first platen including the first wall and a second platen comprising the second wall. The first platen and the second platen may be configured to be attached along flanges to engage the tiles therebetween. The housing may include one or more spacing rods positioned between the first and second platens. In one configuration, a first lateral ridge extends across the first ends and a second lateral ridge extends across the second ends of the tiles. A first side of the first lateral ridge may be positioned to engage an edge of the tile slot of the first wall, and a first side of the second lateral ridge may be positioned to engage an edge of the tile slot of the second wall to position the tile at the oblique angle in a first orientation. A second side of the first lateral ridge may be positioned to engage the edge of the tile slot of the first wall, and a second side of the second lateral ridge may be positioned to engage the edge of the tile slot of the second wall to position the tile at the oblique angle in a second orientation. In one configuration, the tiles define round cross-sections.

In another aspect, a ceramic tile for a radiant tray includes a generally planar body having a first generally planar end and a second generally planar end. A plurality of arcuate convex dimples may be disposed on a surface of each of the first and second ends. A ledge may extend around a perimeter of each of the surfaces, and each of the ledges may be recessed relative to the respective surface and positioned to engage edges of a tile slot of a radiant tray. A chamfer may extend around a perimeter of the ledge along each end.

In yet another aspect, a ceramic tile for a radiant tray includes a generally planar body having a first end comprising a generally planar first surface and a second end comprising a generally planar second surface. The first surface and the second surface may extend along generally parallel planes. A first lateral ridge may be disposed along the first surface and include a face extending from the first surface at an oblique angle and generally facing a first direction. A second lateral ridge may be disposed along the second surface and include a face extending from the second surface at an oblique angle and generally facing a second direction, opposite the first, and extending along a plane parallel to a plane the face of the second lateral ridge extends.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIGS. 1A-1E illustrate various views of a cooking grill according to various embodiments, wherein FIG. 1A is a perspective view, FIG. 1B is a cross-sectional perspective view taken along plane 1B-1B in FIG. 1A, FIG. 1C is a cross-sectional perspective view taken along plane 1C-1C in FIG. 1A, FIG. 1D is an elevated front view of the cross-section shown in FIG. 1B, and FIG. 1E is a cross-sectional elevated side view taken along plane 1E-1E in FIG. 1A;

FIGS. 9A-9G illustrate the sequential pivoting of a hood, wherein FIG. 9A shows the hood in a closed position, FIGS. 9B-9E show the hood in partially open positions, and FIG. 9G shows the hood in a completely open position;

FIGS. 11A-11D illustrate various views of a radiant tray according to various embodiments, wherein FIG. 11A is a first end view, FIG. 11B is a second end view, FIG. 11C is a side view, and FIG. 11D is an exploded perspective view;

FIGS. 14A & 14B illustrate various views of a tile according to various embodiments, wherein FIG. 14A is an end view and FIG. 14B is a perspective view;

FIGS. 15A & 15B illustrate various views of a radiant tray according to various embodiments, wherein FIG. 15A is an end view, FIG. 15B is a side view.

FIG. 18B is an end view.

FIG. 21 is a cross-sectional elevated side view of a grill taken along plane 1E-1E in FIG. 1A showing a modular configuration wherein a burner modular assembly and radiant tray have been.

DESCRIPTION

Figure 1A:
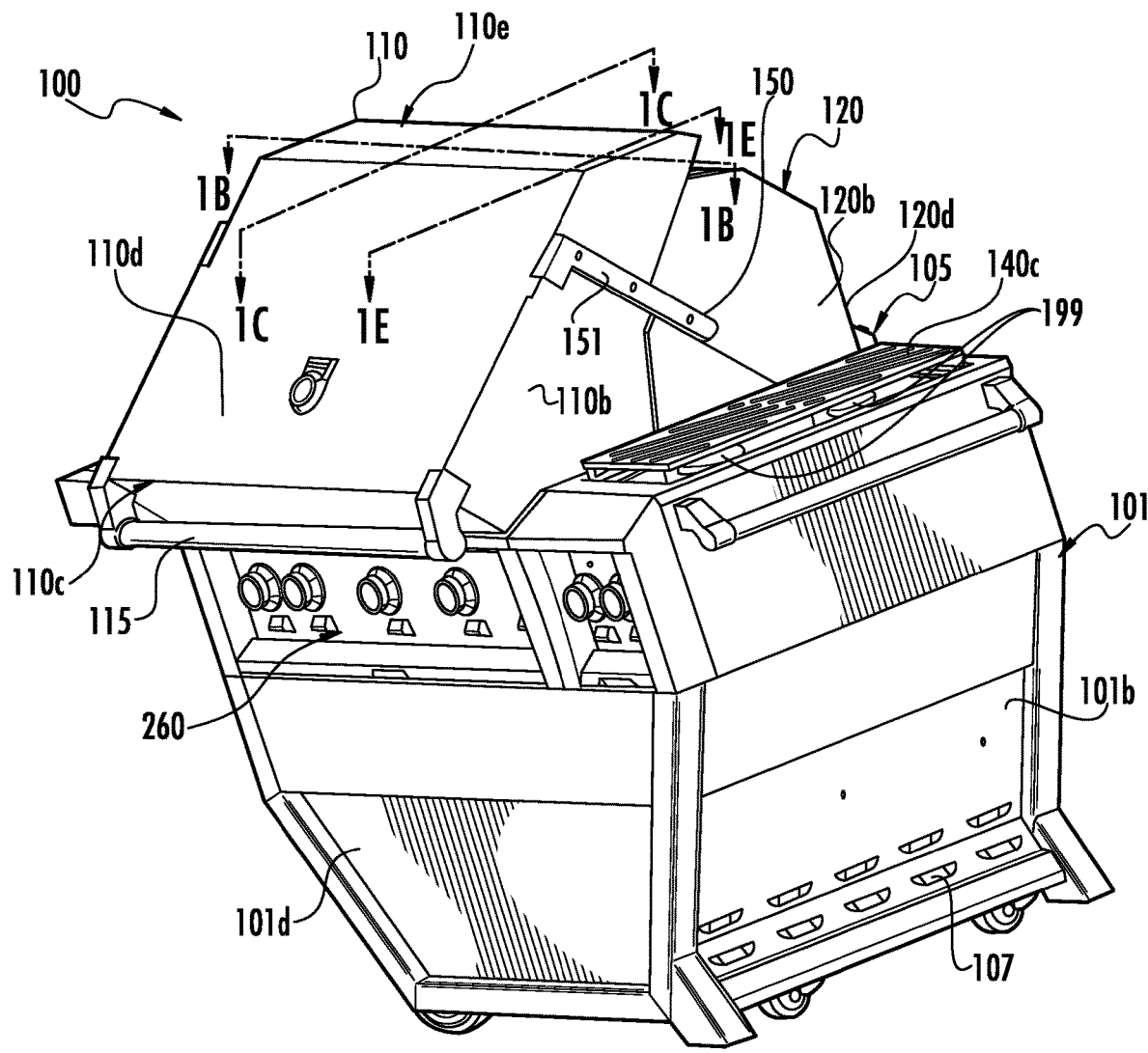

Controlling temperature of a cooking grill may be performed by manipulating a gas valve to adjust gas flow to a manifold or burner. However, it may be desirable to cook with a hood that is partly open to vary air flow and exhaust and to further improve temperature control for grilling. Prior methods of maintaining a hood in an open position include utilizing brackets inserted between an upper rim of a firebox and a lower rim of a hood. However, such brackets may be lost, damaged, or may become hot and pose a safety hazard to users. In one aspect, the present disclosure describes methods and apparatus for maintaining a grill hood in a partly open position without the need for a separate bracket or spacer between the grill hood and the firebox rim.

When cooking in dark environments or when cooking with a partially open hood, it may be desirable to provide light onto the food supporting region 108. According to various embodiments, the present disclosure provides methods and apparatus for providing light onto a cooking surface when a grill hood is pivoted or at a partially open position.

According to various embodiments, the present disclosure further describes cooking grills and methods thereof for improved heat distribution to food from below the food support grate/surface as well as from above.

The various improved cooking devices, features, and methods are described herein with reference to FIGS. 1A-22B, wherein like reference numerals refer to like components in the various views.

A cooking device, generally depicted as grill 100, may be generally intended for outdoor use; however, grill 100 and one or more of its accompanying features may be similarly applied to other cooking devices or appliances generally intended for indoor use. Indeed, upon reading the present disclosure, those having skill in the art will appreciate that the various features described herein, with reference to the drawings, may be applied singly or in combination. Thus, particular features disclosed herein are not to be construed as being necessary or required with respect to other disclosed features or combinations of features unless indicated otherwise or necessarily flowing therefrom.

Figure 1B:
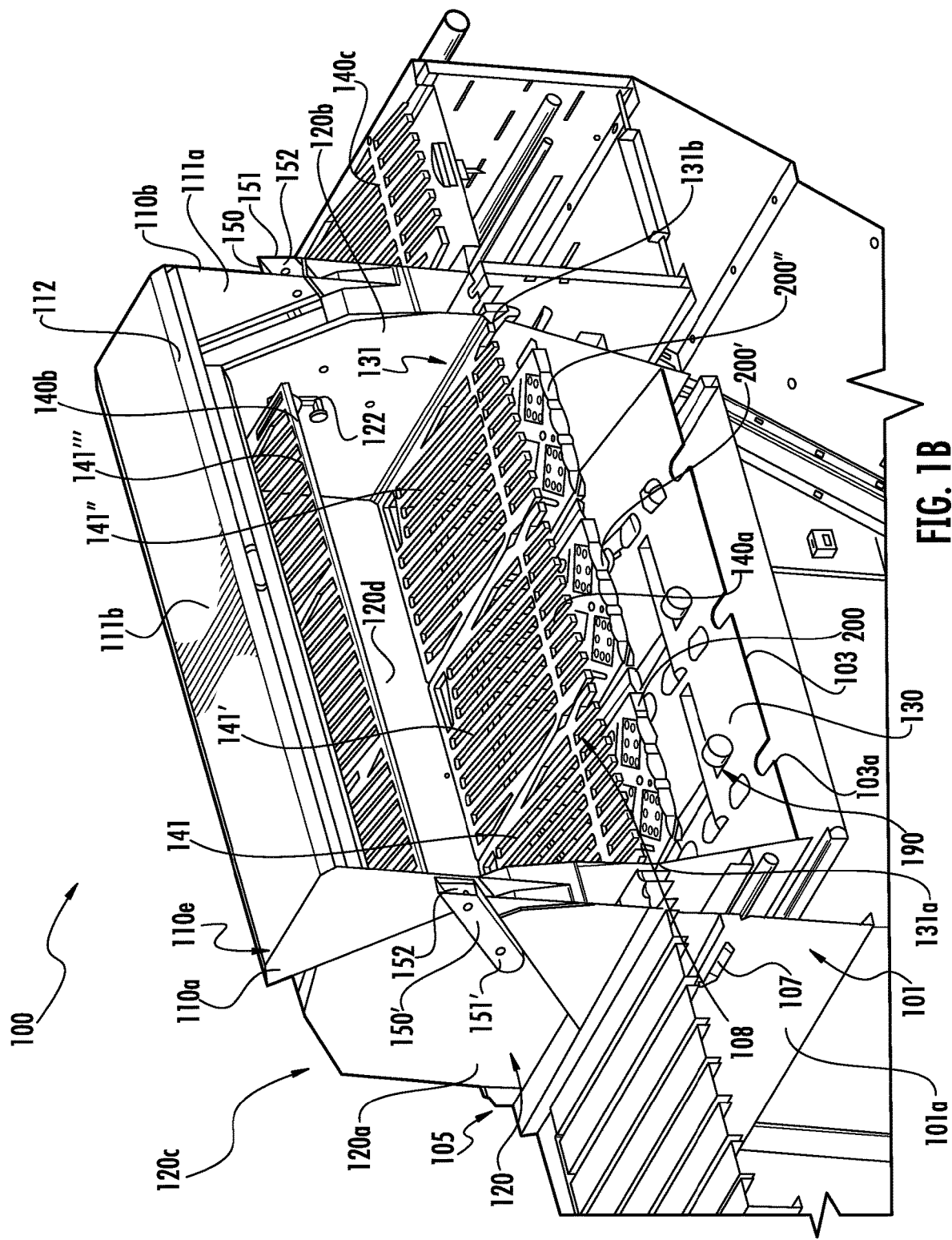
Figure 1C:
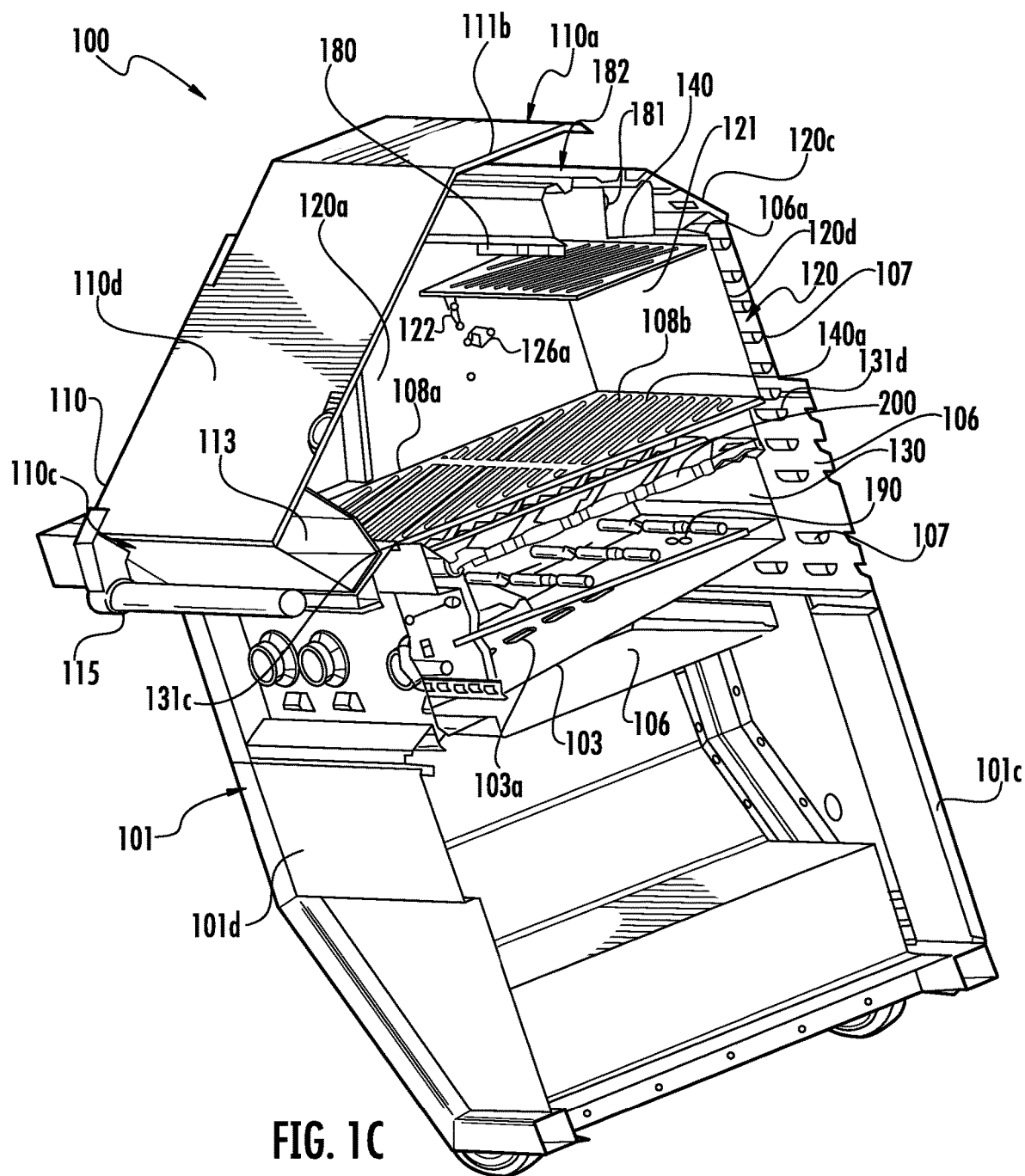
Figure 1D:
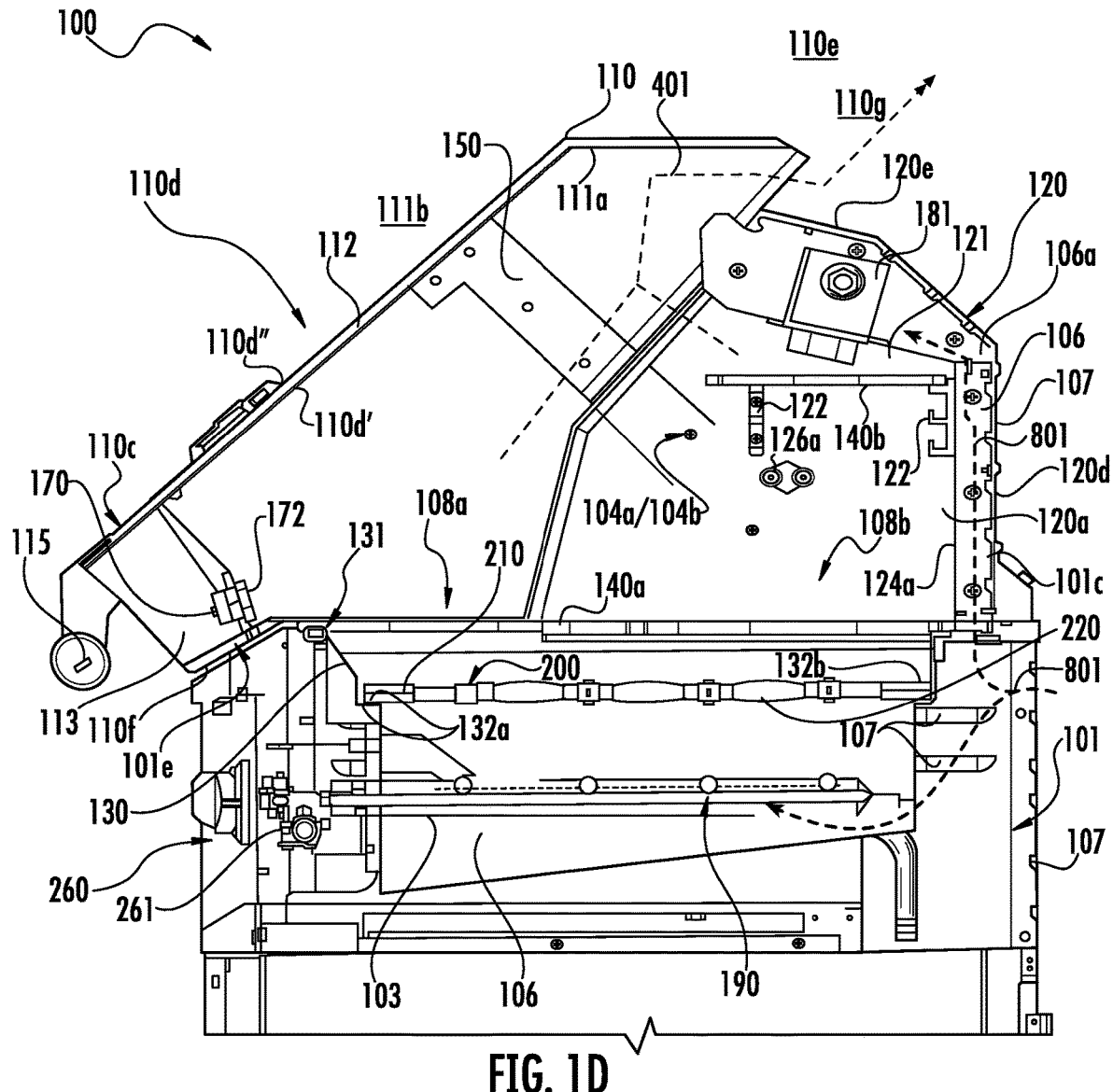
Figure 1E:
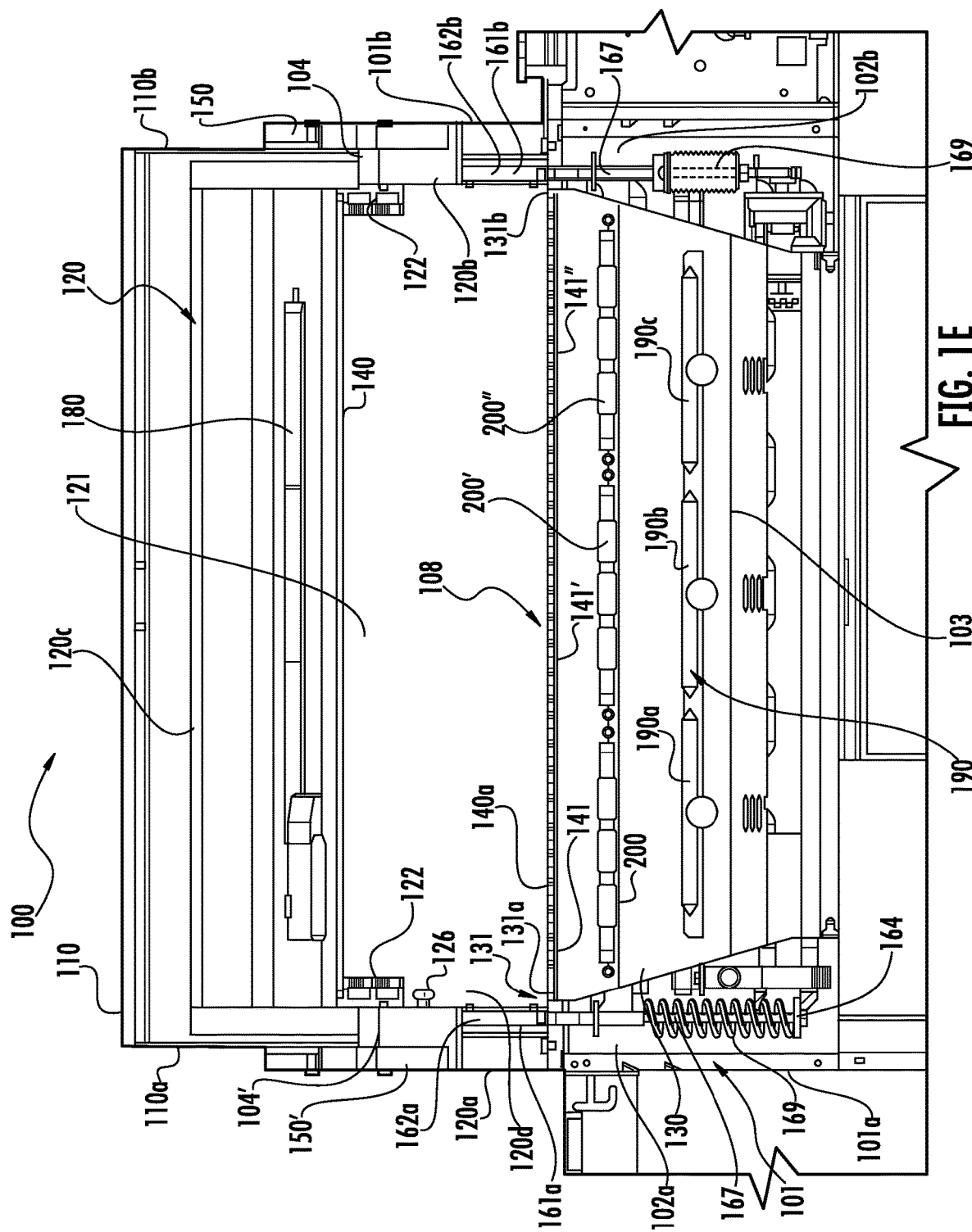
Figure 2:
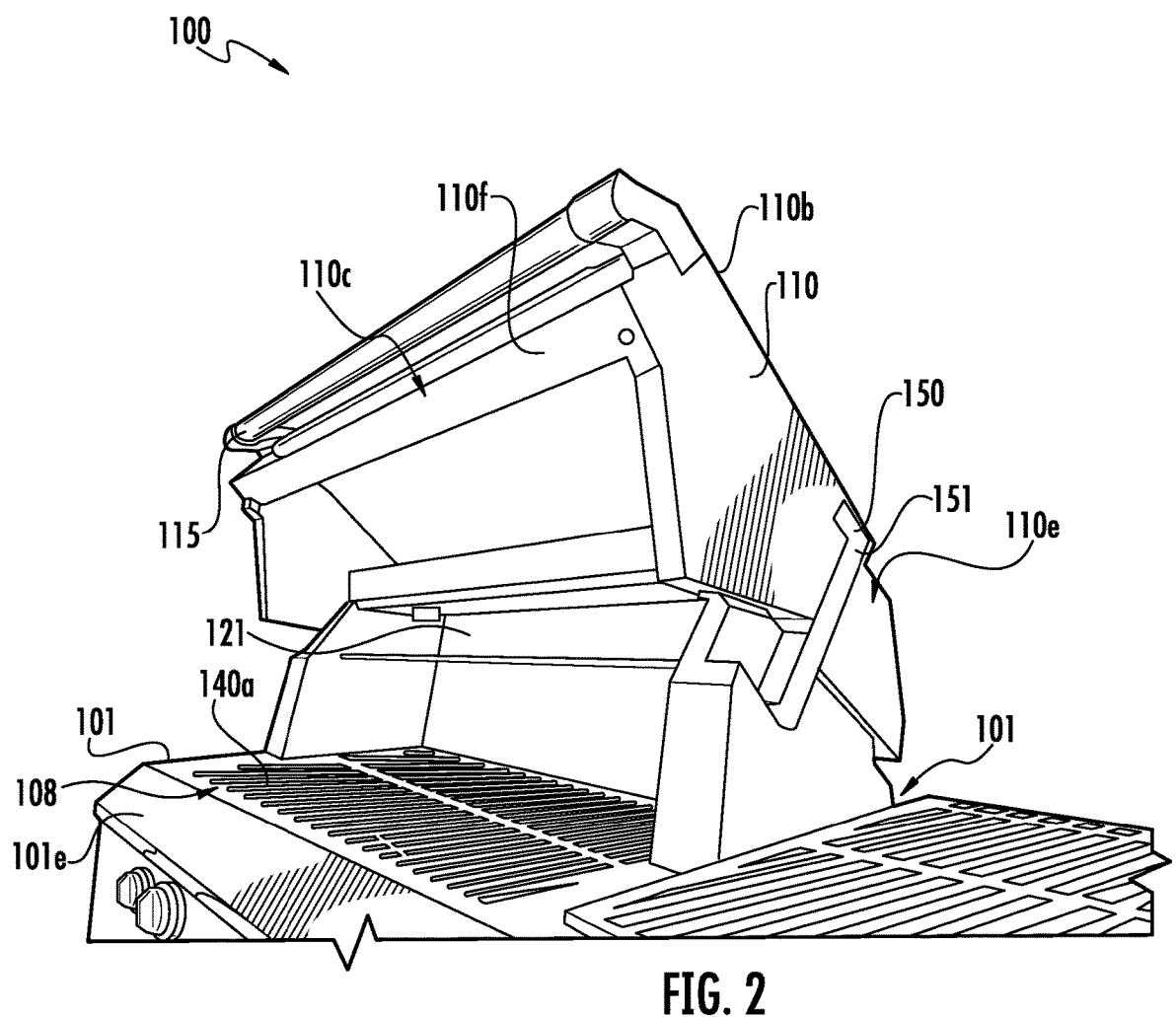
FIG. 2 is a perspective view of the grill shown in FIGS. 1A-1E with the hood in an open position showing the lights illuminating the food supporting region 108.

With particular reference to FIGS. 1A-2, grill 100 includes a grill body 101. The grill body 101 includes a firebox 130 dimensioned to house a gas burner assembly 190 comprising one or more modular gas burner manifolds 190a, 190b, 190c for combusting a gas fuel and therein generate heat for cooking. Firebox 130 is further dimensioned to receive a food support grate 140a. For example, upper rim 131 is adapted to support a food support grate 140a along a lateral plane that defines a food supporting region 108 above the firebox 130 between left 131a, right 131b, forward 131c, and rear 131d edges of the upper rim 131. The upper rim 131 may include lips, ledges, or other structures to support grates 140a along one or more of the edges 131a, 131b, 131c, 131d. A user of grill 100 may interface with controls provided at user interface 260 to ignite combustible gas, modify gas flow provided to the burner assembly 190, or gas burner manifolds 190a, 190b, 190c thereof, via gas valves 261, or to perform other operations.

In various embodiments, grill 100 may include or be adapted to receive a food support grate 140a, which may include one or more removable food support modules 141. For example, as indicated in FIG. 1B, food support grate 140a may include one or more removable food support modules 141, 141', 141". Grill 100 may also include an upper food support grate 140b, which may also have one or more removable food support modules 141'". The upper food support grate 140b may be positionable above a rear portion of food support grate 140a corresponding to a rear portion 108a of the food support region 108. In the illustrated embodiment, grill 100 also includes accessory burners 199 and accessory food support grate 140c defining a separate food supporting region adjacent to firebox 130.

Grill 100 further includes a hood 110 pivotably mounted to grill body 101 along left side 101a, right side 101b, or both about at least one pivot 104, 104' (see, e.g., FIG. 1E). Hood 110 includes a handle 115 that may be grasped by an operator to pivot hood 110 about pivot 104, 104' between a closed position, as shown in FIGS. 1A-1E, and one or more open positions as shown in FIG. 2, for example. FIGS. 9A-9G further illustrate an opening sequence from a closed position (FIG. 9A) to open positions (FIGS. 9B-9G). Hood 110 may be pivotable over portions of firebox 130 and rear housing 120 to expose forward and rear portions 108a, 108b of the food supporting region 108.

One or more hinge arms 150, 150' may mount hood 110 at pivot 104, 104'. As shown in FIGS. 1A-1E, an arm 150, 150' is provided on each of the left side 110a and right side 110b of hood 110 and therealong pivotably connect to grill body 101 along respective left and right sides 120a, 120b of rear housing 120. In particular, hood 110 mounts to grill body 101 at one or more frame members 161a, 161b. Other stable locations may be used such as to rear housing 120 or another location, which may or may not be attached to rear housing 120. As described in more detail below, hood 110 may be configured with a counterbalance mechanism 160 (see, e.g., FIG. 4) that balances the center of gravity (COG) of hood 110 through all or a portion of its range of motion about pivot 104, 104'.

Firebox 130 may optionally be adapted to receive a radiant tray 200. Radiant tray 200 may be positioned within firebox 130 between the gas burner assembly 190 and food support grate 140a. As shown, firebox 130 includes forward and rear ledges 132a, 132b (FIG. 1D) onto which radiant tray 200 may be positioned. Combustion of the gas at gas burner manifolds 190a, 190b, 190c generates flames and heat below radiant tray 200 that heat radiant tray 200, including radiant materials housed in radiant tray 200. The heated radiant materials then radiate the heat toward the food support grate 140a. In this way, radiant tray 200 may radiate more uniform heat along the food support grate 140a than it receives from the flames and hot combustion gases.

Incorporation of radiant tray 200 may also protect the gas burner assembly 190 from grease and other food debris that fall into firebox 130.

Grill 100 may also be fitted with a rear housing 120 that extends around a rear portion of firebox 130 and food support grate 140. In some embodiments, rear housing 120 may further include rear cover 120c that extends above the rear portion 108b of the food supporting region 108, over firebox 130, food support grate 140a, and upper food support grate 140b, e.g., as shown in FIGS. 1A-2. However, in some configurations, rear housing 120 may not include rear cover 120c or may extend more or less forward than illustrated.

Rear housing 120 may also be adapted to support the upper food support grate 140b or modules 141'" thereof. For example, as shown in FIG. 1D, mounts 122 for supporting a food support module 141'" of the upper food support grate 140b are disposed along the interior side 124a of rear wall 120d and sides 120a, 120b of rear housing 120. Mounts 122 may be structured to engage upper food support grate 140b via one or more brackets, slots, latches, hooks, grooves, compression fitments, clamps, welds, or other suitable arrangement to support the upper grate 140b. Mounts 122 may also be structured to support the upper food support grate 140b at a variety of heights. For example, as shown in FIGS. 1B & 1D, mounts 122 may include three levels of mounting hooks along rear wall 120d and sides 120a, 120b. In another example, mounts 122 are selectively adjustable by vertically sliding mounts 122 along tracks. In still another example, mounts 122 may include slots through which upper grate 140b may vertically slide along when a forward edge of the grate 140b is tilted above the horizontal and remain at a selected height along the slot when returned to the horizontal. Thus, in various embodiments, a user may insert upper grate 140b in upper portion 121 at a desired distance from the IR burner 180, when so equipped.

In various embodiments, grill 100 may be equipped for rotisserie cooking. As most clearly depicted in FIGS. 1C, 1D, 3, & 4, rotary receiving hubs 126a, 126b for a rotisserie spit may be positioned along sides 120a, 120b of rear housing 120. One or more spits (not shown) may be selectively connected to and between hubs 126a, 126b and thereon rotated.

Figure 3:
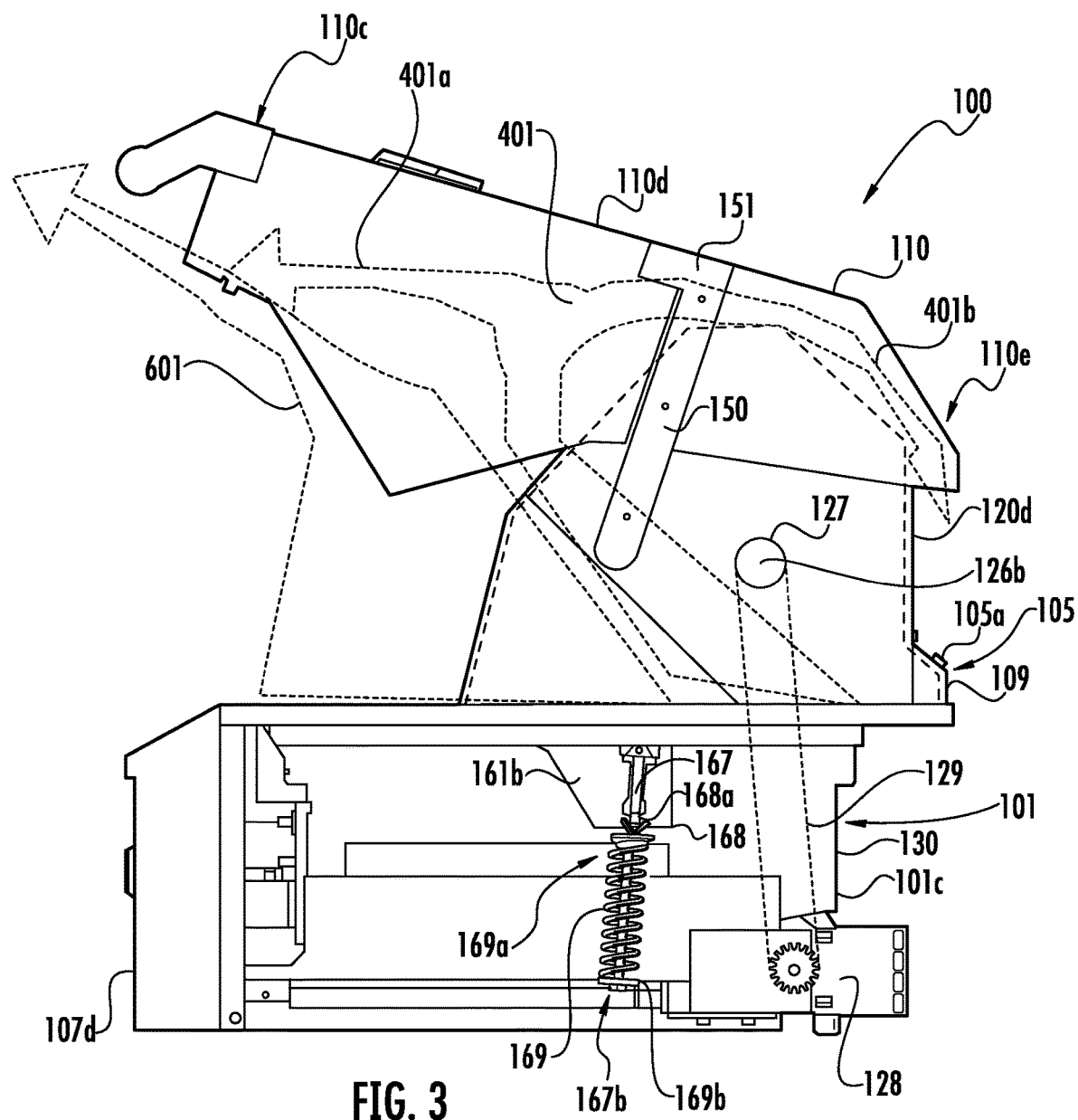
FIG. 3 is a partially cutaway side elevation view with hood partially open showing flows of hot combustion from the firebox and IR burner.
Figure 4:
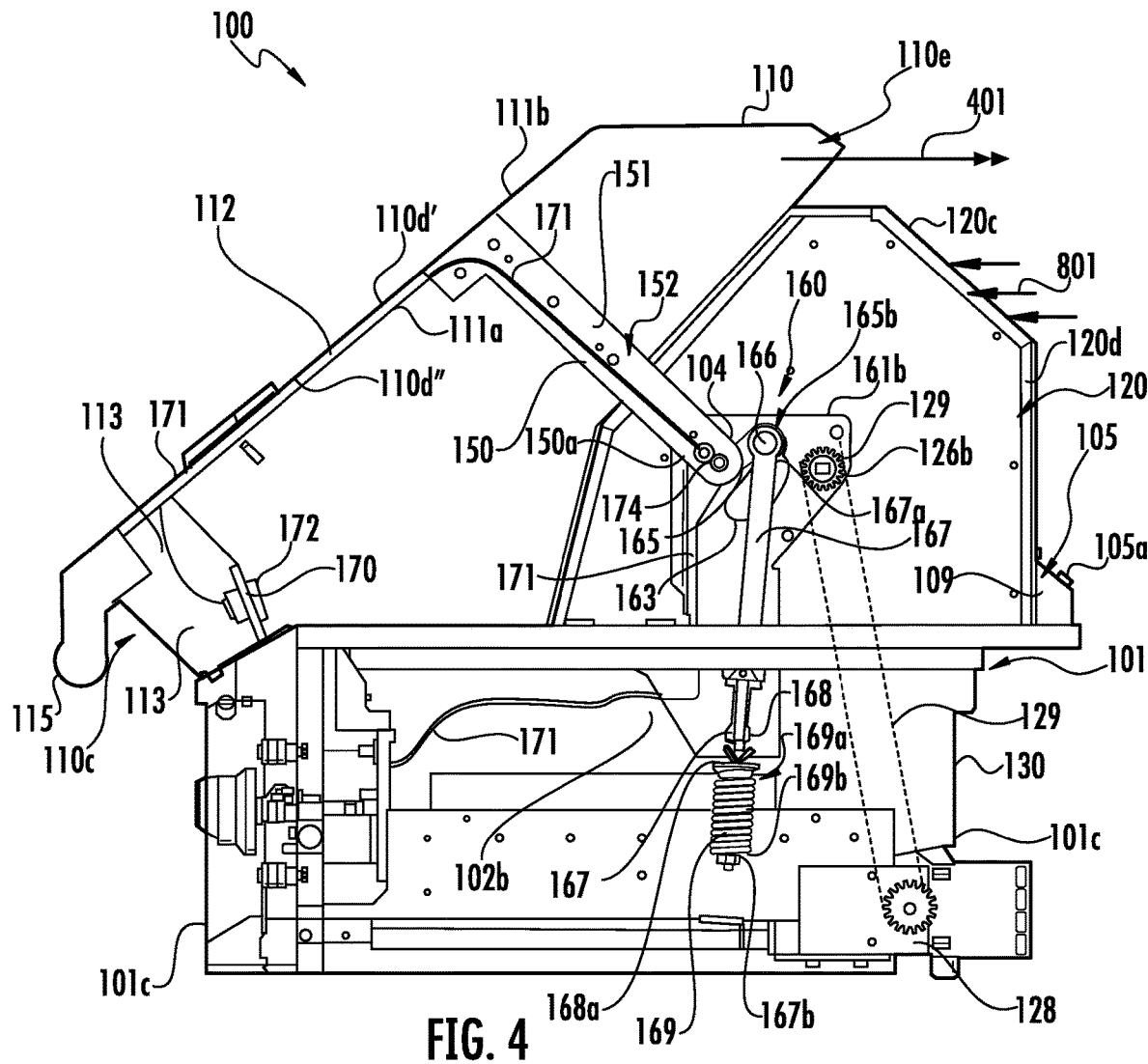
FIG. 4 is another partial cutaway side elevation view showing various aspects of the counterbalance mechanism disposed in a cavity in the side of the grill body.

With reference to hubs 126a, 126b may be rotatably mounted to frame members 161a, 161b positioned along sides 110a, 110b of grill 100. FIGS. 3 & 4 illustrate the operation of left hub 126b; however, grill 100 may include similar or different structures with respect to the operation of right hub 126a. For example, one or both of the hubs 126a, 126b may be rotationally fixed relative to a gear or sprocket 127. In the illustrated embodiment, a chain 129 engages sprocket 127 and a drive motor 128 to couple the output of drive motor 128 to the sprocket 127, which in-turn couples the rotation to hub 126b. Sprocket 127 is also positioned within an interior cavity 162 (FIG. 6) of frame member 161a. Hub 126a may similarly be rotationally fixed relative to another sprocket 127 along side 120a, which may be engaged by another chain 129 coupled to the output of drive motor 128 or another drive motor 128. In one embodiment, a single drive motor 128 may drive one of the hubs 126a, 126b and the other hub 126a, 126b may freely rotate and be coupleable to the rotation of the other hub 126a, 126b by when connected by a spit extending between the two.

As introduced above, grill 100 may include one or more infrared (IR) burners 180 positioned to heat food within the cooking area. IR burners 180 may be in addition to or instead of gas burners of gas burner assembly 190 located in the firebox 130. For example, in one embodiment, grill 100 may include a lower IR burner (see, e.g., IR burner 180*a* FIG. 21) positionable within firebox 130. Grill 100 may further include gas burner assembly 190 where the assembly 190 or manifolds 190*a*, 190*b*, 190*c* thereof may be selectively removed and replaced with the lower IR burner to perform high heat tasks such as searing. In another example, grill 100 does not include a gas burner assembly 190.

In embodiments, including both a gas burner assembly 190 and an IR burner 180, the IR burner 180 may be operable to heat or cook food alone or in combination with heat emitted from the gas burner assembly 190. For example, as most clearly shown in FIGS. 1C & 1D, grill 100 includes an IR burner 180 positioned within an IR burner housing 181 mounted within upper portion 121 of the rear housing 120. IR burner 180 is shown mounted to sides 120*a*, 120*b* of rear housing 120; however, IR burner 180 may be mounted otherwise, e.g., to rear cover 120*c*. IR burner 180 faces downward toward the rear portion 108*b* of the food supporting region 108 to heat food supported on the upper food support grate 140*b* or food support grate 140*a*. In embodiments including a rotisserie spit, IR burner 180 may be used to heat food positioned on the spit.

In various embodiments, IR burner 180 may be positioned at a downward tilt angle between approximately 0 degrees and approximately 30 degrees from vertical. Unless indicated otherwise, identified measurements modified by "approximately" mean the identified measurement or +/−5% of the measurement and is in no way intended to limit available equivalents. The tilt angle may be fixed or may be adjustable. For example, IR burner 180 may be adjustably mounted to rear housing 120 such that its tilt angle may be selectively adjusted within a predefined range, such as between 0 degrees and 30 degrees from vertical in the forward direction, rearward direction, or both, such as from 0 degrees to approximately 15 or 12 degrees forward downward tilt. For example, the IR burner 180 shown in FIG. 1D is positioned at a downward tilt angle of approximately 12 degrees forward. A knob may be provided to allow a user to rotate housing 181 to a desired downward tilt angle. In one embodiment, the housing 181 is operatively coupled to a motor that may be interfaced by a user to adjust the tilt angle. In another embodiment, the downward tilt angle is fixed at approximately 12 degrees (+/−2 degrees) in the forward direction.

IR burner housing 181 may also include a rotisserie storage compartment 182 structured to store a rotisserie spit when not in use. It will be understood, that rotisserie storage compartment 182 may also be suitable for storage of other grill or cooking components, such as kabobs, utensils, etc. In one example, storage compartment 182 may be an open compartment along an exterior side of the housing 181. For example, as most clearly shown in FIG. 1C, the illustrated housing 181 defines a compartment 182 along an upper exterior surface that forms a "V" to store a spit. In this or another embodiment, compartment 182 may include a selectively positionable cover or door to open or close compartment 182 to prevent debris such as grease splatters from entering the compartment 182. Compartment 182 may also include a cavity or structures dimensioned to receive the spit for storage. For example, compartment 182 may include brackets, clamps, hooks, slots, compression fitments, or other suitable structures to retain the spit.

As described in more detail below, grill 100 may be configured to vent combustion gases in a manner that avoids interferences with the operation of IR burner 180. Combustion at IR burners may be limited due to unavailability of air flow along one or more sides. Accordingly, in various embodiments, grill 100 is configured to mount IR burner 180 within the upper portion 121 of the rear housing 120 such that IR burner is open on at least three sides to allow ample air flow to support combustion. Open may include all or a portion of the length of a side that is spaced apart from structures impeding access of combustion supporting air flows to the combustion area of the IR burner 180. For example, the forward side of the IR burner 180 is most open while the rear side is also open, but to a lesser extent. The upper side being spaced apart from the rear cover 120*c* is also open such that air flow 801 (FIG. 4) may flow along the rear cover 120*c* to access the combustion area of the IR burner 180. IR burner 180 may extend entirely or partially across the width of the cooking area. In the illustrated embodiment, IR burner 180 mounts to rear cover 120*c* and is spaced apart from sidewalls 120*a*, 120*b*. IR burner 180 extends about 70% to 80% of the width of the cooking area. Accordingly, right and left sides of IR burner 180 are also open.

Hood 110 and rear housing 120 may further be structured to provide exhaust of combustion gases when hood 110 is in the closed position and open positions. For example, with reference to FIGS. 1C, 3, & 4, hood 110 is pivotable with respect to rear housing 120 such that adequate exhaust and venting is provided over a wide range of open positions. These paths are illustrated by arrows 401 (FIGS. 1C & 4) when hood 110 is in the closed position and also arrow 601 when hood 110 is in an open position (FIG. 3). As hood 110 is opening, the flow of hot air and combustion gases initially exit in direction of arrow 401, then being split toward arrow 601, as shown in FIG. 3.

Figure 9A:
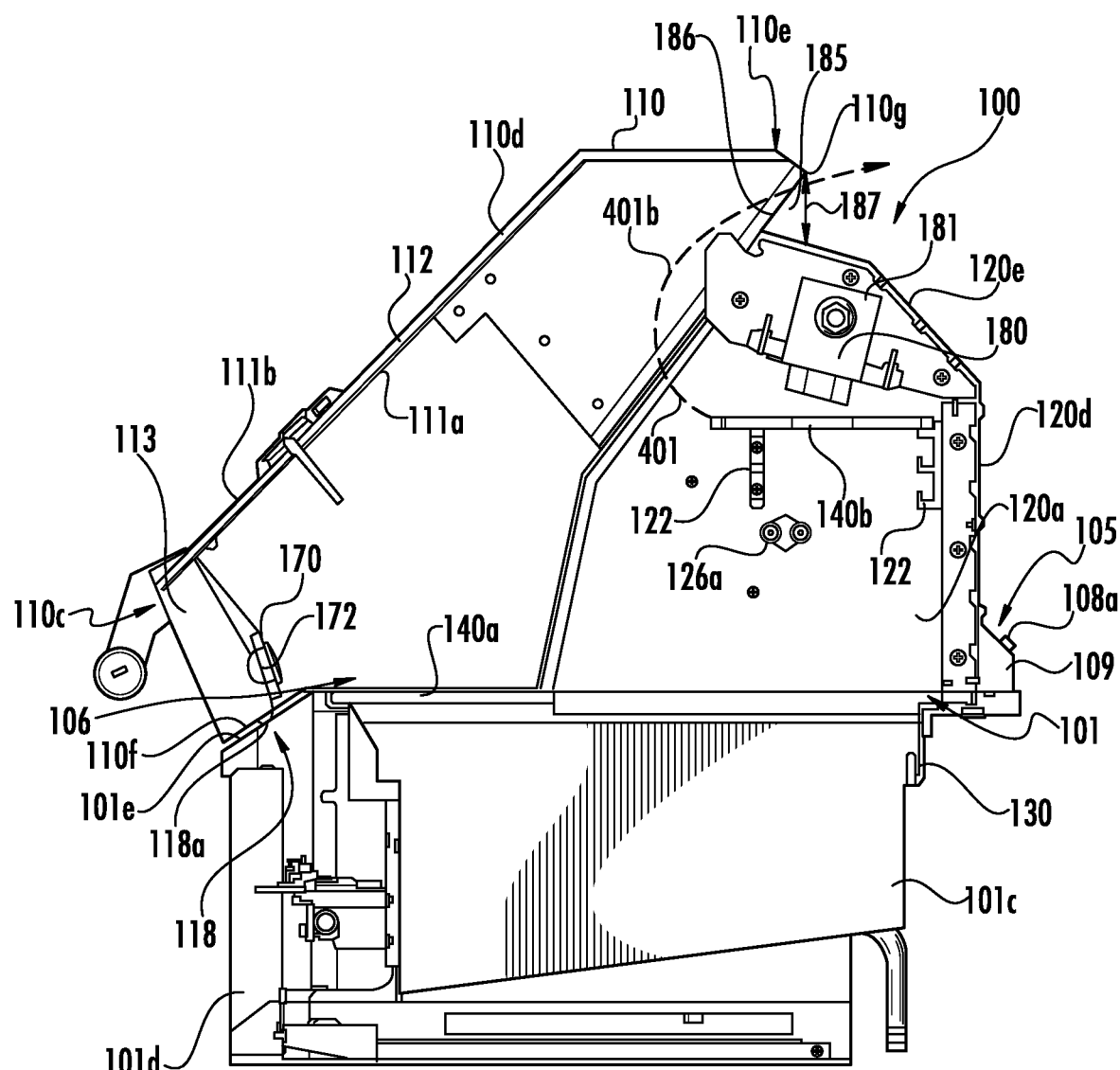
Figure 9B:
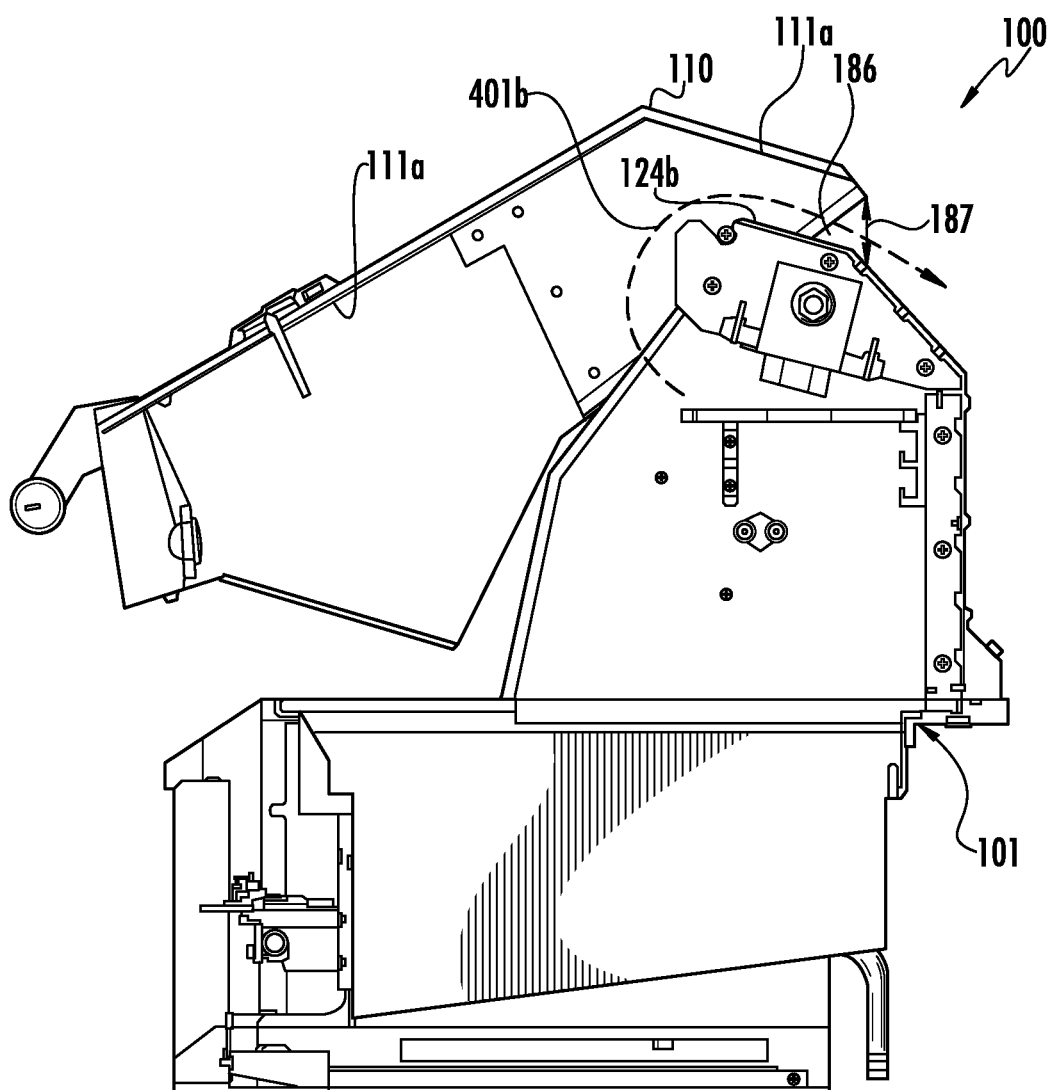
Figure 9C:
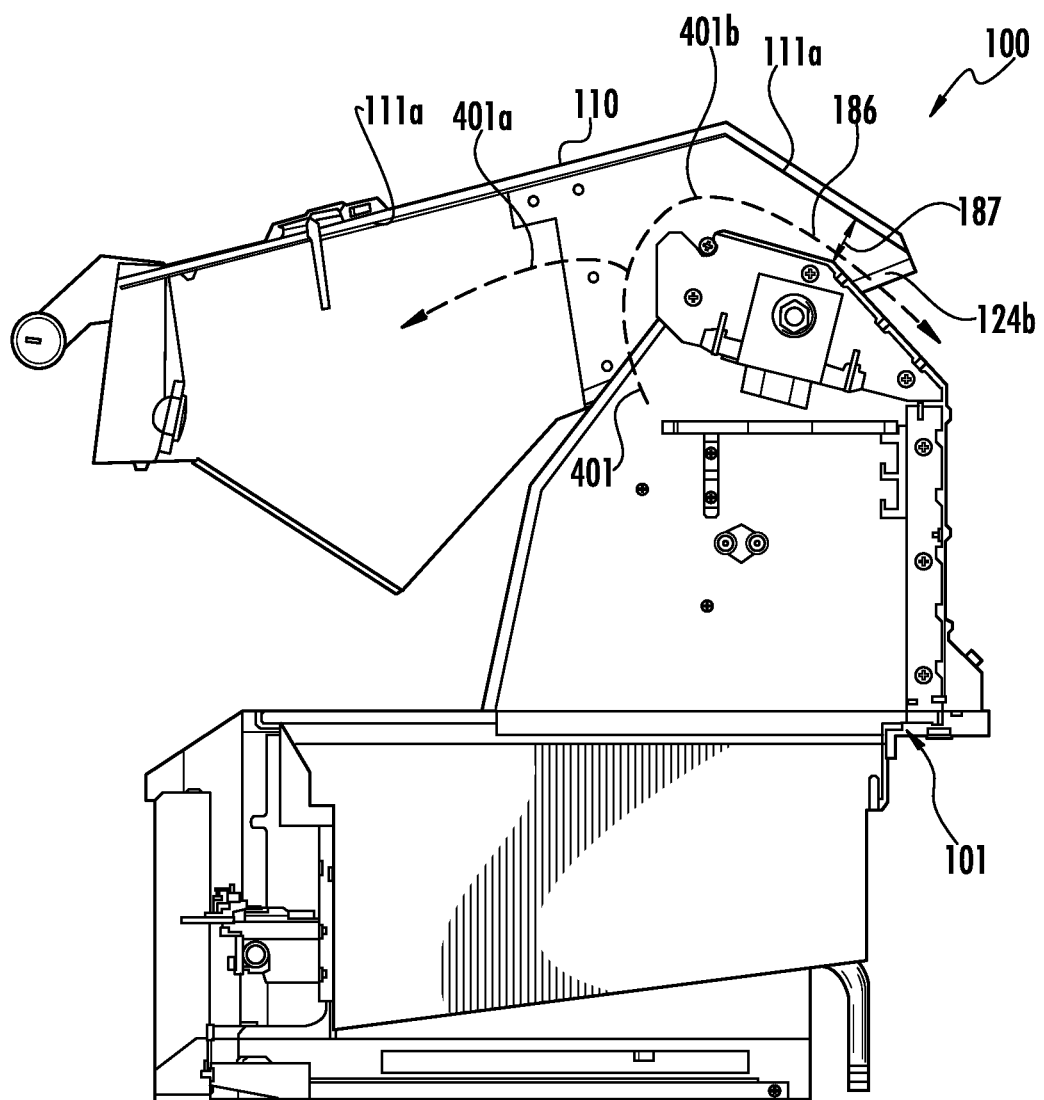
Figure 9D:
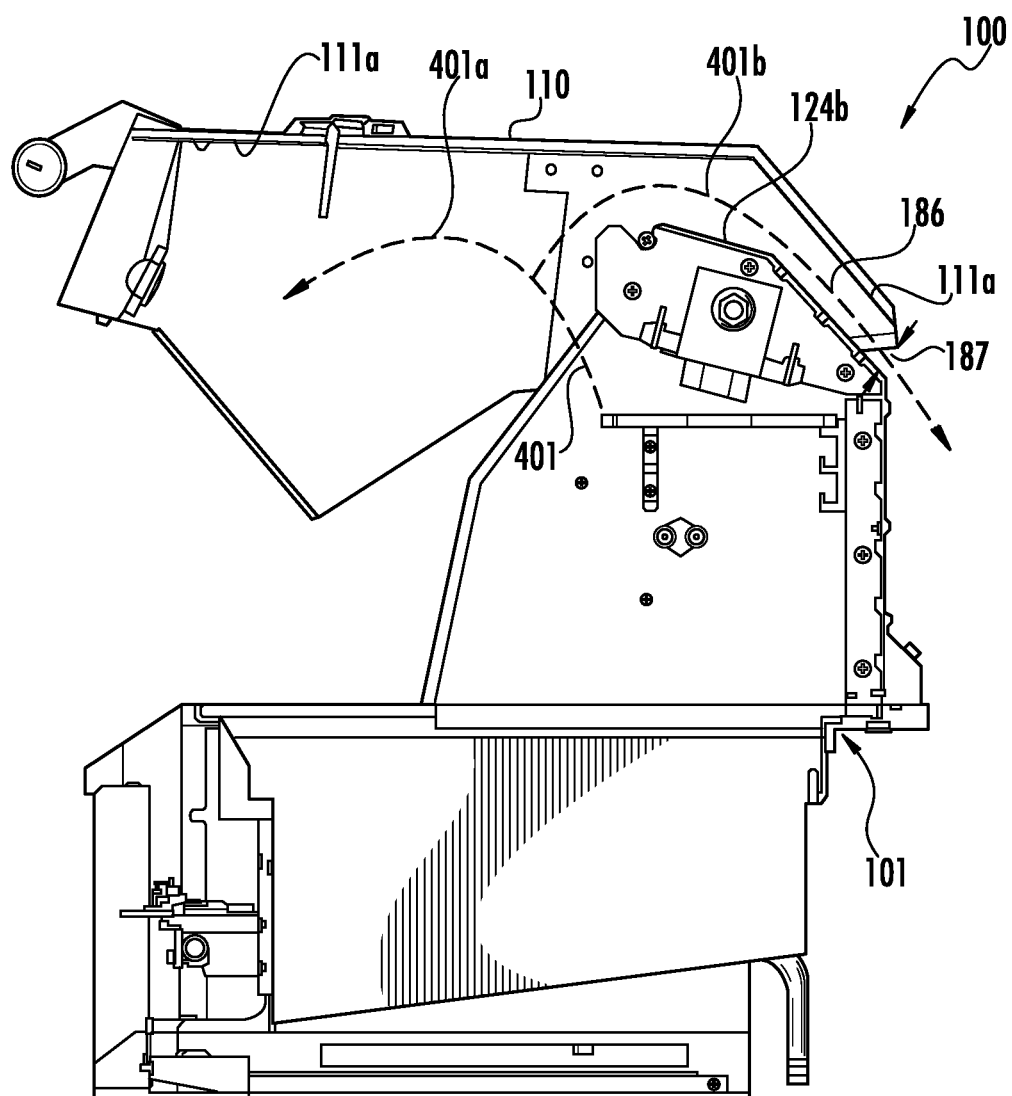
Figure 9E:
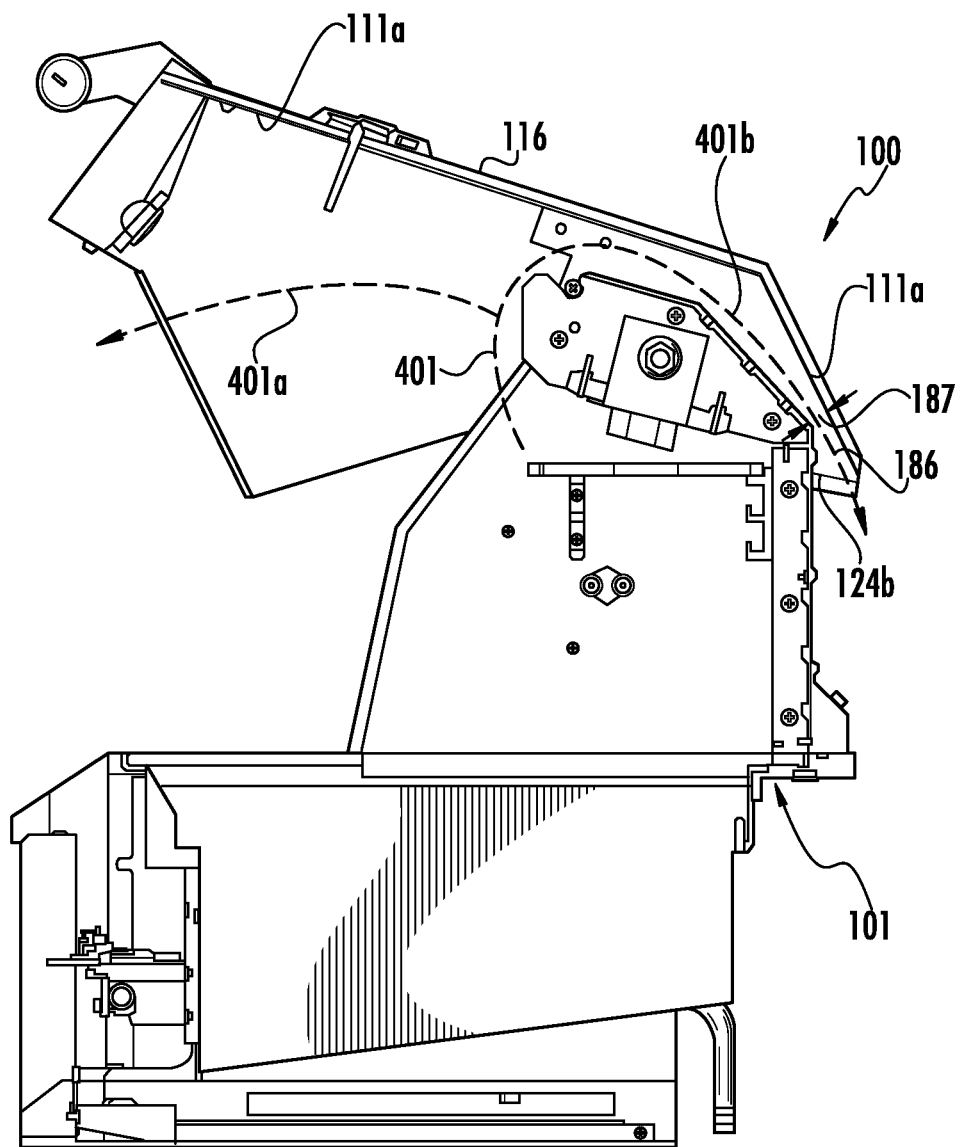
Figure 9F:
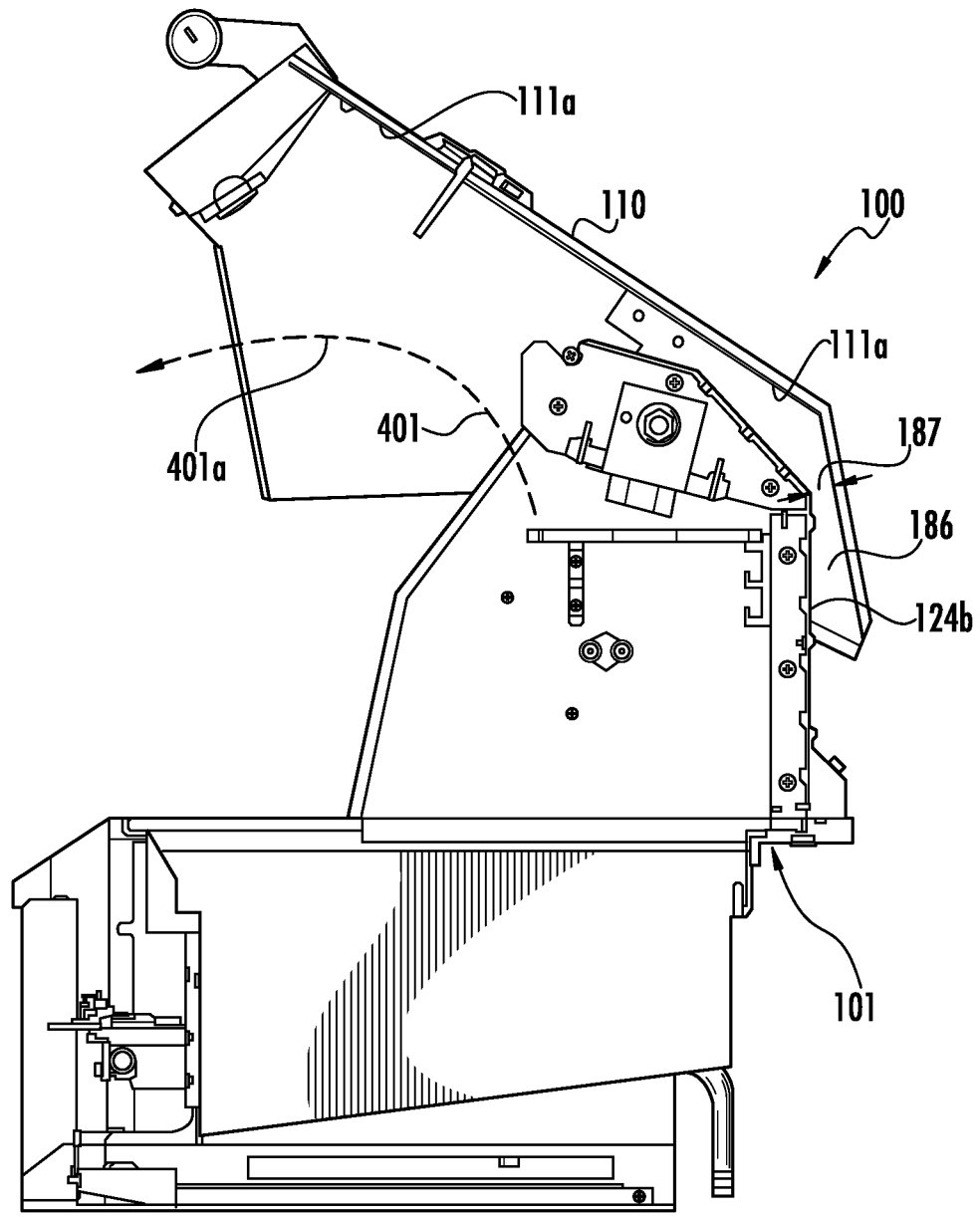
Figure 9G:
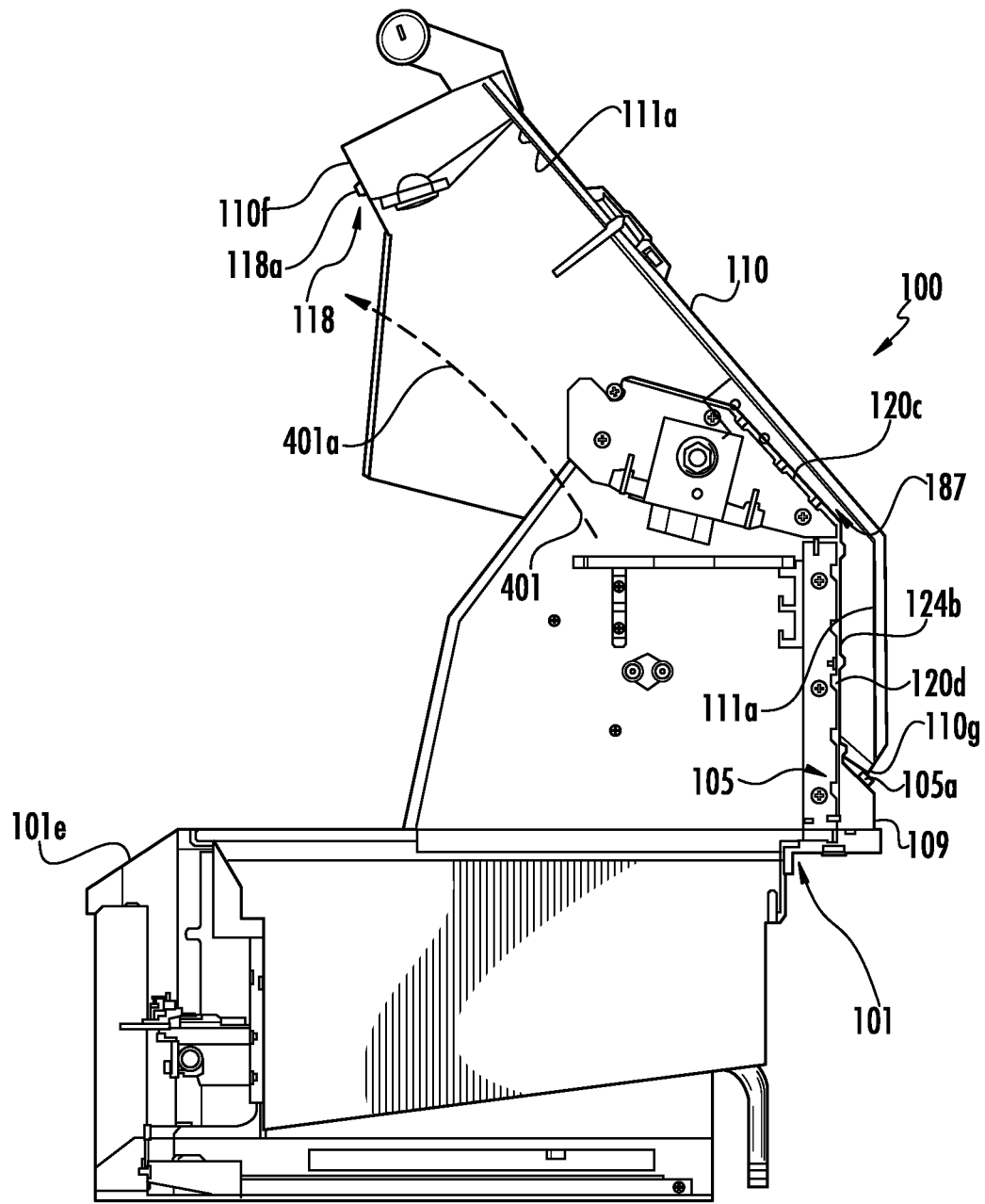

FIGS. 9A-9G illustrate a hood pivot sequence (in 15 degree increments between 0 degrees to 90 degrees) from a closed position (FIG. 9A) to a fully open position (FIG. 9G). In FIG. 9A, a gap 185 is defined between the rear end 110*e* of hood 110 and the rear cover 121 providing an exhaust port 186 to exhaust hot air and combustion products 401 from the grill 100 when hood 110 is in the closed position. When hood 110 is in the closed position, gap 185 may define a minimum gap distance, indicated by double headed arrow 187, along the exhaust port 186. As hood 110 is pivoted to an open position, a length of exhaust port 186 increases and extends along interior side 111*a* of the hood 110 and exterior side 124*b* of the rear housing 120, progressing initially along the rear cover 120*c* and then along both the rear cover 120*c* and the rear wall 120*d* (FIGS. 9B-9G). As shown in FIG. 9A, the rear end 110*e* of the hood 110 may also position above all or a forward portion of the rear cover 120*c* such that the exhaust port 186 is also defined therebetween when hood 110 is in the closed position. However, in some embodiments, the rear end 110*e* is offset forward of rear cover 120*c* when the hood 110 is in the closed position.

It should be appreciated that while it may be desirable to dispose IR burner 180 closer to zero degrees to more fully utilize the upper food support 140*b* for searing tops of food, it becomes very difficult to support combustion as the tilt angle becomes progressively smaller than approximately 30 degrees when there is not a considerable open area around the top and all sides of an IR burner. A large open area allows for the escape of combustion gases that are replaced by the air necessary to support continued combustion of the gas fed to the IR burner. Hence, operation of the downward facing IR burner 180 within an enclosed grill presents severe design constraints, even when the hood 110 is fully open. Combustion gases must generally flow out of the grill 100, e.g., through gap 185 or exhaust port 186, defined along the rear housing 120 and hood 110, or via the front of the hood 110 as the hood 110 progressively opens. At the hood position in FIG. 9C, the rearward exhaust route (indicated by arrows 401b) through exhaust port 186 is becoming constricted at minimum gap 187 before the forward exhaust route (indicated by arrows 401a) is open. The hood position illustrated in FIG. 9C depicts the most constricted position with respect to exhaust of combustion gases 401. In FIG. 9D, the forward route 401a provides a parallel flow along interior side 111a of the hood 110, while the rearward route 401b is constricted. In FIG. 9E, the forward route 401a is open, but the rearward exhaust route 401b is greatly constricted, thus, essentially all combustion gases 401 flow through the forward exhaust route 401a.

As introduced above, exhaust port 186 defines a minimum gap distance 187 representing a minimum cross-section that is defined along its length. It is important to combustion at downward facing IR burner 180 that flow paths of combustion gases 401 from grill 100, including regions adjacent to the IR burner 180, be available to allow combustion supporting air flows to access the sides of the IR burner 180. For example, IR burner 180 is preferably open on three sides. In the illustrated embodiment, the rearward exhaust route 401b is important to support of combustion at IR burner 180 until the hood 110 nearly fully open (e.g., FIGS. 9E & 9G). Accordingly, prior to that point, maintenance of a sufficient minimum gap distance 187 through exhaust port 186, in consideration of whether the exhaust port 186 along the rearward exhaust route 401b is the only or primary (FIG. 9A & B) exhaust route or one of multiple available exhaust routes in a split exhaust flow (FIGS. 9C-9D), is important to optimal combustion. In some embodiments, the minimum gap distance 187 may remain relatively constant, e.g., when hood 110 has a circumferential profile that is greater than a circumferential profile of rear housing 120 along the rear cover 120c and rear wall 120d. In one embodiment, the largest minimum gap distance 187 may be provided when the hood 110 is in the closed position when exhaust of combustion gases vent along the rearward exhaust route 401b (FIG. 9A). For example, in the closed position, a minimum gap distance 187 may be greater than approximately 2.5 inches, 2.0 inches, or 1.5 inches, such as between approximately 5.0 inches and approximately 1.5 inches, approximately 3.0 inches and 1.5 inches, or approximately 2.5 inches and approximately 2.0 inches, such as approximately 2.2 inches. The smallest minimum gap distance 187 may be provided when the hood 110 is in the fully open position (FIG. 9G), approximately fully open (e.g., FIG. 9E), or at another open position (e.g., FIGS. 9C-9D). In some embodiments, the minimum gap distance 187 may also generally progressively decrease as hood 110 pivots to the fully open position. For example, the minimum gap distance 187 may decrease to less than approximately 2.0 inches, 1.5 inches, or 1.0 inches, such as between approximately 2.0 inches and approximately 0.5 inches, approximately 1.5 inches and approximately 0.5 inches, or approximately 1.0 inch and approximately 0.5 inches, such as approximately 0.6 inches when hood 110 pivots between the closed and fully open positions. In some embodiments, the minimum gap distance 187 may be within at least 40%, 50%, 60% or greater of one of the largest minimum gap distance 187 or the largest minimum gap distance 187 when hood 110 is in the closed position during the initial 30 degrees of pivot from the closed position. The minimum gap distance 187 may also be within at least 30%, 40%, 50%, 60% or greater than one of the largest minimum gap distance 187 or the largest minimum gap distance 187 when hood 110 is in the closed position during the initial 45 degrees of pivot from the closed position.

In the illustrated embodiment, the minimum gap distance 187 progressively decreases in general as hood 110 is pivoted from the closed position to the fully open position. For example, the minimum gap distance 187 may be approximately 2.2 inches in FIG. 9A, approximately 1.5 inches in FIG. 9B, approximately 1.3 inches in FIG. 9C, approximately 0.8 inches in FIG. 9D, approximately 0.6 inches in FIG. 9E, approximately 0.7 inches in FIG. 9F, and approximately 0.6 inches in FIG. 9G. Thus, the minimum gap distance 187 through the initial 30 degrees of pivot from the closed position is at least 50% of at least one of the largest minimum gap distance 187 or the minimum gap distance 187 when hood 110 is in the fully closed position. The minimum gap distance 187 through the initial 45 degrees of pivot is at least 40% of at least one of the largest minimum gap distance 187 or the minimum gap distance 187 when hood 110 is in the fully closed position. In some embodiments, the minimum gap distance 187 through the initial 30 degrees of pivot is greater than approximately 1 inch, 1.2 inches, or 1.4 inches. In one embodiment, the minimum gap distance through the initial 45 degrees of pivot is greater than approximately 0.6 inches, 0.8 inches, or 1.1 inches.

When a rear stop 105 is employed, as described in more detail below, or the rear end 110e of hood 110 otherwise abuts a structure in the fully open position, the structure may partially or completely cap the exhaust port 186 (e.g., FIG. 9G). However, as used herein, minimum gap distance 187 does not include such capping of the opening of the exhaust port 186 in the fully open position. It will further be appreciated that grill 100 may be structured to include modified minimum gap distances 187 such as increased or decreased, for example, in larger or smaller scaled grills 100 or in consideration of the volume of exhaust required to be exhausted from grill 100.

Air flow for combustion may flow through the grill 100 through one or more vent shafts 106. The air may flow into vent shafts 106 through one or more vents 107 that line the shaft 106. For example, vents 107 positioned along the sides 101a, 101b of grill body 101 and rear wall 101c may flow into a vent shaft 106 that extends between IR burner 180 and firebox 130. As depicted by arrows 801 in FIG. 1C (see also FIG. 4), air to provide complete combustion in firebox 130 may flow into a vent shaft 106 along sides 101a, 101b, 101c of grill body 101 and therein flow along shaft 106 underlying burner assembly 190 and enter firebox 130 through vents 103a (FIG. 1C) in a shield plate 103. Air may also flow into the portion of the vent shaft 106 defined between a double wall portion of rear wall 120d through vents 107 through the exterior side 124a. This portion of vent shaft 106 includes an opening 106a to upper portion 121 of the rear housing 120, adjacent to IR burner 180, and above upper food support grate 140b. Thus, vent shaft 106 along rear wall 120d may provide combustion air flow to IR burner 180 along arrows 801 and hot air and combustion products may exhaust along arrows 401.

Grill 100 may include one or more lights 172 (e.g., FIG. 1D). In the illustrated embodiment, lights 172 are provided by one or more light modules 170 disposed along hood 110, positioned to overhang and direct light onto the food supporting surface 140a when hood 100 is in an open position. Light module 170 is positioned to overhang the food supporting region 108 or rearwardly project light from a forward location at forward end 110c along the interior side 111a of hood 110 onto the food supporting region 108 when hood 110 is in an open position. Such positioning may provide improved illumination of the cooking surface and food cooking thereon from the perspective of a user, e.g., through an opening between the forward end 110c of hood 110 and the forward edge 131c of the firebox 130 when hood 110 is in an open position. The light modules 170 may also be positioned forward of IR burner 180, upper food support grate 140b, or both when the hood is in the fully open position. Such positioning may avoid or limit shadows along the food supporting region 108 caused by the IR burner or upper food support grate 140b. For example, FIG. 2 illustrates a side view of grill 100 with hood 110 in an open position, wherein lights 172 are shown illuminating the food support surface 140a with minimal shadowing along a rear sub-portion of the rear portion of the food supporting region 108b. Here, lights 172 illuminate from above and rearward toward rear wall 120d to illuminate the top and outward facing sides of the food which may be the particular food surfaces visible to a user when peering through the opening between hood 110 and the outer edge of the cooking surfaces.

Although only one light module 170 is visible, the illustrated embodiment includes two spaced apart light modules 170 disposed at forward locations along the interior side of hood 110. In other embodiments, hood 110 includes a single rearward facing light module 170 that is centrally located along the forward portion of hood 110. In some embodiments, light modules 170 may be positioned at multiple forward to rear locations along an interior side 111a of hood 110. Lights 172 may include one or more light bulbs or LEDs, for example. As shown, each light module 170 is configured to house a 20 W halogen bulb.

Lights 172 are further positioned to provide optimum illumination through a wide range of angular open positions. As hood 110 translates to open positions, for example, the angular rotation of hood 110 works together with the forward location of the now overhanging light module 170 along the interior side 111a of hood 110 to provide optimum projection and lighting through the opening sequence (e.g., FIGS. 9A-9G). When hood 110 is in the fully closed position, light module 170 are positioned forward of and slightly above lower food support grate 140a and forward rim of firebox 130 and lights 170 (which are typically off when hood 110 is in the closed position) are positioned to project light rearwardly. Light modules 170 may be mounted at an angle above the horizontal, e.g., a central portion of a beam spread emitted from lights 172 may be directed at an angle above horizontal. For example, in some embodiments, the angle may be between greater than 0 degree to approximately 35 degrees, such as between approximately 8 degrees and approximately 30 degrees, approximately 10 degrees and approximately 20 degrees, or approximately 12 degrees. In other embodiments, light modules 170 may be positioned to direct lights 170 parallel to the horizontal when hood is in the fully closed position.

The light emitted from light modules 170 may be projected in a beam, which may be focused in some embodiments, and include a beam spread having a width encompassing the width of food support grate 140a when hood 110 is positioned in an open position approximately 30 degrees to greater than approximately 65 degrees, such as approximately 90 degrees, from the fully closed position. The beam spread may further include a height extending between the forward edge 131c of firebox 130 and upper food support grate 140a when hood 110 is positioned in an open position approximately 30 degrees to greater than approximately 65 degrees, such as approximately 90 degrees, from the fully closed position. The width and height of the beam spread may encompass the width of food support grate 140a and the height between the forward edge 131c of firebox 130 and the upper food support grate 140b when hood 110 is positioned in an open position approximately 30 degrees to greater than approximately 65 degrees, such as approximately 90 degrees, from the fully closed position.

When grill 100 includes hood mounted light modules 170 or other hood mounted electronics, power or signal communication may be provided by wiring 171 that transverses pivot 104, 104'. For example, with reference to FIG. 7, grill 100 may include a rotary electrical contact 174 through the pivot 104. Wiring 171 extends to pivot 104 and is fed to contact board 175. Contact board 175 is attached at the pivot 104 in a fixed position relative to the rotation of arm 150, e.g., fixed to the grill body 101. Contact board 175 includes a conductive contact strip 176 through which signal may be transmitted or power may be conducted. Wiring 171 along the arm 150 is connected to electrical contact 177 for engaging conductive contract strip 176 for electrically coupling wiring 171 along hood 110 to wiring 171 along grill body 101. Contact 177 includes a biased contact or spring plunger contact biased toward the grill side of the arm 150 or the conductive contact strip 176. A small circuit board 178 also electrically couples the wiring 171 along the arm 150 and the contact 177. Contact 177 co-rotates with the arm 150 and relative to the contact board 175. Arm 150 includes a cavity 152 in which wiring 171 and circuit board 178 are positioned. As illustrated, arm cover 151 (see, e.g., FIG. 3) is removed to expose arm cavity 152. Contact 177 extends from arm cavity 152 through arm 150 to engage the conductive contact strip 177 located on the grill side of the arm 150. In another embodiment, both the contact board 175 and contact 177 are positioned on the exterior side of arm 150, e.g., within arm cavity 152 thereof. It will be appreciated that the locations, relative movements, or both of the electrical contact 177 and the contact board 175 may also be swapped or modified.

In operation, contact 177 electrically engages conductive contact strip 176 through at least a portion of the pivot of hood 110 to electrically couple the wiring 171 from the body 101 to hood 110 through the pivot 104. While rotary contact 174 is illustrated with respect to pivot 104 and arm 150 along right side 100b of grill 100, in various embodiments, grill 100 includes a rotary contact 174 through the pivot 104' along the side 100a instead of, or in addition to, side 100b. Such a rotary contact 174 through pivot 104' may similarly extend along arm 150', cavity 152' thereof (FIG. 5), or another side cavity along side 110a of hood 110. In some embodiments, other methods of electrically or communicatively coupling the hood 110 and body 101 through pivot 104, 104' may be used. For example, wiring 171 may be bent through pivot 104, 104'.

In various embodiments, grill 100 is configured to power light modules 170 when hood 110 is opened to a predefined open position or range of open positions. For example, when hood 110 pivots open from the closed position at least 10 degrees, 20 degrees, 30 degrees, or 40 degrees power may be supplied to the light module 170. Grill 100 may be configured to power light module 170 from the lower angular hood position, such as approximately 30 degrees, to a completely open position or an open position less than completely open. In the illustrated embodiment, rotary contact 174 also operates as part of a switch to connect a supply of power to the light modules 170 only through a predefined range of the angular range of motion of hood 110. For example, conductive contact strip 176 is dimensioned to provide an electrical contact area to contact 177 over a limited arc corresponding to a predefined range of motion of hood 110. The contact area may therefore be sized and shaped to limit the provision of power providing current to light modules 170 for powering lights 172 over the range angular motion of hood 110. In other embodiments, a switch may be provided along pivot 104, 104', a forward or rear interface of hood 110 or grill body 101, or other location to switch lights 170 on and off determined by the angular position of hood 110. Switches can be mechanical or include sensors, e.g., magnetic, inductive, optical, etc., to determine the position of hood 110. In such embodiments, electrical connection through pivot 104, 104' may be continuously or limited to only when hood 110 is positioned within a predefined range or ranges of angular positions. In one example, electrical connection through the rotary contact 174 and light module 170 is maintained and a sensor that is wired to or in signal communication with a switch provides sensed position data with respect to hood 110 that the switch uses to control power delivery to the light modules 170 based on the angular position of hood 110. The grill body 101 may also include wiring 171 that couples the wiring 171 extending along hood 110 to a switch, controller, electrical power source, or a combination thereof. For example, switches may be operable to electrically couple devices to electrical power or terminate connection or delivery of electrical power to devices. In various embodiments, switches may be selectively actuated by a user, mechanically or electrically coordinated with an orientation of hood 110, or both. A controller may be in circuit with hood wiring 171 to modulate power delivery to one or more devices, receive sensor data, or both. The controller may include memory storing instructions executable by a processor to perform the instructions. The controller may include a control panel having a display, switch, or both through which a user may view conditions sensed, e.g., temperature, video, etc., or control operations of one or more devices. In one embodiment, the control panel may include a remote control panel provided on a tablet, smart phone, or dedicated device, for example.

In one embodiment, hood 110 may be stably positioned within a subset range of its pivotal range of motion, which may be referred to as a counterbalanced portion of the pivotal range, such as between approximately 6 degrees and approximately 65 degrees with 65 degrees as the free fly angle. A forward closing force may be applied to the handle 115 to pivot hood 110 to a fully closed position from the 6 degree or larger open position. Rotary contact 174 may be configured to electrically couple the electrical contact 177 and contact board 175 along the contact strip 176 when hood 110 is pivoted approximately 30 degrees from the closed position and maintain the electric coupling through the fully open position. In one such embodiment, a switch may be provided to allow the user to switch off the light when hood 110 is within the predefined range, e.g., to conserve power and bulb life when light is not needed.

Positioning lights 172 at helpful viewing angles may subject wiring and lighting electronics to high temperatures present within and adjacent to the food supporting region 108. Accordingly, hood 110 may be structured to include wiring paths and structures configured to reduce exposure to heat stress and other environmental hazards. For example, as introduced above, wiring 171 may be routed along frame members 161a, 161b, through pivot 104, 104', and within arm cavity 152.

In various embodiments, hood 110 includes a double wall construction along at least a portion thereof for extending wiring 171 or positioning electronics or sensors. For example, with reference to FIG. 4, hood 110 includes a double wall 110d', 110d'' extending between one or both of arms 150, 150' and forward end 110c and formed along and underlying at least a portion of the front face 110d of hood 110. The double wall 110d', 110d'' forms a protective face cavity 112 through which wiring 171 may extend from the grill body 101 to portions of hood 110. Face cavity 112 may extend from arm 150 to a forward or rear location along hood 110. Face cavity 112 may extend along partial or the entire length or width of hood 110 along the front face 110d. Face cavity 112 may include one or more double wall 110d', 110d'' sections that extend entirely or partially between sides 110a, 110b and ends 110c, 110d. In the illustrated embodiment, face cavity 112 connects or otherwise couples with or is in communication with arm cavity 152. For example, a port may be provided between the cavities 112, 152 through which wiring 171 may be passed. Arm cavity 152 may also open into face cavity 111. In some embodiments, face cavity 112 houses light modules 170, sensors, or other electronics instead of, or in addition to, wiring 171. Face cavity 112 may also extend to arm 150' instead of, or in addition to, arm 150 and thereat connect or otherwise couple with an arm cavity 152' (see FIG. 5) formed within arm 150'.

As described above, one or more side cavities may be formed along sides 110a, 110b of the hood 110, e.g., arm cavity 152, 152'. In these or other embodiments, sides 110a, 110b may include other double wall sections. Such cavities may similarly connect with arm cavity 152, face cavity, or another cavity. In this or another example, the left or right sides 110a, 110b of hood 110 may extend from the front end 110c to the rotary connection 174 at pivot 104 such that wiring 171 may be directly received into a side cavity extending along the left and right sides 110a, 110b of hood 110.

In the illustrated embodiment, face cavity 112 extends between arm cavity 152 and a front cavity 113. In particular, hood 110 defines front cavity 113 along the forward end 110c of hood 110. Front cavity 113 is dimensioned for housing light modules 170, sensors, wiring 171, or other electronics or sensors. For example, with continued reference to FIG. 4, one or more light modules 170 are disposed in front cavity 113. Front cavity 113 provides thermal protection to light module 170 from damaging heat exposure. Front cavity 113 is also positioned at a forward location, outside of the firebox 130 and beyond the food support grate 140a when hood 110 is in the fully closed position. Thus, light module 170 is protected from heat by its position within front cavity 113 as well as by the location of front cavity 113, which is offset from the vertical column of heat that rises from firebox 130 during operation. Similarly, as hood 110 is pivoted to open positions, light module 170 remains slightly offset or along fringes of the vertical column of rising heat until the front face 110d of hood 110 pivots above horizontal (see, e.g., FIGS. 9A-9D).

The grill body 101 may also be structured to protect wiring 171 from damage. In some embodiments, the grill body 101 includes a double wall portion along one or both sides 120a, 120b of rear housing 120 or firebox 130. For example, as most clearly shown in FIGS. 1E & 4, the grill body 101 may include one or more sidewalls 101a, 101b mounted to or positioned exteriorly to respective sides 120a, 120b or sidewalls thereof of the rear housing 120 and firebox 130 and defining a body cavity 102a, 102b therebetween. Wiring 171 may be extended through the body cavity 102a, 102*b* toward pivot 104, 104' for further routing along arm 150, 150'. In these or another embodiment, with reference to FIG. 6, wiring 171 may extend along a path that includes an interior cavity 162*a*, 162*b* defined through one or more of the frame members 161*a*, 161*b*.

As introduced above, grill 100 may be configured with a counterbalance mechanism 160 operative to counterbalance one or both arms 150, 150' with respect to the COG of hood 110, thereby allowing hood 110 to rest in various open positions over a wide angular pivot range. That is the counterbalance mechanism 160 may be configured to stably counterbalance the hood 110 at partially open positions along a counterbalanced portion of the angular pivot range of the hood 110. Having hood 110 remain open and stable over a wide range of angular positions may provide versatile and convenient use of grill 100 to the user. In various embodiments, counterbalance 160 may employ springs, biases, pistons, differential weighting, or other counterbalance systems to one or more of stabilize hood 110, maintain hood 110 in various open positions, or reduce the force necessary to translate hood 110 between a closed position and one or more open positions. In one example, hood 110 may pivot relative to the grill body 101 along arm 150, 150', wherein one or both arms 150, 150' may be counterbalanced with respect to the COG of hood 110 to reduce the apparent weight to the user when raising hood 110. This may be especially beneficial when grill 100 is equipped with a hood 110 having a double wall construction that may increase the overall weight of the hood 110.

Figure 8:
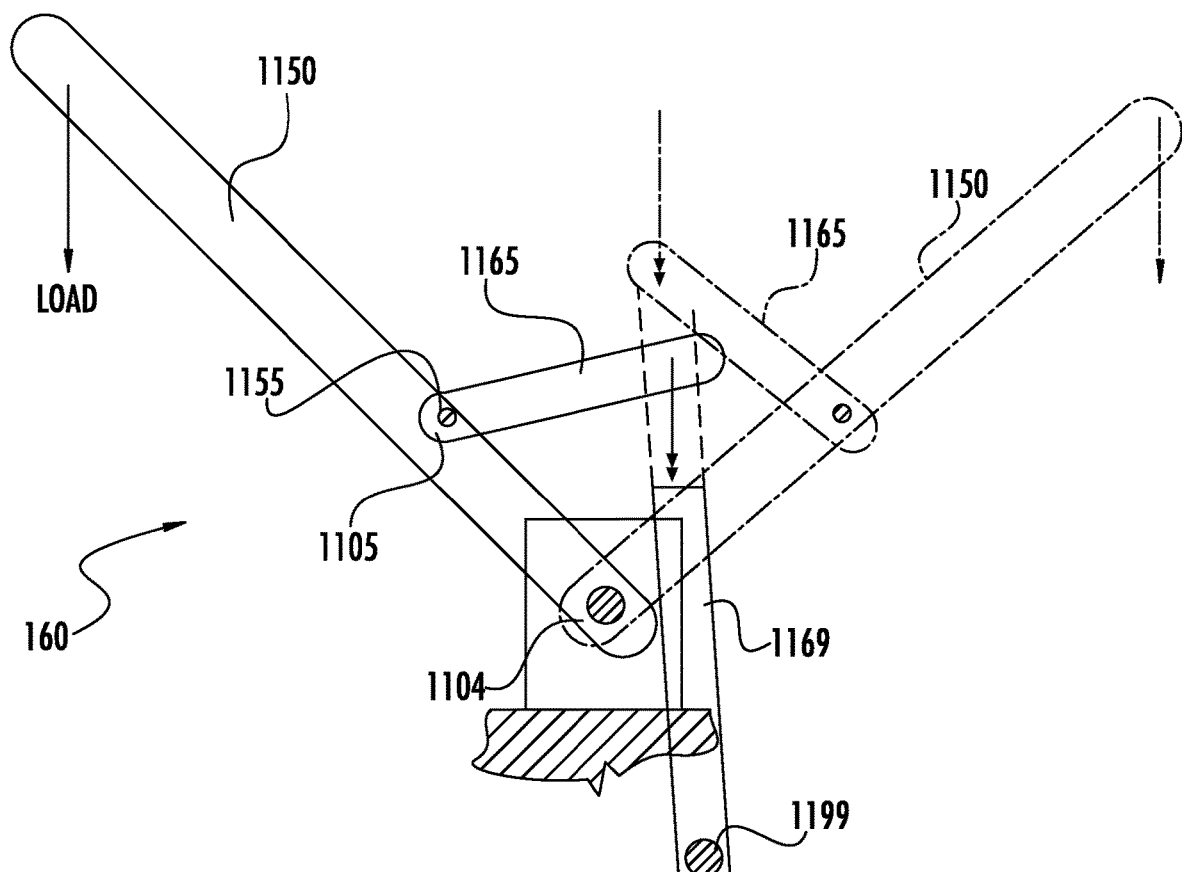
FIG. 8 is a schematic illustration of the operative principles of a counterbalance mechanism used to stabilize a hood over a range of open positions.

Grill 100 may deploy various counterbalance mechanisms 160, such as those which generally operate under principles exemplified in FIG. 8. For instance, a hinge arm 1150, which may be similar to hinge arm 150, 150', of a hood may rotate about a pivot axle 1104, which may be similar to pivot 104, between a closed position (solid outline) and a fully open position (dashed outline). Single headed arrows depict the load on hinge arm 1150 by the COG of hood in the closed position (solid outline) and fully open position (dashed outline). A cam or rocker arm 1165 may be attached to the hinge arm 1150 at a secondary load axle 1105 by a bearing 1155, which may optionally be a frictional bearing. The hinge arm 1150 may include multiple hinge arms. For example, the hinge arm 1150 can be formed of two parallel arms joined by cams or rocker arms 1150 at both opposing sides of the hood.

Rocker arm 1165 is biased by a spring 1169 movably connected with the rocker arm 1165 at a location spaced apart from secondary load axle 1105. Spring 1169 can be attached to a distal axle 1199 at a distal end from the connection to rocker arm 1165. Double headed arrows depict opposing balance load on hinge arm 1150 applied via rocker arm 1165 attached to hinge arm 1150 at a secondary load axle 1105 by bearing 1155 in the closed position (solid outline) and fully open position (dashed outline). In operation, the load on hinge arm 1150 may be initially left of pivot axle 1104. As the hood swings open, to the right, hinge arm 1150 shifts the COG to the right of pivot axle 1104. Rocker arm 1165 may rotate with hinge arm 1150 to provide a counter balancing load opposing the shift of the COG load of the hood.

Spring 1169, one or more bearings 1105, and rocker arm 1150 (which may include multiple mechanical linkages) may have numerous alternative configurations to provide a counterbalance to the COG of the hood as it swings from the left to the right, with the counterbalance force both facilitating movement by requiring less force to rotate hood and restraining the hood as it is rotated to a different orientation between the extreme right and left positions. The counterbalance 1160 may be configured to deploy a tension spring, compression spring, or torsion spring as spring 1169. Various suitable counterbalance mechanisms and the specific principles of operation are generally disclosed in the following U.S. Patents and published applications, all of which are hereby incorporated herein by reference: US 2010/0019112 A1 (Chi, 28 Jan. 2010); U.S. Pat. No. 3,999,245 (Bue et al., 28 Dec. 1976); U.S. Pat. No. 8,500,722B2 (Cooper, 23 Aug. 2006); U.S. Pat. No. 8,066,251 B2 (Brown, 29 Nov. 2011); US2005/0034547A1 (Sweere et al. 17 Feb. 2005); US2004/0245419 A1 (Sweere et al., 9 Dec. 2004); U.S. Pat. No. 6,375,175 B1 (Baumann et al., 23 Apr. 2002); U.S. Pat. No. 5,402,690 A (Sekiguchi et al., 4 Apr. 1995); U.S. Pat. No. 5,213,293 A (Muentener, 25 May 1993); U.S. Pat. No. 3,950,819 A (Little, 20 Apr. 1976), and U.S. Pat. No. 3,771,194 A (Little, 13 Nov. 1973).

Figure 6:
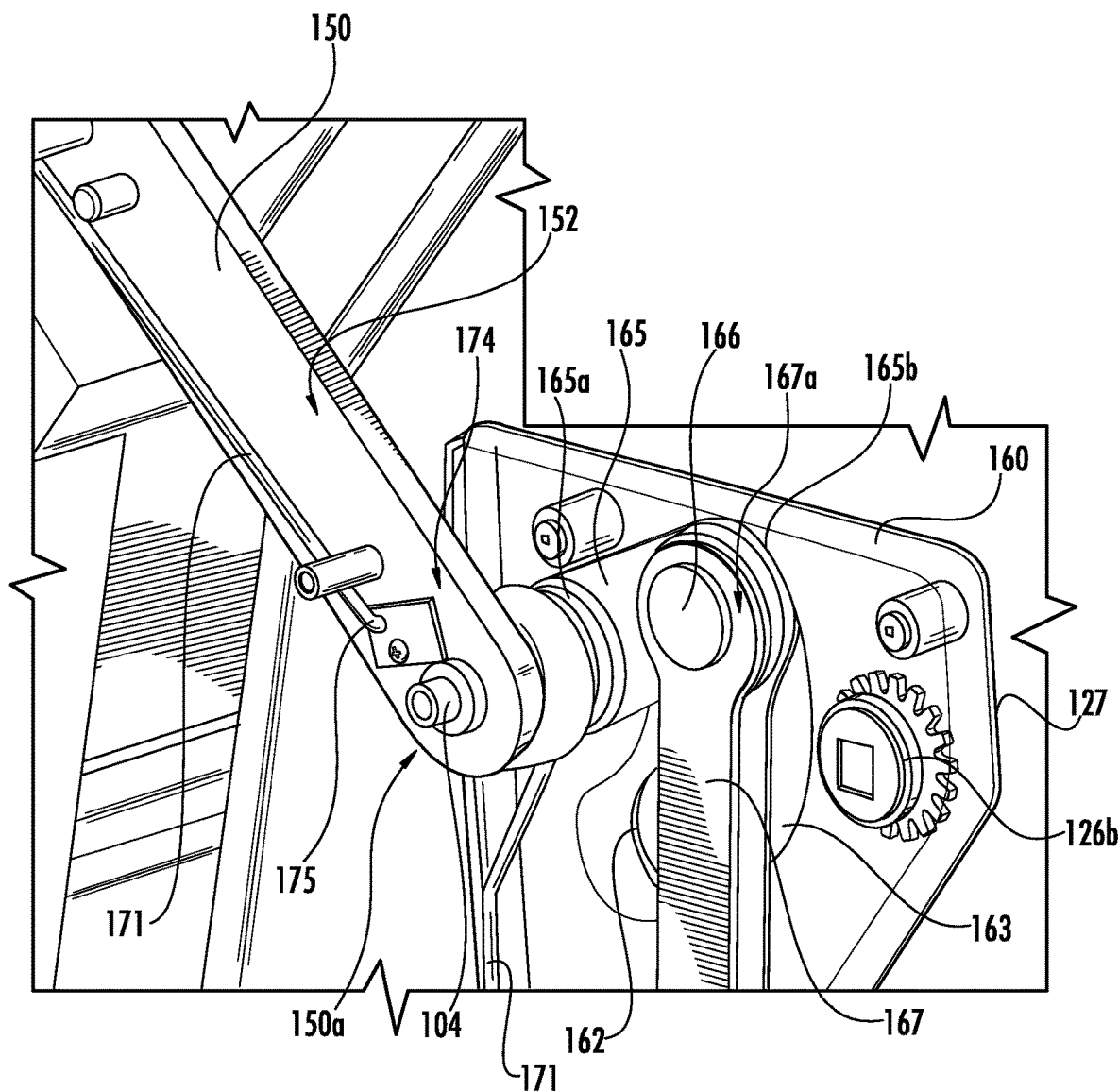
FIG. 6 is an enlarged perspective view of a hinge arm to pivot coupling with the arm cover removed.
Figure 7:
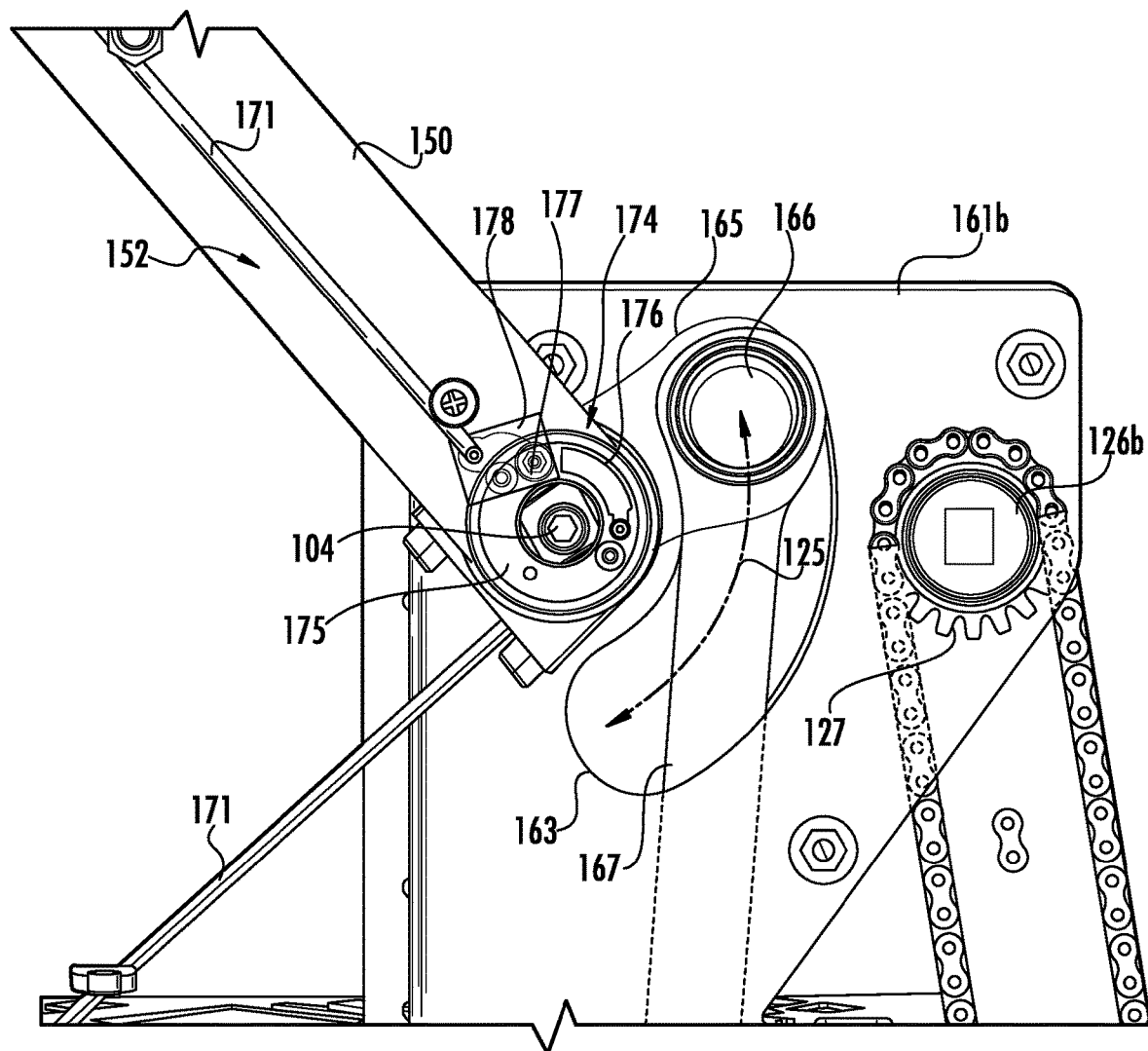
FIG. 7 is an elevated view of a hinge arm to pivot coupling with the arm cover removed showing various features of a rotary contact.

FIGS. 4 & 6 illustrates various features of a counterbalance mechanism 160 according to various embodiments. The counterbalance mechanism 160 is configured to stably counterbalance the hood 110 at partially open positions along a counterbalanced portion of the angular pivot range of the hood 110. Counterbalance 160 includes hinge arm 150 having a proximal end 150*a* in rotary engagement with pivot 104. Pivot 104 and end 150*a* are shown mounted on frame member 161*b*; however, in other embodiments, the pivot 104 may be positioned at another stable fixed location along the grill body 101. It will be appreciated that counterbalance 160 may include similar features on the opposite side of hood 110 and grill body 101 to further enhance the operation and stability of hood 110. For example, arm 150' mounted along side 101*a* at pivot 104', such as along side 120*a*, frame member 161*a*, or other stable structure along rear housing 120 or a cavity thereof.

A cam arm 165 is rotationally connected to arm 150 at pivot 104 at a first end 165*a* and extends within cavity 162*a* to a second end 165*b* disposed within arcuate slot 163. Pivoting of arm 150 co-rotates the first end 165*a* of cam arm 165 at pivot 104 and correspondingly translates the second end 165*b* along arcuate path 125 (FIG. 7) generally defined along arcuate slot 163. The second end 165*b* of cam arm 165 rotatably couples to a first end 167*a* of a lever 167 at pivot head 166 and hence is pivotable relative to lever 167 at pivot head 166. Cam arm 165 and pivot head 166 translate within cavity 162*a*. Lever 167 is subject to biasing force biased toward pivoting of the hood 110 from the closed position to one or more open positions, which is downward translation of pivot head 166 along the arcuate path 125 in this embodiment. For example, lever 167 may be biased to translation of the pivot head 166 in a direction corresponding to opening of the hood 110 and apply a corresponding counterbalancing force thereto to counterbalance the arm 150 with respect to the center of gravity (COG) of the hood 110 along the counterbalanced portion of the angular range.

As noted above, the biasing force in the illustrated embodiment is provided by one or more springs 169. It will be appreciated that springs may be used in any orientation and may store energy in changed conformations, e.g., shape, arrangement, length, etc. resulting from application of load from a resting state. For example, springs may be a coil, cantilever, balance, leaf, or other springs arrangement. Springs may operate as compression springs, such as spring 169, tension springs, such as spring 169', torsion springs, or other suitable arrangement. Spring 169 includes a first end 169 fixedly mounted to the grill body 101 along side 110*b*. In particular, spring 169 is internally mounted in body cavity 102 adjacent to side 101*b* to frame member 161*b* at mount 168. Lever 167 may be movable relative to the first end 169a of the first spring to change the conformation—which, depending on the orientation and configuration/spring arrangement of the spring used, may include compression, decompression, extension, or retraction, for example—of the spring 169. When the hood 110 is in the closed position, the COG of the hood 110 may be forward of the pivot 104 and the spring 169 may be one of compressed or extended relative to its resting position. As shown, translation of the pivot head 166 along the arcuate path 125, coinciding with pivoting of hood 110 from the closed position, may change the conformation of the spring 169, allowing decompression toward its resting position, thereby biasing lever 167 to translation of the pivot head 166 along the arcuate path 125 toward open positions.

Lever 167 extends through a sleeve portion 168a of mount 168 and is translatable therethrough relative to mount 168 and the first end 169a of spring 169. A second end 169b of spring 169 is fixedly mounted to a second end 167b of lever 167 such that movement of lever 167 along the arcuate path 125 changes the distance and hence conformation between the first and second ends 169a, 169b of the spring 169. For example, a distance between the first end 169a and the second end 169b increases, decompressing spring 169 toward its resting position, when the hood 110 is pivoted toward open positions (FIG. 3) and decreases when the hood 110 is pivoted toward the closed position (FIG. 4), compressing spring 169 from its resting position. The position of the first end 169a of spring 169 is fixed such that a distance between pivot head 166 and the first end 169a of spring 169 also decreases when hood 110 is pivoted toward open positions (FIG. 3) and increases when hood 110 is pivoted toward the closed position (FIG. 3). In the illustrated embodiment, lever 167 further extends through the coil shape of spring 169 and is further extendable therethrough to increase or decrease a distance between the ends 169a, 169b. In another embodiment, lever 167 does not extend through spring 169 but rather extends adjacent to the spring 169.

In operation, the cam arm 165, being fixed to motion along the arcuate path 125 defined by arcuate slot 163, transfers the rotational force of hood 110 to spring 169 via the lever 167. Lever 167 has a second end 167b opposed by resistance to compression of spring 169 such that spring 169 decompresses toward its resting position as hood 110 is raised by handle 115 and the compressive force of spring 169 counterbalances the gravitational pull on hood 110 over the counterbalance range of the angular pivot range permitted by pivot head 166 of cam arm 165 in arcuate slot 163.

As noted above, the COG of hood 110 is forward of pivot 104 when the hood is in the closed position. The COG of hood 110 may transition rear of pivot 104 at or near the fully open position or may remain forward or forward to approximately over the pivot 104 for the entire pivotable range. For example, the forward end 110c of the hood 110 may be weighted such that the COG does not move to the rear of pivot 104.

In the illustrated embodiment, counterbalance 160 is also shown with a counterbalance feature along side 101a of grill body 101 that may be configured to one or more of control fly back, reduce forward force required to bring hood 110 from the fully open position toward the closed position, or both. In some embodiments, for example, spring 169 may obtain its resting position when the COG of hood 110 positions approximately over pivot 104, e.g., spring 169 will not apply significant force to continued translation of pivot head 166 along the portion of the arcuate path 125 corresponding to the COG of hood 110 being to the rear of pivot 104. In one example, spring 169 may be fully decompressed when the COG of hood 110 is approximately over the pivot 169 and continued translation of pivot head 166 may change the conformation of spring 169 comprising extension of spring 169 creating biasing tension along lever 167 against further extension which may be used to balance or partially offset the COG hood 110. Such tension may also be used to bias lever 167 toward retraction toward the resting state to provide closing assist in bringing the COG of hood 110 forward of pivot 104 at which time spring 169 is in a relaxed state and further compression is opposed by the spring to balance hood 110. However, in other or in further embodiments, the counterbalance mechanism 160 may include further balancing and assist features to address angular ranges when the COG of hood 110 is to the rear of pivot 104, 104'. For example, arm 150 may couple to another cam and lever providing bias to counterbalance or assist in pivoting the hood 110 at one or more portions of the angular pivot range (e.g., from the closed position to the counterbalance range, from the counterbalance range to the fully open position, from the fully open position to a partly open position wherein the COG of the hood 110 is approximately over the pivot 104 such that significant force is not otherwise applied that would counter the ability of the user to pivot hood 110 from the partially open position wherein the COG of the hood 110 is approximately over the pivot 104 (which may include just forward of pivot 104) to the fully open position or from just forward of the pivot 104 to above the pivot 104). In some such arrangements, cam arm 165 may similarly couple to another lever or lever 167 may couple with another spring.

Figure 5:
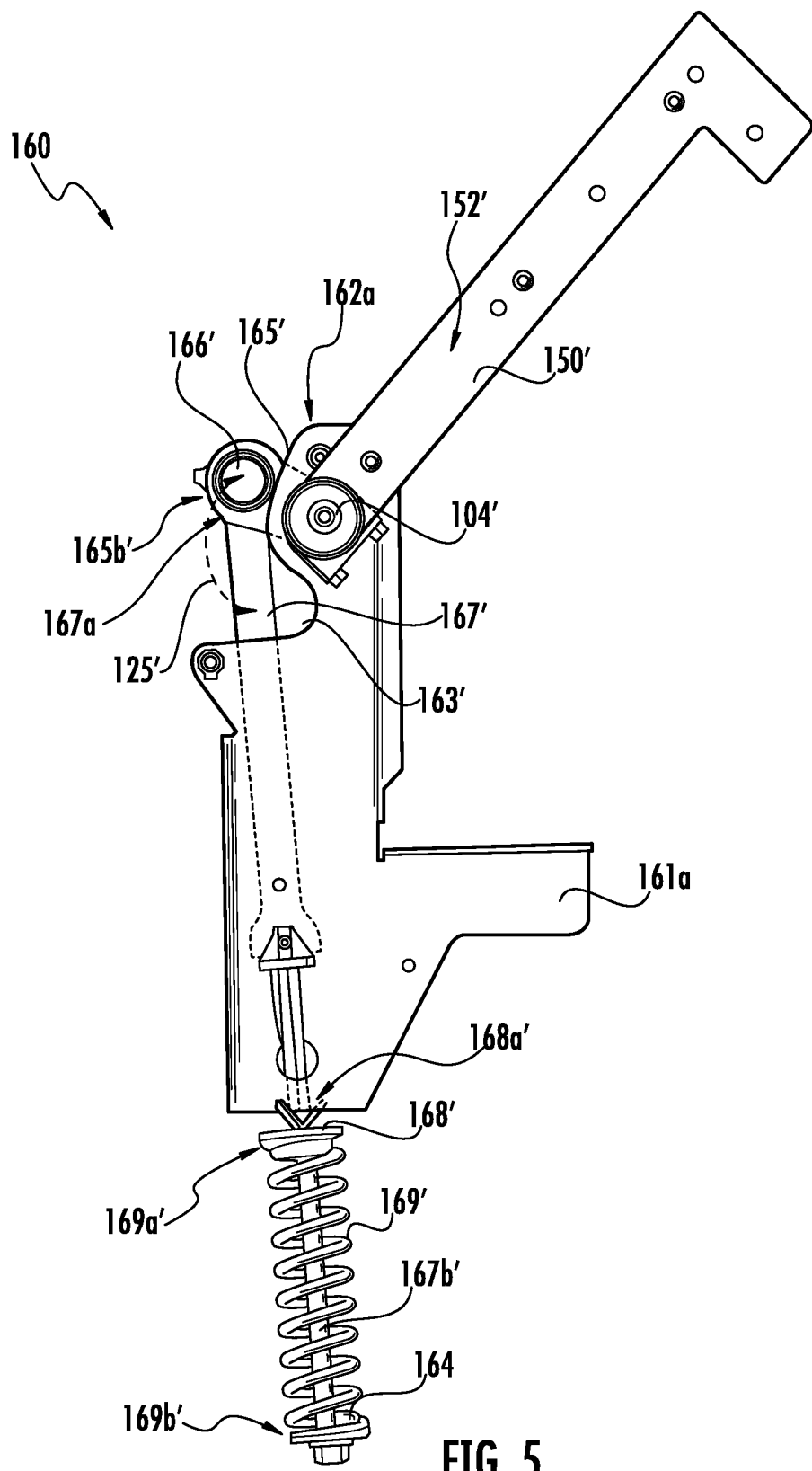
FIG. 5 is an isolated side elevation view of a counterbalance mechanism disposed in a cavity in another side of the grill body.

With reference to FIG. 5, showing an isolated view of an optional portion of the counterbalance mechanism 160 along side 101a and arm 150', the counterbalance mechanism 160 may include a fly back and closing assist feature along one or more sides 101a, 101b. For example, arm 150' has a proximal end 150a' in rotary engagement with pivot 104'. Pivot 104' and end 150a' of arm 150' are shown mounted on frame member 161a. In other embodiments, however, pivot 104' may be positioned at another stable fixed location along the grill body 101. A cam arm 165' is rotationally connected to arm 150' at pivot 104' at a first end (not visible) and extends within cavity 162a to a second end 165b' translatable along an arcuate path 125' generally defined by arcuate edge 163'. Pivoting of arm 150' co-rotates the first end of cam arm 165' at pivot 104' and correspondingly translates the second end 165b along the arcuate path 125' defined by the arcuate edge 163'. The second end 165b' of cam arm 165' rotatably couples to a first end 167a' of a lever 167' at pivot head 166' and hence is pivotable relative to lever 167' at the pivot head 166'.

Lever 167' is extendable to encounter a biasing force biased toward pivoting of hood 110 toward a closed position from an open position, which may include a fully open position, and which is upward along arcuate path 125' in this embodiment. The counterbalanced portion of the angular pivot range may extend from a partially open position wherein the COG of the hood is forward of the pivot 104, 104' to a partially open position wherein the COG of the hood 110 is approximately over the pivot 104, 104' or forward of the pivot 104, 104'. The COG of the hood 110 may be forward of the pivot 104, 104' in the closed position and rear of the pivot 104, 104' when the hood 110 is in the fully open position. The lever 167' may be biased toward translation of the pivot head 166' in a direction corresponding to pivoting from the fully open position or a partially open position wherein the COG of the hood 110 rear of pivot 104, 104' to another partially open position wherein the COG of hood 110 is approximately over the pivot 104, 104' (e.g., there is not significant force applied by lever 167' countering ability of the user to pivot hood from forward positions to positions wherein the COG is approximately over pivot 104, 104' or rear of pivot 104, 104'). The bias may counterbalance the hood 110 along all or a portion of the corresponding angular pivot range, provide closing assist from the fully open position, or combination thereof. In one embodiment, the bias may provide closing assist between the fully open position and a partially open position wherein the COG is approximately over the pivot 104, 104'. A force of approximately 5 lbf or less, for example, may be sufficient to pivot the hood 110 from fully open position and transition the COG from the rear to forward of pivot 104, 104' to the counterbalanced portion of the angular pivot range.

In the illustrated embodiment, the biasing force is supplied by one or more springs 169'. As shown, spring 169' operates as a tension spring and includes a first end 169a' fixedly mounted to the grill body 101 along side 110a and a second end 169b' movable with respect to the first end 169a' and relative to grill body 101. The second end 167b' of the lever 167 is movable relative to the first end 169a' and the second end 169b' of the spring 169'. When the hood 110 pivots to the fully open position, the COG of the hood 100 may transfer over the pivot 104, 104', from forward to rear of the pivot 104, 104', and the second end of the lever 167b' may engage the bracket 164 to change the conformation of spring 169, which may include compression, decompression, extension, or retraction relative to the relaxed position of spring 169'. As shown, the second end 167b' engages bracket 164 and extends spring 169' from its relaxed state as the hood 110 approaches the fully open position. As shown, spring 169' is internally mounted in internal cavity 102a adjacent to side 101a to frame member 161a at mount 168'. Lever 167' extends through a sleeve portion 168a' of mount 168' and is translatable therethrough relative to mount 168' and the first end 169a' of spring 169'. A second end 169b' of spring 169' is attached to a bracket 164 positioned to receive a second end 167b' of lever 167' when the lever 167' translates a predetermined distance through the sleeve portion 168a' of mount 168' such that further movement of the lever 167' along the arcuate path 125' changes the distance and hence conformation between the first and second ends 169a', 169b' of the spring 169'. For example, after the hood 110 has been pivoted to a predetermined open position corresponding to the predetermined translation distance of the second end 167b' of lever 167' with respect to mount 168' that results in engagement with bracket 164, pivoting the hood 110 to further open positions increases the distance between the first end 169a' and the second end 169b' of the spring 169', biasing lever 167' upward toward the pivot head 166' and counter to rearward pivoting of the hood 110. When the hood 110 is pivoted toward the closed position from a partially open position wherein the second end 167b' of lever 167' is engaged with bracket 164 and biased by spring 169' the distance between the first end 169a' and second end 169b' decreases and the retraction assists in pivoting or balancing of the hood 110 toward the closed position.

In operation, the cam arm 165', being fixed to motion defined by arcuate edge 163', transfers the rotational force of hood 110 to spring 169' via the lever 167' when the hood 110 is in the predetermined open position, e.g., when the COG of hood 110 is above or to the rear of pivot 104'. At which time, the second end 167b' of lever 169' is opposed by resistance to extension of spring 169' such that spring 169' extends as hood 110 is further raised rearward by handle 115 and the tension force of spring 169' counters or counterbalances the gravitational pull on hood 110 over the remaining range of motion permitted by pivot head 166' of cam arm 165' to the fully open position. In one embodiment, the spring constant of spring 169' is configured to counterbalance the hood 110 and stably position the hood 110 at open positions wherein the COG of hood 110 is rear of pivot 104'. The spring constant of spring 169' may also be configured to ease the hood 110 to the fully open position when the hood 110 is pivoted to the free fly angle. When a forward closing force is applied to handle 115 to pivot hood 110 from the fully open position or other open position wherein the lever 167' is countering or counterbalancing the hood 110, the amount of force required to pivot the hood 110 is reduced. For example, a force less than approximately 5 lbf, between 2 lbf and 7 lbf, or approximately 5 lbf may be sufficient to pivot hood 110 from the fully open position.

While the free fly or closing assist feature, which in some embodiments may be configured to counterbalance the hood 110 to stably position the hood 110 when the COG of the hood 110 is rear of the pivot 104, 104', is described with respect arm 150', in some embodiments, arm 150 and counterbalance components along side 101b may be configured with similar components as described with respect to side 101a, e.g., a second end 165b of cam arm 165 or another cam arm 165 attached to the rotation of arm 150 may be rotatably coupled to lever 167 or a second lever. Lever 167 or the second lever may be biased as described above with respect to lever 167' to balance and provide free fly assist, closing assist, or stable counterbalancing when the COG of hood 110 is to the rear of pivot 104. In some such embodiments, counterbalance mechanism 160 may include the counterbalance features described above with respect to sides 101a and 101b at both pivots 104, 104'.

In various embodiments, counterbalance mechanism 160 may be internally mounted. For example, as shown in FIG. 1E, the components of counterbalance 160 are positioned within body cavities 102a, 102b, including inner frame cavities 162a, 162b.

In the above described configurations, hood 110 is fully and readily adjustable with minimal user force on handle 115 between stable positions through the pivotable rotation of hood 110. For example, the COG of hood 110 may be coordinated with the spring constant to require a forward closing force to bring hood 110 toward a closed orientation from the fully open position or position therebetween and an upward to rear opening force to bring hood 110 to stable open position from a fully closed position or open position therebetween. In one embodiment, movement of hood 110 may be initiated with a force less than approximately 5 lbf, between 2 lbf and 7 lbf, or approximately 5 lbf. In this or another embodiment, the range of motion of hood 110 may be between 60 and 110 degrees. All or a portion of the range of motion may be coordinated with counterbalance 160 to provide stable positioning of hood 110. For example, the range of motion of hood 110 may be approximately 90 degrees and hood 110 may be stably positioned at any orientation therebetween or within a subset range, such as between approximately 0 degrees (closed) and approximately 60 degrees, approximately 5 degrees and approximately 65 degrees, with 60 or 65 degrees as the free fly angle. A forward closing force may be applied to handle 115 to bring hood 110 to a fully closed position from, for example, a 6 degrees or greater open position.

As introduced above, grill 100 may include one or more stops configured to prevent rotation of hood 110 beyond one or both of a predetermined closed position and a fully open position. With reference to FIGS. 9A & 9G, grill 100 may include a rear stop 105 including a bumper 105a located along rear wall 120d. Bumper 105a may be configured to engage a rear edge 110f of hood 110 when hood 110 is rotated to a fully open position (FIG. 9G). As shown, rear wall 120d includes an optional extension or foot 109 onto which bumper 105a is disposed.

Foot 109 protrudes outwardly relative to an exterior side 124b of a lower portion of rear wall 120d. Foot 109 may provide a stable base for bumper 105a to support hood 110 that is located rearward of an upper portion of the rear wall 120d to allow exhaust space, for example exhaust port 186, to form between the interior side 111a of hood 110 and rear wall 120d through various open positions. Grill 100 may also include a forward stop 118 including a bumper 118a disposed along a lower forward surface 110f of hood 110. Bumper 118a is positioned to engage a forward surface 100e of grill body 101, forward of the firebox 130. Bumpers 105a, 118a may be fabricated from compressible or elastic, e.g., elastomeric, materials to provide cushioning and prevent damage to hood 110 when received at the stop 105, 118. In some embodiments, bumpers 105a, 118a may be fabricated from rigid materials such as metallics, alloys, hard plastics, ceramics, etc.

In various embodiments, counterbalance 160 may be configured to aid in aiming lights 170 disposed along the underside of hood 110. For example, counterbalance 160 may be configured to support hood 110 at an optimum rotation angles or positions of arm 150 for aiming the lights 172 on food positioned on the food support grate 140.

Figure 10A:
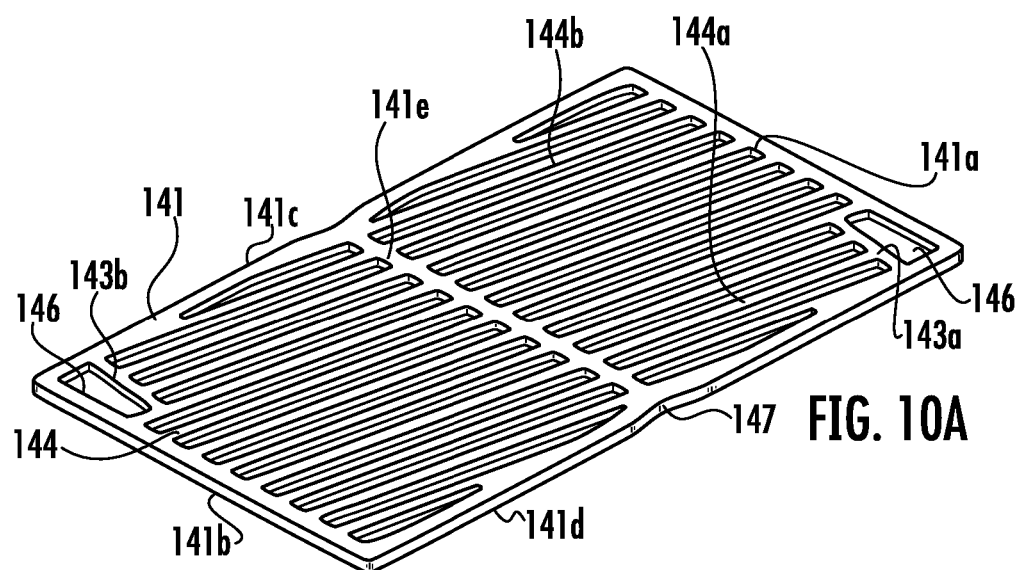
FIGS. 10A & 10B are perspective and plan views of a food support grate module.
Figure 10B:
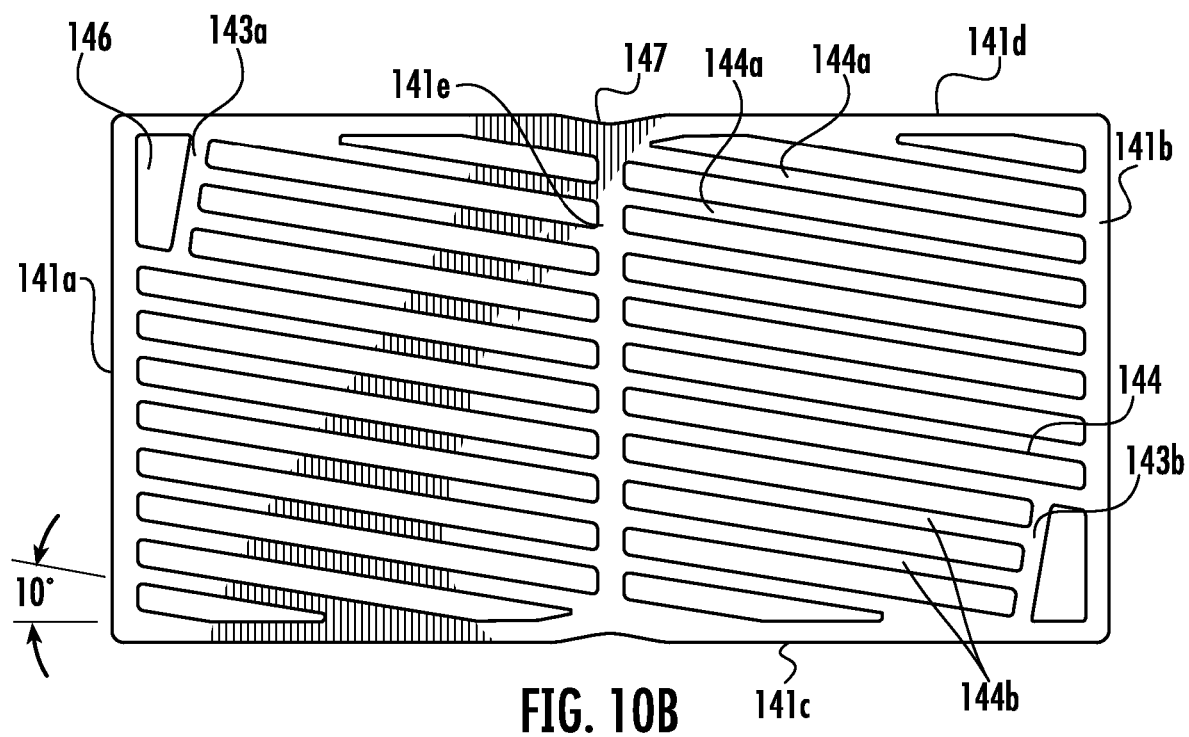

FIGS. 10A & 10B illustrate one embodiment of a food support module 141, which may be used alone or with addition modules 141 to comprise a food support grate 140a, as described above. The food support module 141 includes a plurality of spaced apart bars 144, 144a, 144b extending between side bars 141a, 141b, 141c, 141d. The bars 144, 144a, 144b may extend at approximately a 10 degree angle with respect to side bars 143c and 143d. Bar 141e extends parallel to side bars 141a and 141b along a central portion of the module 141 and intersects bar 144 and a portion of bars 144a and 144b. Lateral bar members 144a and 144b respectively extend obliquely from side bars 143a and 143b to respective side bars 141b and 141a and intersect a portion of the bar 141e. Side bars 143a and 143b define gaps 146 at opposite corners of the module 141 with side bars 141a and 141d and side bars 141b, 141c, respectively. In this arrangement, the modules 141 may be flipped such that either cooking face may be used to support foods. The module 141 may further include a central indentation 147 along side bars 141c and 141d to provide a manipulation area to access the module 141, e.g., to aid in lifting the module 141 when positioned above a firebox 130 adjacent to another module 141.

As introduced above, the grill 100 may include a radiant tray 200, which provides even heating and forms a barrier between the food support grate 140a and the gas burner assembly 190, protecting the burners from exposure to grease and debris that may fall through the food support grate 140a and otherwise clog gas ports. However, over time, the slow deposition of charred food residue on the top of the radiant tray 200 may reduce the radiant efficiency of the tray 200 as well as create off flavors. Accordingly, in various embodiments described herein, the radiant tray 200 is configured for ease of cleaning the tray 200 of food residue.

FIGS. 11A-11D provide various isolated views of the radiant tray 200 illustrated in FIGS. 1B-1E. The radiant tray 200 may include a generally rigid housing 210. The housing 210 may be constructed from suitably rigid materials capable of withstanding temperatures within the firebox 130. For example, metals or metallics such as stainless steel, cast iron, alloys, or the like may be used. In some embodiments, the housing 210 may be coated or enameled with metals, ceramics, or glass.

The housing 210 includes first and second generally planar walls 211a, 211b defining an interior cavity 212. A plurality of spaced apart first holes or tile slots 213 for positioning of radiant materials are defined through each wall 211a, 211b. The tile slots 213 through the first wall 211a (FIG. 11A) are positioned to correspond with the tile slots 213 through the second wall 211b (FIG. 11B) such that they align through the planar dimension of the housing 210, as most clearly shown in the exploded view of FIG. 11D. In other examples, tile slots 213 may not be aligned, e.g., tile slots 213 may be partly or entirely offset. In the illustrated embodiment, each wall 211a, 211b includes eleven tile slots 213 corresponding to eleven tiles 220 that may be grasped within the corresponding tile slots 213. Tile slots 213 arrange tiles 220 in three rows along the length of each wall 211a, 211b. The outer rows include an additional tile compared to the middle row, which is nested between the outer rows, e.g., generally surrounded by tiles 220 of the outer rows. Tile slots 213 also arrange tiles 220 in rows cross wise across the width of each wall 211a, 211b. The rows are staggered two-one with the first and last row each containing two tiles 200. Rows having a single tile 220 are nested between rows having two tiles 220. Tile slots 213 also orient the tiles 220 at with largest end profile dimensions generally parallel with the sides 215a, 215b, 215c, 215d. Such largest end profile dimensions are also aligned with respect to the rows of tiles 220 across the length and width of the walls 211a, 211b. As described in more detail below, the above orientation and arrangements may be particularly suitable for optimal heat interaction with underlying burner assemblies 190. For example, burners extending longitudinally and laterally with respect to the tray 200 may be positioned to underlay the tray 200 such that the longitudinally and laterally extending burners generally align with one or more rows of tiles 220 along the length and width of the tray 200. The alignment with rows may be include alignment with the largest end dimensions of the tiles. It will be appreciated that number, size, orientation, and arrangement of tile slots 213 and tiles 220 may be modified, for example, in consideration of the desired end application such as burner configuration of a burner assembly 190.

Each wall 211a, 211b further includes a plurality of spaced apart second holes or vent ports 214 to promote venting of rising combustion gases. The vent ports 214 may align or be partially or entirely offset, requiring rising hot combustion gases entering the cavity 212 to take lateral paths to reach vent ports 214 in the opposing wall 211a, 211b. In the embodiment illustrated in FIGS. 11A-11D, the vent ports 214 include both aligning and non-aligning vent ports 214 with respect to the opposing wall 211a, 211b. For example, the square vent ports 214 along sides of each wall 211a, 211b and larger rectangular vent ports 214 along respective ends 216a, 216b. 216c, 216d of each wall 211a, 211b align while the smaller elongated vent ports 214 between and along the tile slots 213 do not align with a corresponding vent port 214 along the opposing wall 211a, 211b.

Figure 11A:
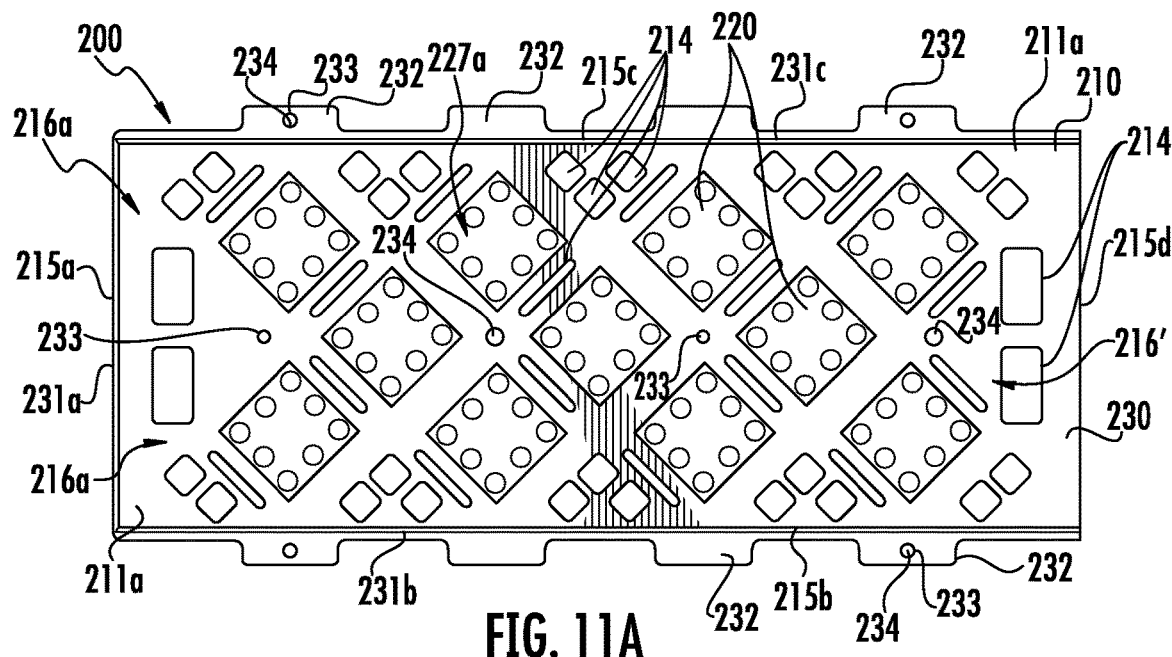
Figure 11B:
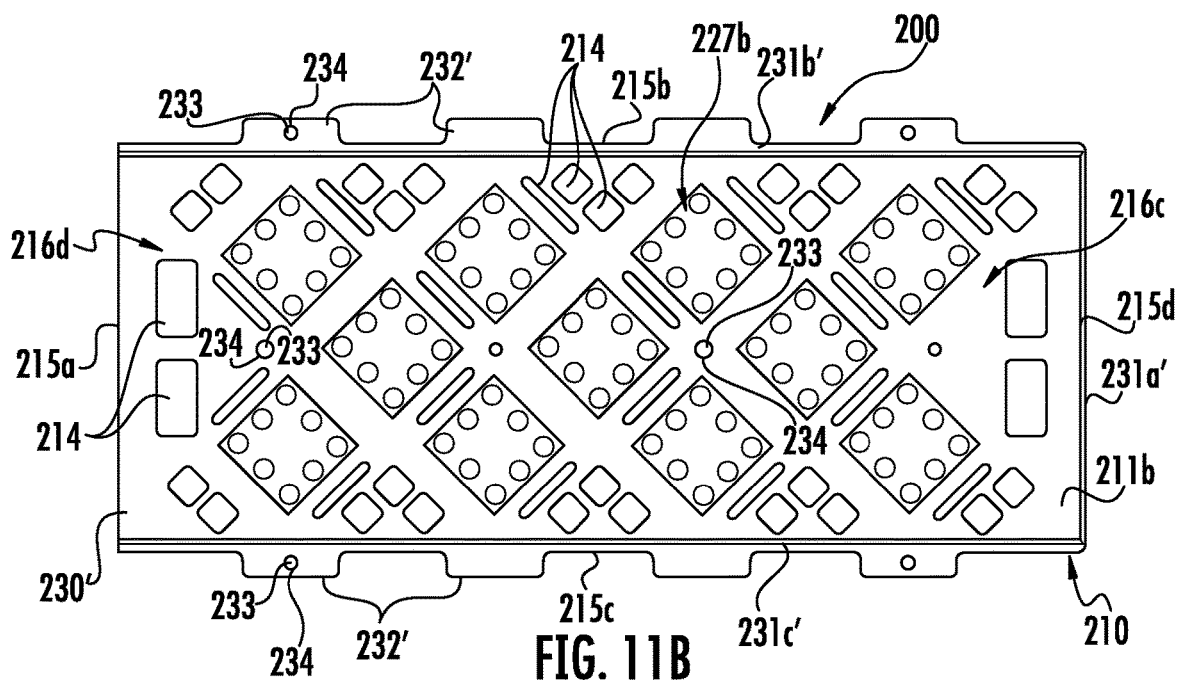
Figure 11C:
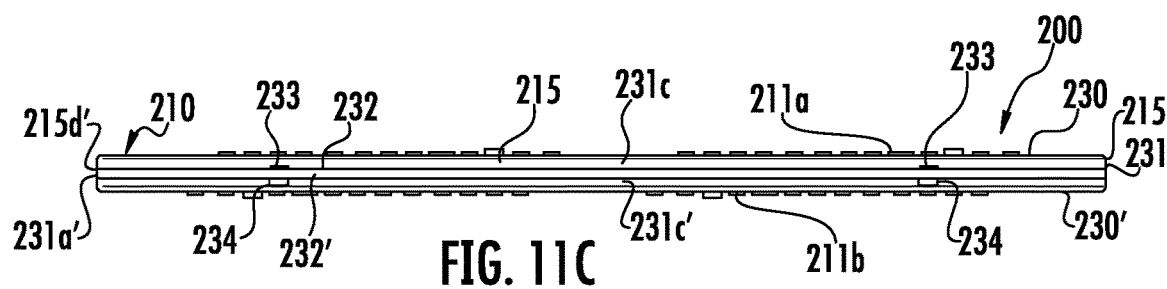
Figure 11D:
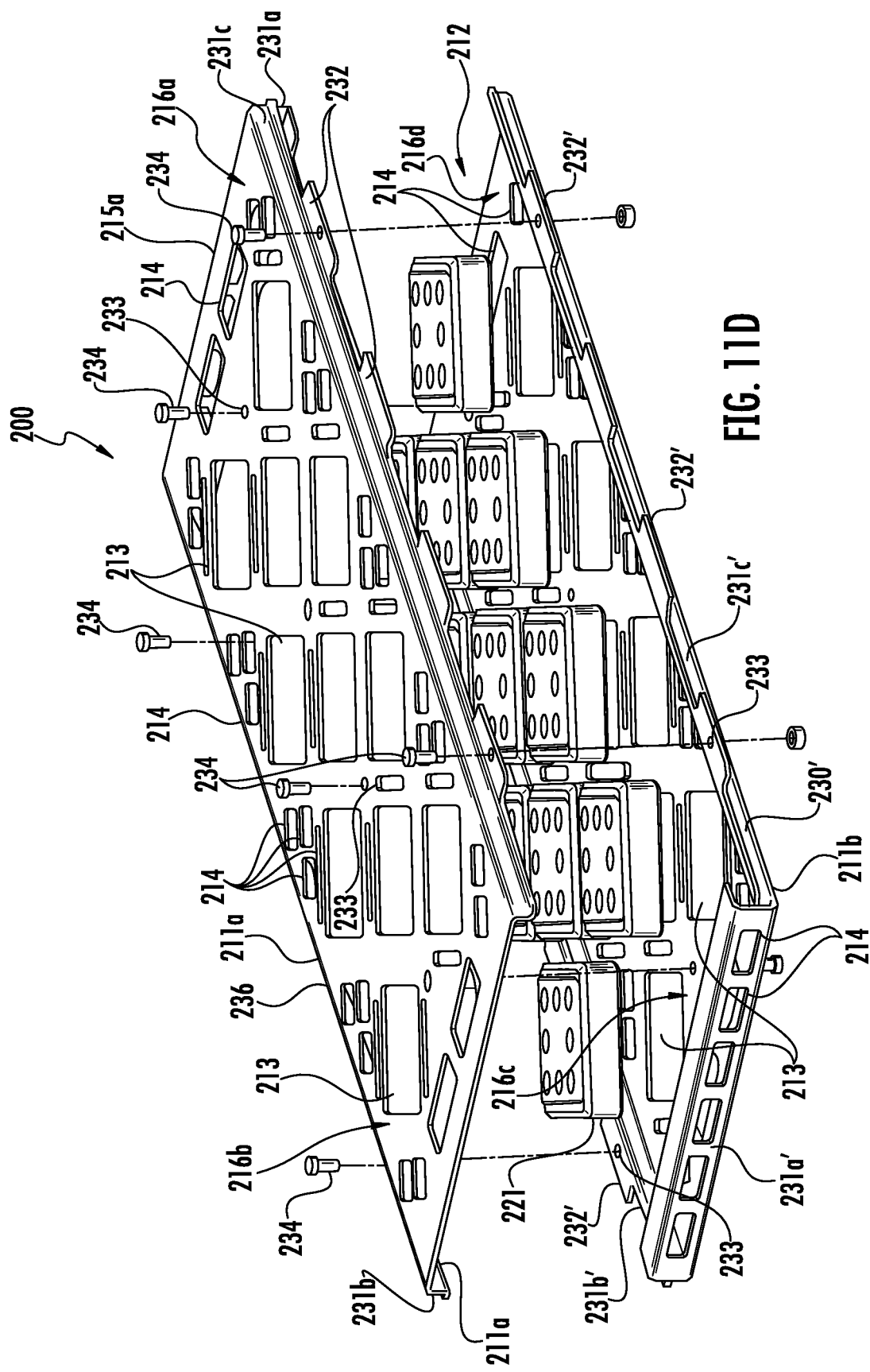
Figure 12:
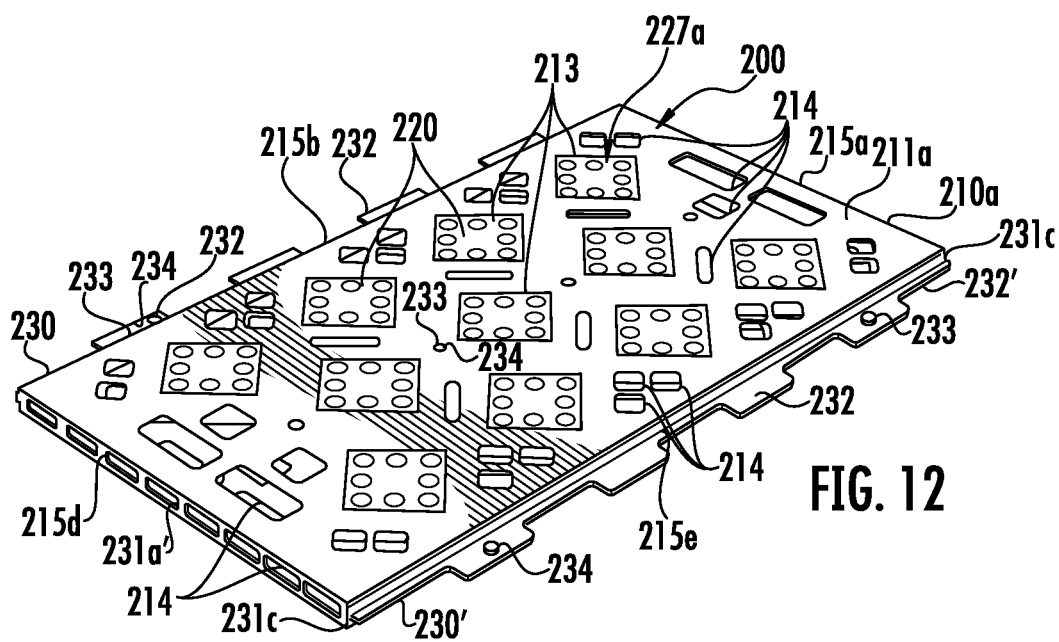
FIG. 12 is a perspective view of a radiant tray according to various embodiments.

FIG. 12 illustrates a radiant tray 200 similar to the radiant tray 200 described with respect to FIGS. 11A-11D but having a different arrangement of vent ports 214 that includes fewer elongated non-aligning vent ports 214. Other arrangements may also be used. In various embodiments, the housing may be configured such that there are no aligning vent ports 214 or aligned vent ports 214 are not positioned over flame ports of the gas burners 120 when the tray 200 is positioned in the firebox 130 (see, e.g., FIG. 1B). The housing 210 may also include vent ports 214 defined through one or more sides 215a, 215b, 215c, 215d.

As introduced above, the housing 210 defines a cavity 212 for housing radiant materials. In the illustrated embodiment, the radiant materials comprise tiles 220 generally constructed from refractory ceramic materials. However, other suitable radiant materials may also be used alone or in combination with refractory ceramic materials. In the illustrated embodiments, a plurality of tiles 220 are stably positioned within the housing 210; however, in some embodiments, a larger single tile may be used.

Figure 13:
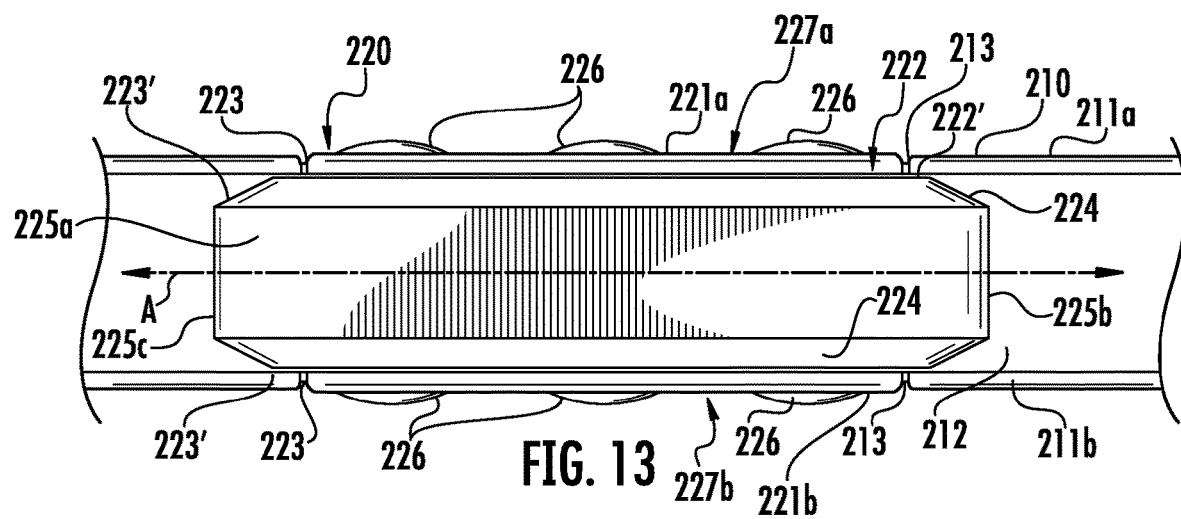
FIG. 13 is a magnified cross-section of a radiant tray showing housing walls retaining a tile according to various embodiments.

With further reference to FIG. 13, showing a cross-section of a housing 210 stably retaining a tile 220 within the cavity 212 between corresponding tile slots 213, the tiles 220 include a generally planar body having first and second generally planar ends 221a, 221b. The tiles 220 may be sized such that their length and width dimensions across the ends 221a, 221b prevent the tiles from being removed from the cavity 212 through the tile slots 213. The tiles 220 and tile slots 213 may also be dimensioned such that at least of portion 227a of the first end 221a, at least a portion 227b of the second end 221b, or both are exposed through the tile slots 213 when graspes between the walls 211a, 211b. For example, FIGS. 11A-12 show arrangements wherein the majority of the surfaces along each of the first and second ends 221a, 221b of the tiles 220 are exposed through the tile slots 213. The first and second ends 221a, 221b may also cooperate with the respective first and second wall 211a, 211b to provide a generally planar exterior side surfaces. A portion of the first end 221a and the second end 221b of the tile 220 may also extend beyond the exterior sides of the respective first and second walls 211a, 211b. For example, with reference to FIG. 13, and as described in more detail below, one or both ends 221a, 221b of the tiles 220 may include a raised planar surface or raised contours that extend beyond the exterior side of a wall 211a, 211b.

Figure 14A:
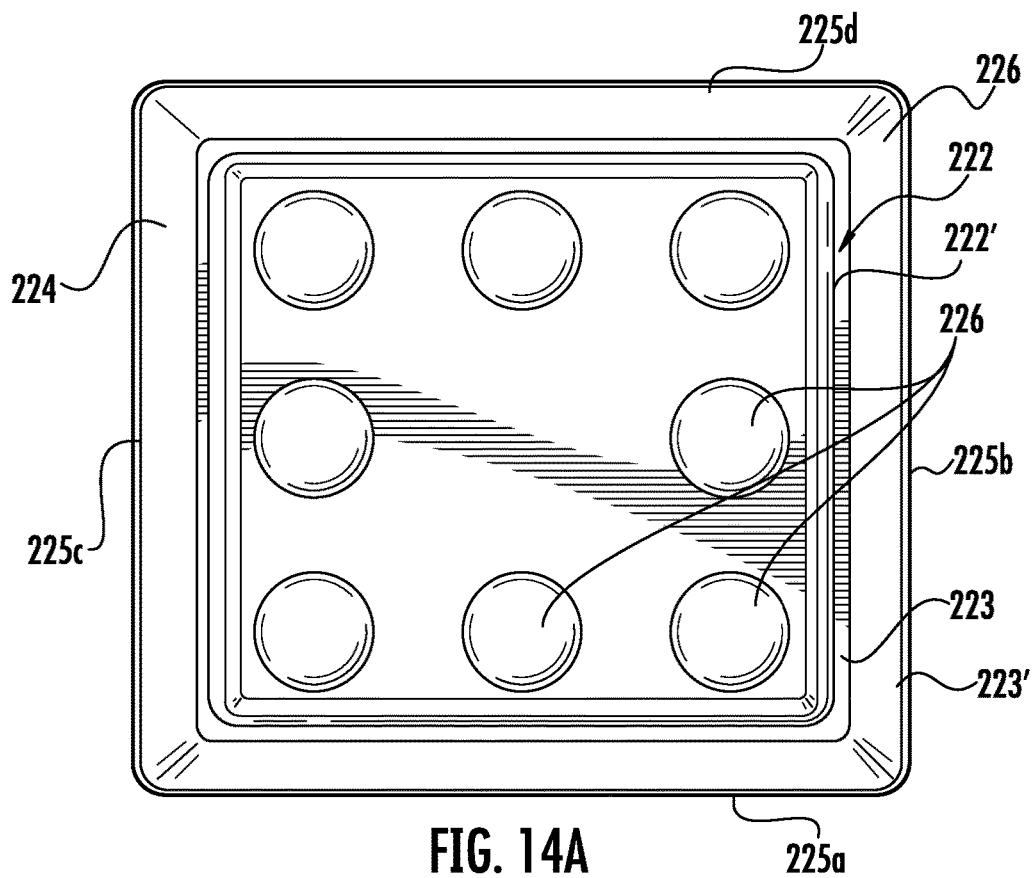
Figure 14B:
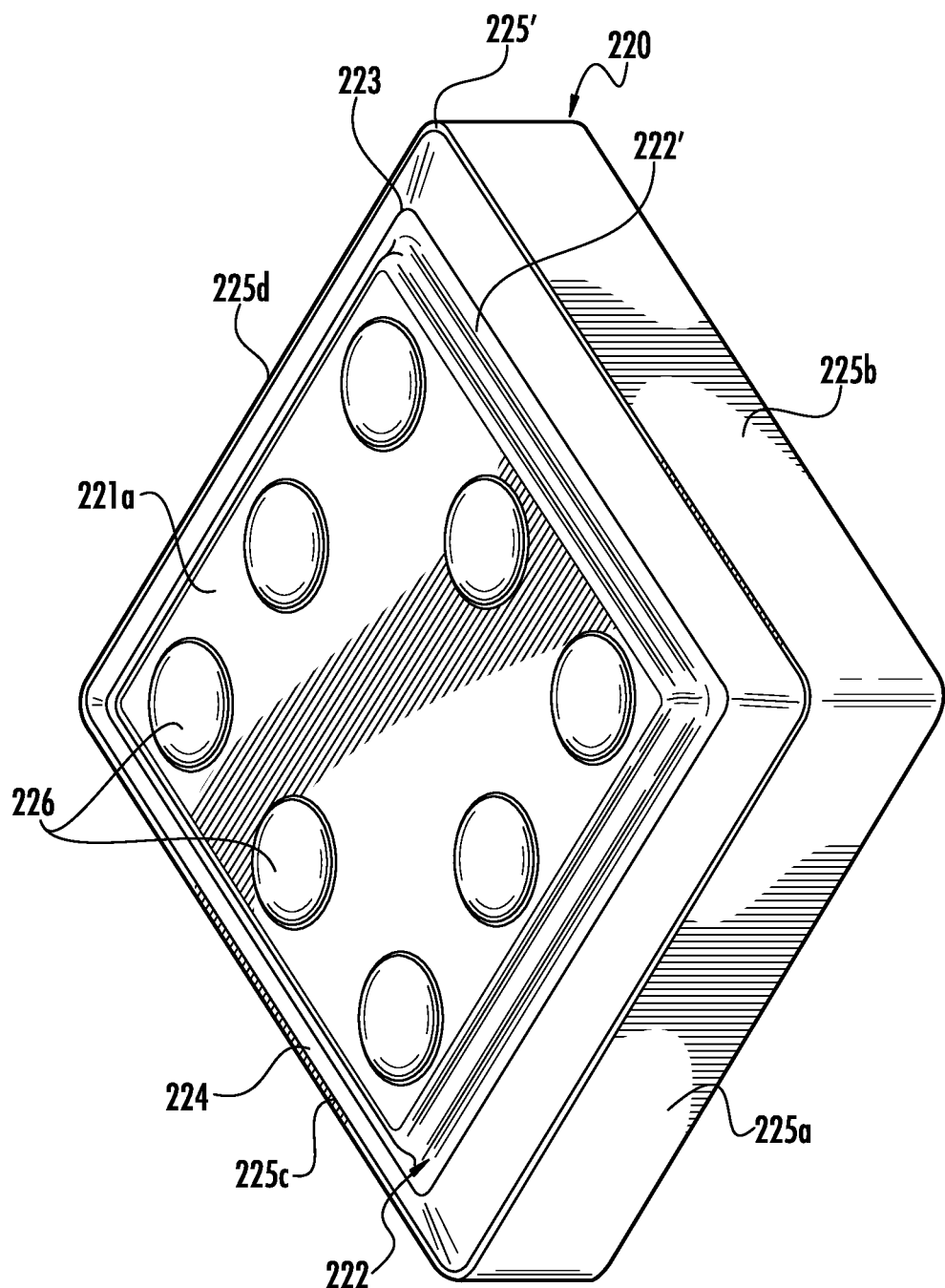

The housing 210 may also be structured to grasp tiles 220 between the wall 211a, 211b, thereby maintaining the position of the tiles 220 within cavity 212. In one aspect, tiles 220, walls 211a, 211b, or both may be dimensioned to assist in seating the tiles 220 in the cavity 212. For example, as shown in FIG. 13 and with further reference to FIGS. 14A & 14B, depicting isolated views of a tile 220, the first and second ends 211a, 211b include seating surfaces 222 positioned to engage one or more edges of the tile slots 213. The seating surfaces 222 include a recessed ledge 222' along a first perimeter 223 of each end 221a, 221b. Different or additional seating features may also be used. For example, the illustrated tile 220 also includes chamfered edges 224 that extend along an outer perimeter of recessed ledges 222' or along second perimeter 223', outside the first 223, between the first perimeter 223 and side faces of the tile 225a, 225b, 225c, 225d. The chamfered edge 224 may improve seating, e.g., by improving clearance between the perimeters 223' of ends 221a, 221b that underlie the interior side of the walls 211a, 211b, thereby limiting impact on seating caused by buildup or irregularities along interfacing surfaces of the tile 220 and the interior sides of the walls 211a, 211b. In this embodiment, the primary axis A of the tile 220 is disposed in a plane parallel with the planes of the first and second walls 221a, 221b. In other embodiments, a tile 220, wall 211a, 211b, or both may be configured to dispose the primary axis of a tile 220 in a plane that is not parallel with the planes of the first and second walls 211a, 211b. The tiles 220 shown in this embodiment have a quadrilateral profile or cross-section, e.g., rectangular or square; however, in some embodiments, tiles 220 defining other shapes may be used, e.g., round, triangular, or other geometric or non-geometric shapes.

With reference again to FIGS. 1B-1E, in one aspect, radiant tray 200, grill 100, or both may be configured to allow convenient insertion and removability of radiant tray 200 from the firebox 130. For example, when located in the firebox 130, radiant tray 200 may be dimensioned to rest upon ledges 131a, 131b formed along respective forward and rear interior walls of the firebox 130 allowing simplified insertion and removal of the tray 200. In some embodiments, ledges 131a, 131b may be provided by flanges that protrude inwardly from the firebox 130. Ledges 131a, 131b may also be disposed along lateral sides of the firebox 130. In one embodiment, ledges 131a, 131b may also include hooks, latches, or clamps to further secure the tray 200. For example, tray 200 may snap fit into firebox 130, e.g., through incorporation of a latch.

For many grill users, cooking tasks rarely require utilization of all the available cooking space along cooking grates 140. Thus, exposure to food drippings and buildup may not be uniform along radiant tray 200. This disparate exposure may result in differential wear, efficiency, and deterioration along regions of tray 200 or a set of trays 200. Various embodiments of grills 100 and radiant trays 200 described herein may be configured to address disparate use by providing mechanisms to normalize use along the various regions of the radiant tray 200 or set of trays 200.

In one example, grill 100 is configured to selectively receive a plurality of tray modules. With reference again to FIGS. 1B-1E, three tray modules 200, 200', 200", each corresponding to a burner assembly 121, 121', 121", wherein each tray module 200, 200', 200" may be selectively inserted and removed by the user. In another or further aspect, the tray modules 200, 200', 200" may be interchangeable allowing users to swap or relocate tray modules 200, 200', 200" between the three locations. In yet another or further aspect, tray modules 200, 200', 200" may be rotatable. For example, the sides 215a, 215d of a single tray 200 or trays 200, 200', 200" in a modular set may be symmetrical or otherwise compatible for use with either side 215a, 215b located in the forward position of firebox 130.

In still yet another or further aspect, housing 210 may include a modular assembly allowing housing 210 to be opened to expose cavity 212. Housing 210 may then be opened by a user to add, remove, clean, or replace tiles 220. As most clearly shown in the exploded view in FIGS. 11D, radiant tray 200 includes a modular housing assembly according to various embodiments. In particular, housing 210 includes a first platen 230 and a second platen 230'. The first platen 230 and second platen 230' are structured to mount together to form at least a portion of cavity 212. The first platen 230 and second platen 230' are attachable wherein, when attached, first platen 230 forms first wall 211a and second platen 230' forms second wall 211b of housing 210. The first platen 230 and second platen 230' may further include or attach to one or more sidewalls 231a, 231b, 231c, 231a', 231b', 231c'.

One or more sidewalls 231a, 231b, 231c, 231a', 231b', 231c' may include a flange for providing desired mounting, spacing, or both between the platens 230, 230'. For example, as most clearly illustrated in the exploded view of FIG. 11D, flanges 232, 232' may extend from sidewalls 231b, 231c, 231b', 231c' of platens 230, 230'. Flanges 232 may be positioned to align with corresponding flanges 232' when the two platens 230, 230' are brought together for attachment.

The platens 230, 230' may be attached along one or more attachment points 233 to form the housing 210. For example, one or more of the flanges 232, 232' may include attachment points 233 for attaching joined platens 230, 230'. In the illustrated embodiment, each platen 230, 230' includes four flanges 232, 232' that define holes positioned to align with corresponding holes defined in a corresponding flange 232, 232'. Fasteners 334 such as screws or bolts may be extended through the holes to attach the platens 230, 230'. In some embodiments, alternative or additional attachment 233 points or structures may be used. For example, in the illustrated embodiments, the first and second walls 211a, 211b include corresponding holes for receiving fasteners 234 such as bolts or screws. In some embodiments, attaching the platens 230, 230' may include clamping interfacing flanges 232, 232' together, e.g., with clamps or latches disposed along the flanges 232, 232'. Accordingly, the platens 230, 230' may be attachable to form the housing 210 and therebetween grasp tiles 220 within corresponding tile slots 213 when the walls 211a, 211b are brought together. Spacing between the first wall 211a and second wall 211b may be provided by the height of the sidewalls 231a, 231b, 231c, 231a', 231b', 231c', flanges 232, 232', or combination thereof. In some embodiments, the housing 210 may include spacers locatable within the interior cavity 212 to provide desired spacing. Spacers may be used instead of, or in combination with, sidewalls 231a, 231b, 231c, 231a', 231b', 231c' or flanges 232, 232'.

While various features may be described herein with respect to walls 211a, 211b or platens 230, 230' it is to be understood that such features may be similarly applicable to modular housing configurations employing platens 230, 230', as described herein, or more generally as applied to walls 211a, 211b.

As noted above, grease and debris from food may deposit on the surfaces of the tiles 220 and walls 211a, 211b, slowly reducing the radiant efficiency of the tray 200. However, in one aspect, a radiant tray 200, grill 100, or both may be configured for double sided operations. In some embodiments, for example, the tray 200 may have dimensional symmetry about a common or central plane between the first wall 211a and second wall 211b to support inverted (or "flipped") use of the tray 200.

Walls 211a, 211b may be symmetrical such that housing 210 may be flipped to flip the direction walls 211a, 211b and ends 221a, 221b of the tiles face. When flipped, tiles 220 may be positioned at a location within firebox 130 that was occupied by another tile 220 prior to housing 210 being flipped. In one example, such as the embodiments shown in FIGS. 11A-12, tile slots 213 align between first and second walls 211a, 211b and, when the housing 210 is inverted, the tile slots 213 through the first wall 211a position at the same relative locations as the tile slots 213 through the second wall 211b prior to inversion of the housing 210. The tile slots 213 through the second wall 211b similarly position at the same relative locations as the tile slots 213 through the first wall 211a prior to inversion. In some embodiments, such symmetry may require or further include 180 degree rotation of housing 210 with respect to the forward and rear of grill 100. In some embodiments, platens 230, 230 may be square and support inversion and one or more of 90 degree, 180 degree, 270 degree rotation. In one such example, the location of the location of the tiles slots 213 in both the first wall 211a and second wall 211b are symmetrically positioned to provide the same tile slot 213 configuration and tile 220 positioning in each inverted and rotated orientation. In any event, when configured for invertible use, the radiant tray 200 permits selective use of either wall 211a, 211b in an upward or downward facing orientation.

In some examples, each wall 211a, 211b may have one or more of lateral (side-to-side) or longitudinal (end-to-end) reflection symmetry with respect to tile slots 213, vent slots 214, or both. One or more of the tile slots 213, vent slots 214, or both along each wall 211a, 211b of some such examples may align, be partially offset, or completely offset. For example, each of the first and second walls 211a, 211b of radiant tray 200 shown in FIGS. 11A-11D have longitudinal and lateral symmetry with respect to tile slots 213 and longitudinal symmetry with respect to vent ports 214. Both walls 211a, 211b may be the same wherein the first wall 211a is inverted and flipped 180 degrees when joined with the second wall 211b. Thus, a user may flip the radiant tray 200 to expose the first wall 211a, which may have been previously exposed to the underside of the food supporting grid 140, to the direct heat and flames above the burners 120. When the residue is exposed more directly to the flames following inversion, the residue may rapidly transform by pyrolysis into porous carbonaceous residue. This residue is more easily scrapped or brushed away from the generally planar surface of the tiles 220 and walls 211a, 211b, e.g., platens 230, 230', with wire brushes as pyrolysis reduces the adhesion of the residue. Accordingly, while radiant tray 200 may eventually collect such food residue, the tray 200 is configured for easier cleaning without downtime of the grill 100 by periodically flipping radiant tray 200. As described in more detail below, the surface of the platens 230, 230' may be generally co-planar with surfaces at ends 221a, 221b, except for one or more raised surface features, such as dimples 226 (e.g., FIGS. 11C & 13), along the tile surfaces. Such surface features may breakup the planar surface reducing the ability of residues to tightly adhere to the surface or enhance the ability to remove residues adhered between the planar surface and the surface features. For example, raised surface features may prevent formation of uniform layers adhering across the surface. Breaking the planar surface with surface features may make it easier to clean residue from the platens 230, 230' and tiles 220 with fewer strokes of a wire brush. Surface features may also be sized to not impede the movement of the brushes or efficiency of the wires. For example, surface features may have smooth edges or transitions across their surfaces, e.g., arcuate or spherical profiles.

Thus, in various embodiments, a radiant tray 200 may be adapted for receiving a plurality of tiles 220. The tiles 220 may be mountable between platens 230, 230' and one or more ends 221a, 221b of the tiles 220 may be exposed when stably positioned within the housing 210. The tray 200 may be one or more of interchangeable with adjacent trays 200', 200", configured for double sided use, rotatable, flippable, or any combination thereof.

In one aspect, tiles 220 may include one or more contoured surfaces dimensioned to reduce the ability of residue to adhere thereto or ease removal of residue. For example, as most clearly shown in FIGS. 13-14B, the generally planar first and second ends 221a, 221b of a tile 220 may include small convex dimples 226 positioned to break up the charred residue of drippings, a porous carbonaceous residue, into smaller regions that are less likely to adhere to the metal and ceramic. As a result, it may be easier to periodically remove residue and improve radiant efficiency. The dimples 226 shown are rounded and spherically raised; however, in other embodiments, dimples 226 may include other shapes, e.g., square, rectangular, or other geometric or non-geometric shapes. Various embodiments may include other or additional contours along the first end 221a, second end 221b, or both such as concave dimples, grooves, ridges, wave patterns, cross-hatching, etc. Additional or fewer dimples may also be used.

In the embodiments illustrated in FIGS. 1B-1E & 11A-13, the tiles 220 are stably positioned within the cavity 212 in a generally parallel orientation with respect to the housing 210 and walls 211a, 211b thereof. That is, the central plane A extending through the thickness dimension of the tiles 220 extends generally parallel to a central plane extending through the thickness dimension of the housing 210. The illustrated tiles 230 are also generally symmetrical with respect to the central plane A, and, when mounted in the housing 210, the first end 221a of each tile locates within or faces a tile slot 213 defined by the first wall 211a and the second end 221b of each tile 220 locates within or faces the corresponding tile slot 213 defined by the second wall 211b. However, in various embodiments, the radiant tray 200 may be configured to stably position tiles 220 at non-parallel angles. Some radiant trays 200 may be configured to stably position tiles 220 at parallel as well as non-parallel angles. In these or other embodiments, tiles 220 may lack symmetry with respect to central plane A.

With reference to FIGS. 15A-18B, in one aspect, the radiant tray 200, tiles 220, or both may be configured to stably position tiles 220 such that a first portion 227a, 227b of each end 221a, 221b protrudes through the same tile slot 213 of the first wall 211a and a second portion 228a, 228b of each of the first end 221a and the second end 221b protrude through the corresponding tile slot 213 of the second wall 211b. In various embodiments, the central plane A of one or more tiles 220 mounted at a non-parallel angle may be disposed at an angle between 30 and 150 degrees with respect to the central plane of the housing 210, the exterior surface of the first or second wall 211a, 211b, or any combination thereof. The central plane A of the tiles 220 may be parallel to each other, as shown in the illustrated embodiment, or one or more tiles may be positioned at non-parallel angles to each other.

The radiant trays 200 shown in FIGS. 15A-17 may be similar to the radiant tray 200 described above with respect to FIGS. 11A-13. For example, the housing 210 may include a first wall 211a and a second wall 211b, each defining a plurality of tile slots 213 and vent ports 214. The radiant tray 200 is generally symmetrical to support modular, rotatable, and flippable positioning within the firebox 130, as described above. The radiant tray 200 also comprises a modular assembly including a first platen 230 comprising the first wall 211a and a second platen 230' comprising the second wall 211b. The first and second platens 230, 230' include corresponding flanges 232, 232' that interface for attachment of the platens 230, 230' to form the housing 210. Holes are formed through the flanges 232, 232' and platens 230, 230' for insertion of fasteners 234, such as screws or bolts.

Figure 15A:
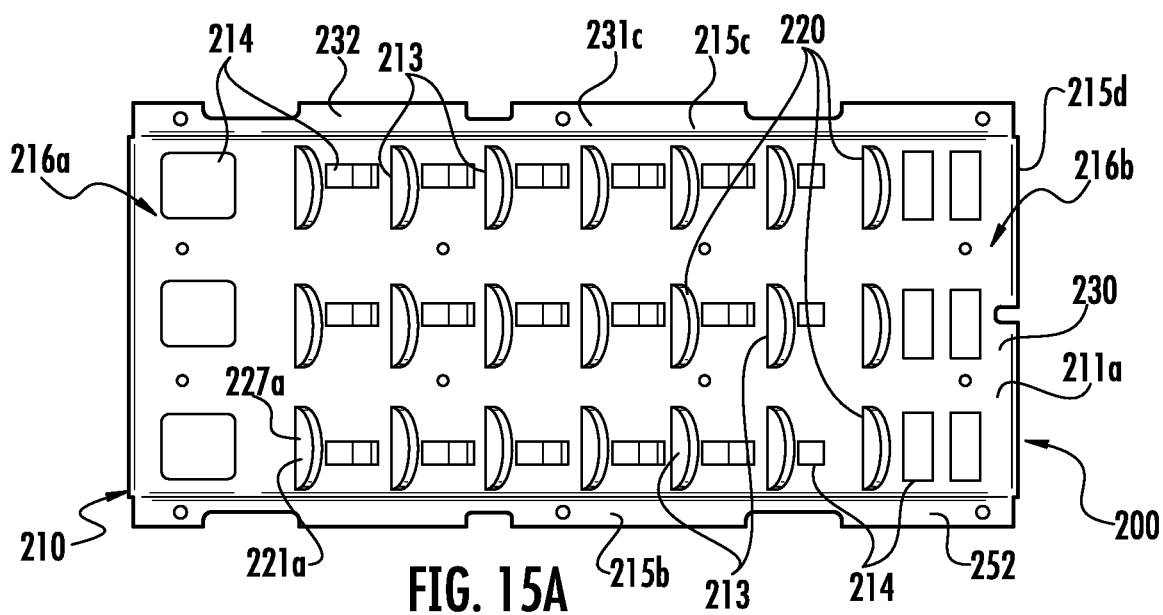
Figure 15B:
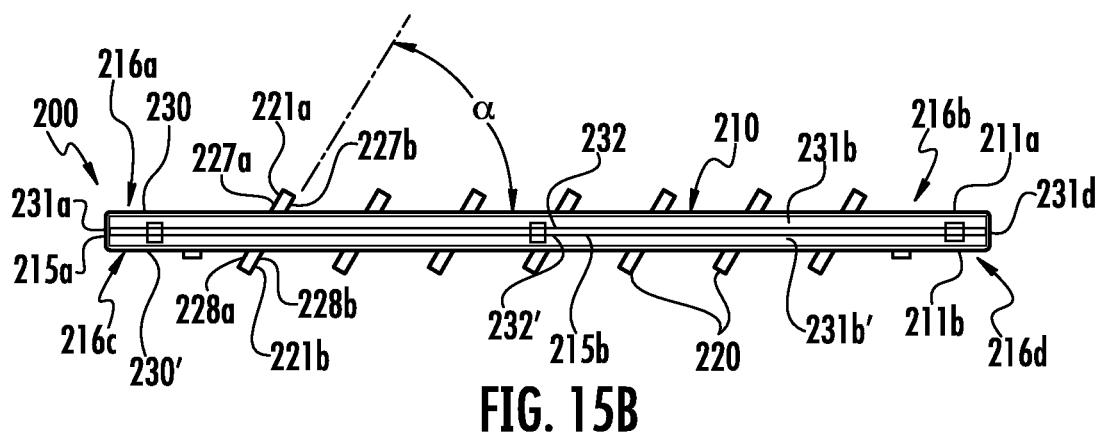
Figure 15C:
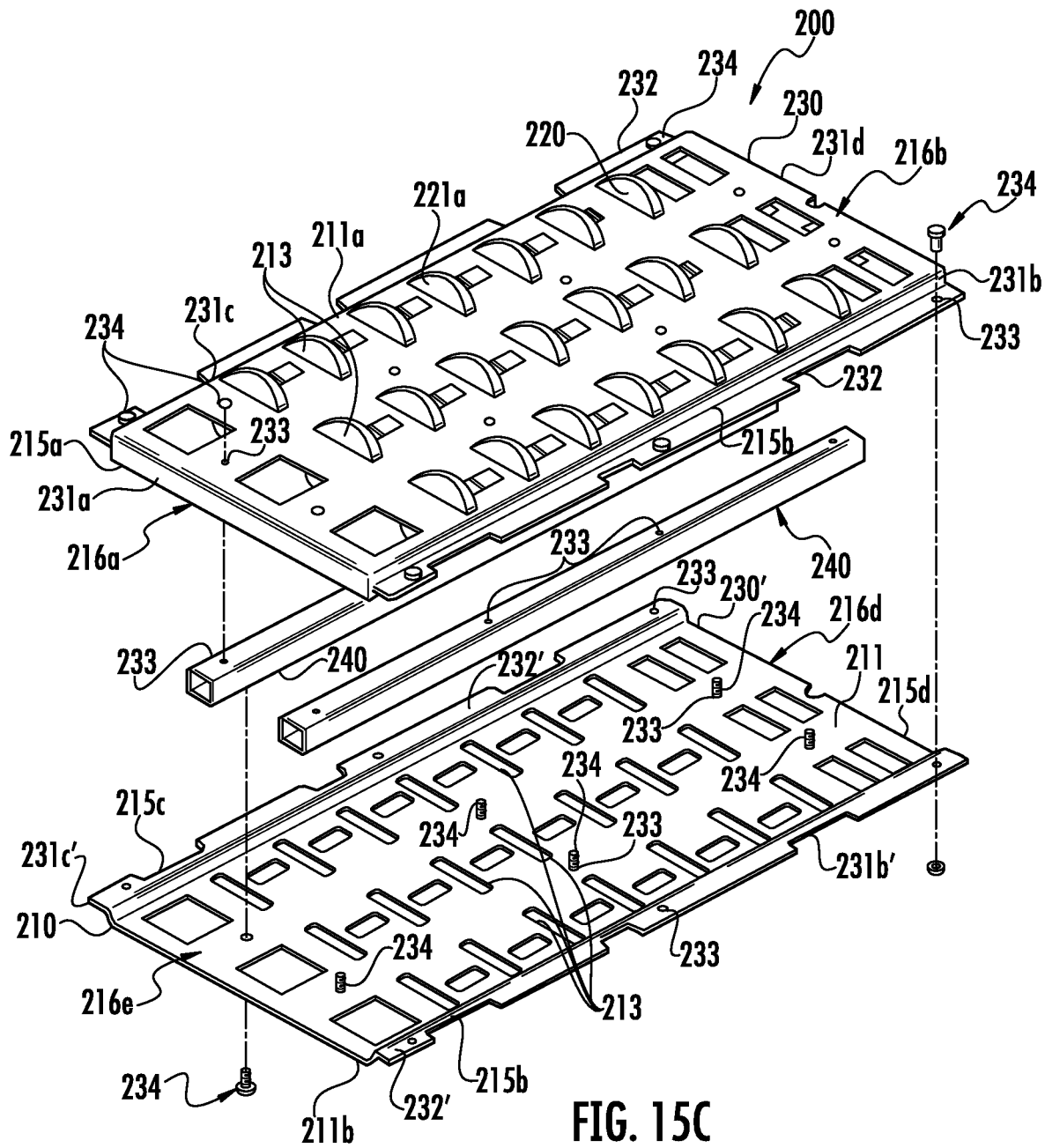
FIG. 15C is an exploded perspective view.

In some embodiments, the radiant tray 200 includes spacers between platens 230, 230' to maintain a desired spacing between the first wall 211a and second wall 211b. For example, FIG. 15C illustrates an embodiment of the radiant tray 200 shown in FIGS. 15A & 15B that employs spacers 240, 240' located between the platens 230, 230' within the interior cavity 212 of the housing 210 between the first wall 211a and the second wall 211b. Attachment points 233, 233' comprising holes are located along the first and second walls 211a, 211b and the spacers 240, 240' for insertion of fasteners 234, e.g., screws or bolts, to attach the spacers 240, 240' within the housing 210.

Figure 16:
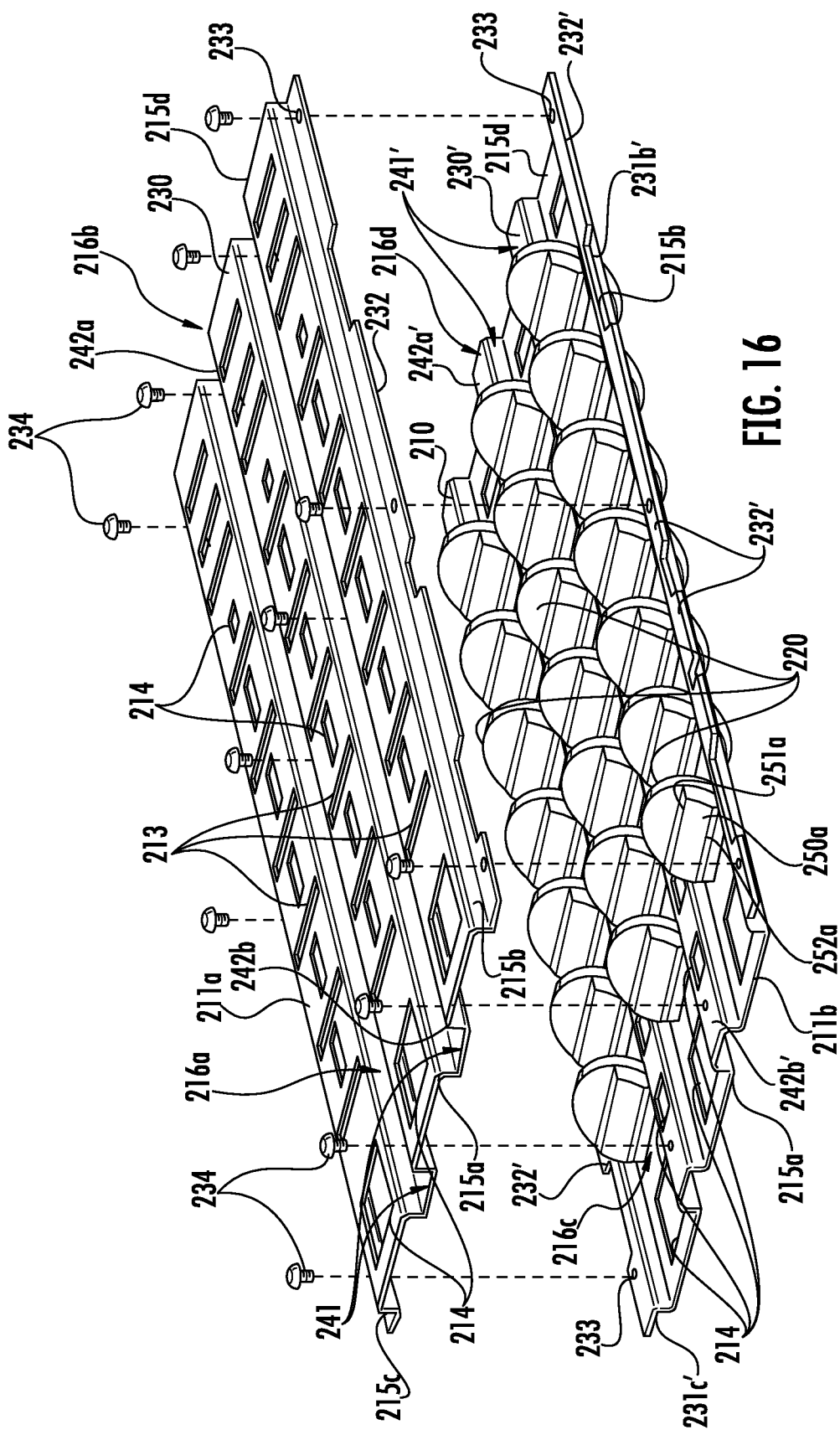
FIGS. 16 is an exploded perspective view of a radiant tray according to various embodiments.

In one embodiment, at least one platen 230, 230' is dimensioned to include a profile forming an integrated spacer along a central region of the platen 230, 230' configured to space apart the platens 230, 230' when attached. For example, FIG. 16 illustrates an embodiment of a radiant tray 200 comprising at least one integrated spacer 241, 241' along a central region of one or both platens 230, 230'. The radiant tray 200 shown in FIG. 16 is configured to grasp tiles 220 at oblique angles, similar to the tray 200 shown in FIGS. 15A-15C and further include attachable platens 230, 230' to grasp tiles between tile slots 213 and vent ports 214 for venting, as described above with respect to FIGS. 11A-12 and FIGS. 15A-15C. Also similar to the trays 200 shown in FIGS. 11A-12 and FIGS. 15A-15C, the radiant tray 200 shown in FIG. 16 includes sidewalls 231b, 231b', 231c, 231c' structured to space apart platens 230, 230' when attached. Such sidewalls 231b, 21b', 231c, 231c' may therefore function as integrated spacers. Each platens 230, 230' in FIG. 16 also includes integrated spacers 240, 240' between sides 215b, 215c and ends 215a, 215d comprising two central ridges 242a, 242a', 242b, 242b' extending along the length of the platen 230, 230'. The ridges 242a, 242a', 242b, 242b' form grooves along the planar outer surfaces of the walls 211a, 211b and include vent ports 214 along the bases of the grooves. Attachment holes 233 are also defined through the bases of the grooves for receiving attachment members 234 such as screws or bolts. In other embodiments, the planar outer surfaces of the walls 211a, 211b are not broken-up by grooves. For example, ridges 242a, 242a', 242b, 242b' may be enclosed along the planar surface of the walls 211a, 211b. In this or another example, integrated spacers 240, 240' include one or more extensions from the underside of the wall 211a, 211b that interface with one or more extensions or the underside of the opposing wall 211a, 211b to space apart the platens 230, 230'. The overlying surface of wall 211a, 211b may be planar or non-planar.

In some embodiments, integrated spacers 240, 240' comprising ridges or extensions from one or both walls 211a, 211b may extend along all or a portion of the length or width of the platen 230, 230'. The integrated spacers 240, 240' may correspond when the platens 230, 230' attach, e.g., as shown in FIG. 16; however, in some embodiments, one or more integrated spacers 240, 240 do not interface with each other but rather interface with the planar platen surface.

With continued reference to FIGS. 11A-12 & 15A-16, the vent ports 214 define square and rectangular profiles; however, in other embodiments, vent ports 214 may define other profile shapes such as rounded, oblong, quadrilateral, geometric, or non-geometric shapes. The vent ports 214 defined along end 216a and end 216b of the first wall 211a are positioned to substantially align with vent ports 214 defined along end 216c and end 216d of the second wall 211b. Additional vent ports 214 defined in the second wall 211b between the tile slots 213 are partially offset with respect to the vent ports 214 positioned between the tile slots 213 along the first wall 211a. Three of the vent ports 214 positioned between the tile slots 213 most proximal to the end 216b of the first wall 211a are smaller than the three corresponding partially offset vent ports 214 defined along the second wall 211*b*. The aligned vent ports 214 along ends 216*a*, 216*b*, 216*c*, 216*d* of the walls 211*a*, 211*b* define larger areas than the partially offset vent ports 214 positioned between the tile slots 213. In other embodiments, some or all the vent ports 214 may be aligned, partially offset (including corresponding vent ports 214 having different sized or shaped profiles), completely offset, or combination thereof.

The housing 210 defines staggered tile slots 213 along the first wall 211*a* and second wall 211*b* sized to grasp tiles 220 at oblique angles. The degree of staggering, size, or both may be varied to change the angle in which tiles 220 may be grasped. Tiles 220 may also be structured to be stably positioned at a particular angle or range of angles. For example, tiles 220 may include structures such as protrusions, ridges, grooves, slots, etc. that may engage edges of the tile slots 213, wedge between the interior surfaces of the first and second platens 230, 230', or prevent the tiles 220 from being removed from the housing 210 through the tile slots 213.

Figure 17:
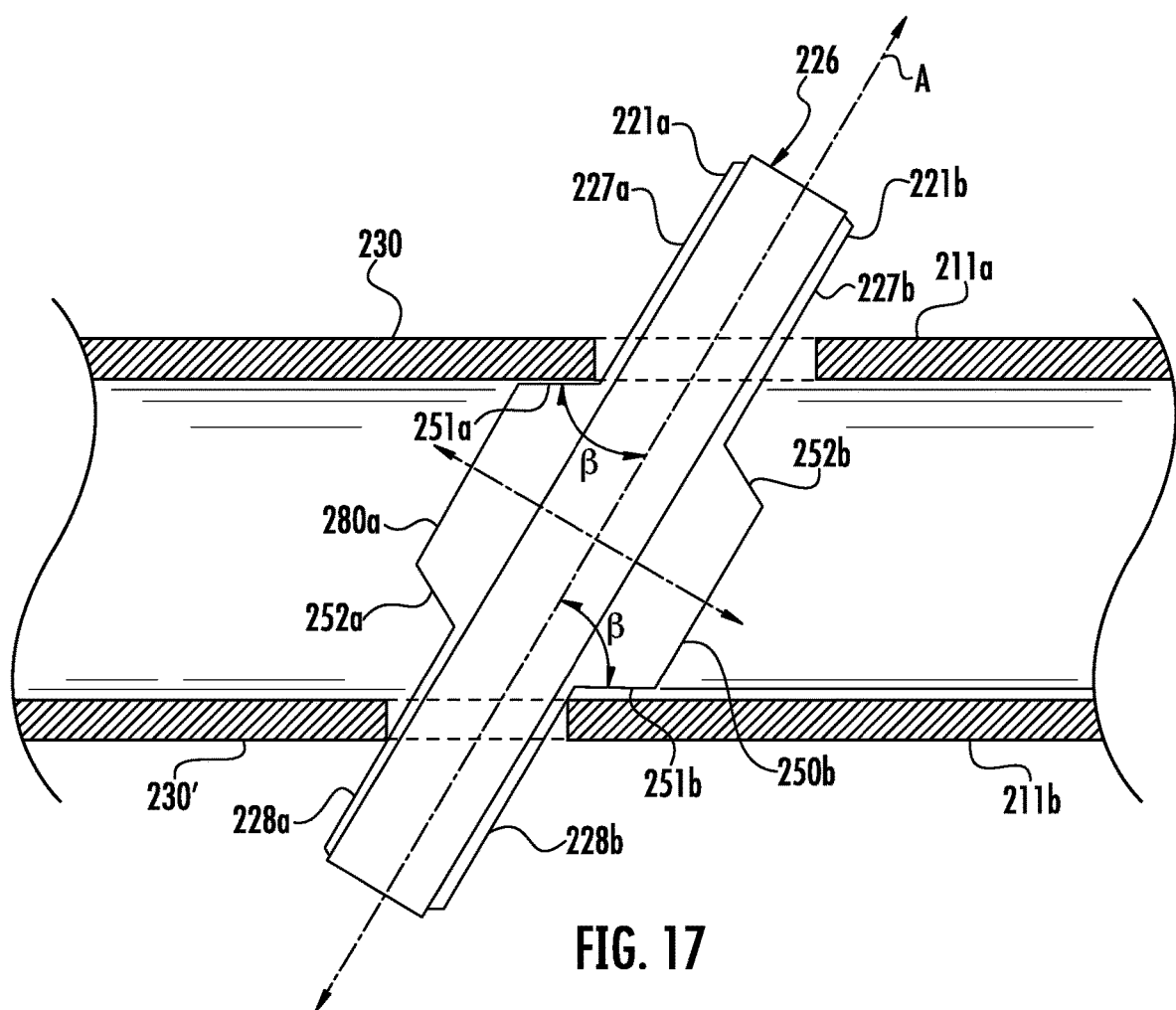
FIG. 17 illustrates a magnified cross-section of a radiant tray showing housing walls retaining a tile according to various embodiments.
Figure 18A:
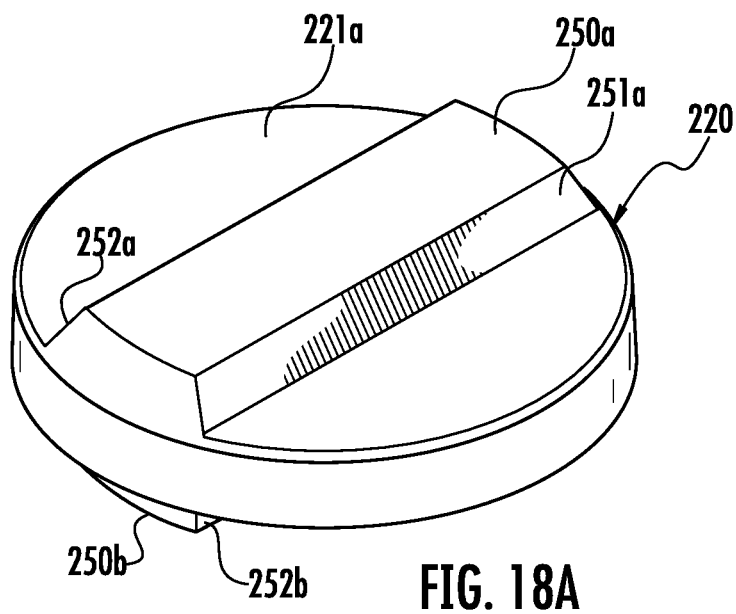
FIGS. 18A & 18B illustrate various views of a tile according to various embodiments, wherein FIG. 18A a perspective view
Figure 18B:
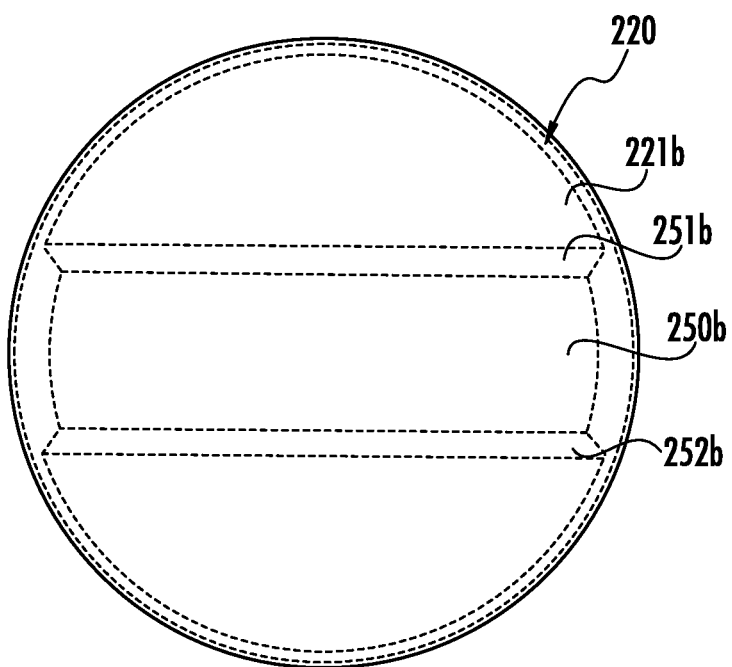

In the illustrated embodiment, and with further reference to FIGS. 17-18B, tiles include lateral ridges 250*a*, 250*b* that extend across the tile diameter along the surfaces at each end 221*a*, 221*b* of the tile 220. The ridges 250*a*, 250*b* are dimensioned to interface with the edges of the tile slots 213 along the interior side of the walls 211*a*, 211*b*. For example, the ridge 250*a* at the first end 221*a* of the tile includes a face 251*a* positioned to interface with an interior side of the first wall 211*a* and the ridge 250*b* along the second end 211*b* of the tile 230 includes a face 251*b* positioned to interface with an interior side of the second wall 211*b*. Faces 251*a*, 251*b* extend along parallel planes and at face angles β from the central plane A of the tile 220, which may define the angle at which the tile 220 is grasped. The faces 251*a*, 251*b* are also generally directed in opposite directions. In the illustrated embodiment, the face angle β of both faces 251*a*, 251*b* are approximately 60 degrees (+/−2 degrees) to provide a corresponding approximately 60 degree (+/−2 degree) tile angle α when grasped by the housing 210. Thus, the orientation of the tile 220 may be flipped.

Each ridge 250*a*, 250*b* also includes a second face 252*a*, 252*b*. The second face 252*a*, 252*b* may provide a second angle for positioning of the tile 220, e.g., rotating the orientation of the tile 220. In the illustrated embodiment, the second faces 252*a*, 252*b* extend at a similar angle as the first faces 251*a*, 251*b* with respect to the central plane A of the tile 220 and face generally opposite directions. Other face angles β may be used, including faces 251*a*, 251*b* being positioned at a different face angle β than faces 252*a*, 252*b*. Such an arrangement may allow the tile 220 to be rotated and grasped at a different angle, providing an alternative tile angle α. Thus, faces 251*a*, 251*b* may extend along parallel planes and be angled relative to respective tile surfaces or central plane A of the tile to position the tile 220 at a first oblique angle in a first orientation and faces 252*a*, 252*b* may extend along parallel planes and be angled relative to respective tile surfaces or central plane of the tile to position the tile 220 at a second oblique angle in a second orientation. The first and second oblique angles may be the same or different. In one embodiment, tile slots 213 may be wider to accommodate grasping tiles at different angles. Tiles 220 having faces 252*a*, 252*b* positioned at a second angle that is different than the first angle of faces 251*a*, 251*b* may also be used with a second set of platens or another platen attached to one of platens 230, 230' to provide a different staggered relationship between the corresponding tile slots 213 in order to grasp tiles at angles provided by the second angle of faces 252*a*, 252*b*.

The tiles 220 shown in this embodiment have a round profile or cross-section; however, in some embodiments, tiles 220 defining other shapes may be used, e.g., rectangular, square, geometric, or non-geometric shapes. It will be understood that other platen 230, 230' configurations may be used to form the housing 210. In one embodiment, the platens 230, 230' may not include flanges 232, 232' and the platens 230, 230' may form the housing 210 by compression against the tiles 220 using bolts, clamps, or other suitable manner of attachment adjacent to the tiles 220. Platens 230, 230' may attach to spacers 240, each other, or both. In one embodiment, platens 230, 230' are attached along one side by a hinge allowing the platens 230, 230' to be opened and closed like a butterfly. The platens 230, 230' may then be retained in the closed position using bolts, clamps, or other suitable structures along the perimeter, e.g., flanges 232, 232', or along the walls 211*a*, 211*b*.

While the illustrated radiant trays 200 are rectangular, in other embodiments, the housing 210 may include first and second generally planar sides 211*a*, 211*b* defining other shapes such as square, round, oblong, geometric, and non-geometric shapes. Tiles 220 may similarly include shapes other than square or rectangular. For example, tiles 220 may have first and second generally planar sides having rounded, oblong, or other geometric, or non-geometric shapes. In one embodiment, one or both of the first and second ends 221*a*, 221*b* may be non-planar. For example, one or both ends 221*a*, 221*b* may have pyramid or conical dimensions that extend through the tile slots 213 and protrude outward of the housing 210.

Figure 19:
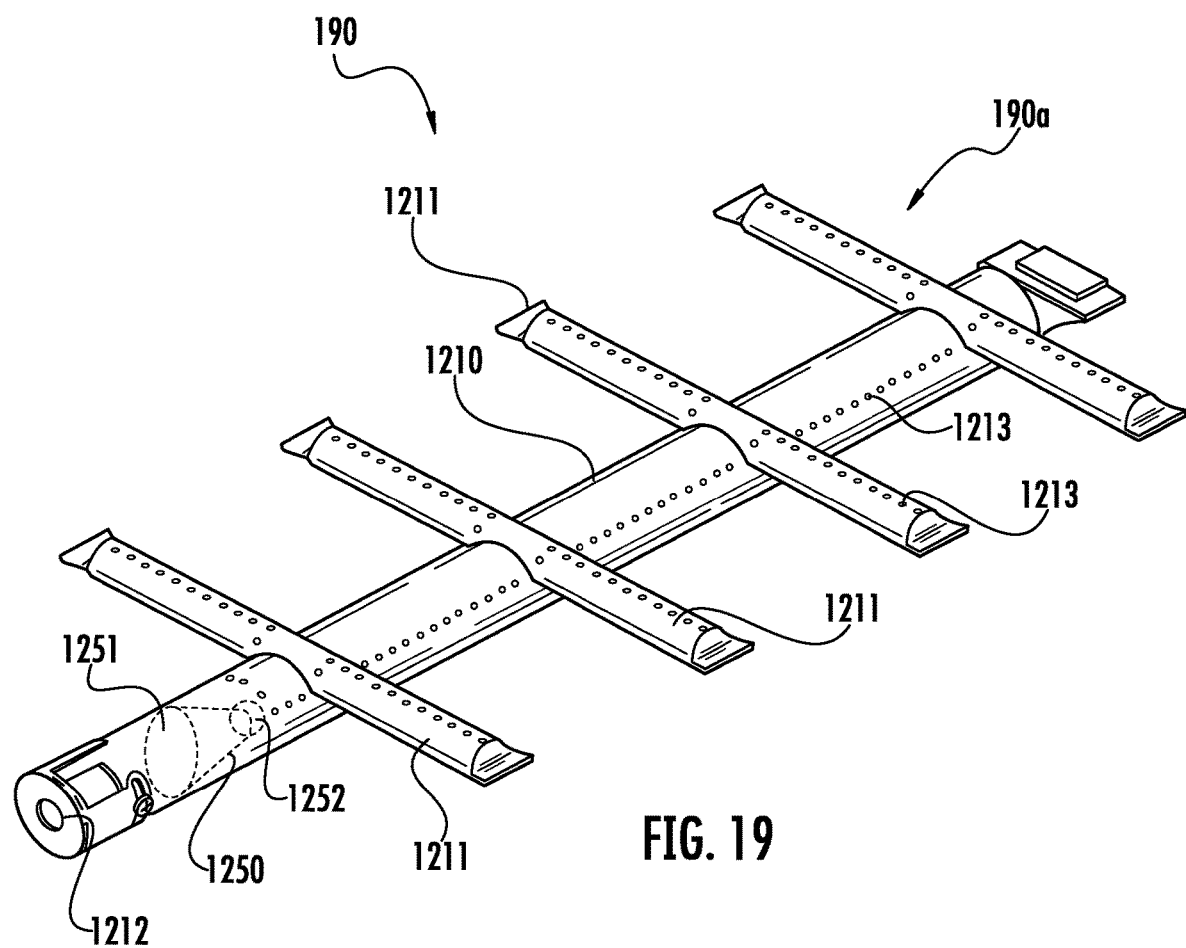
FIG. 19 is a perspective view of a preferred embodiment of a burner manifold.
Figure 20A:
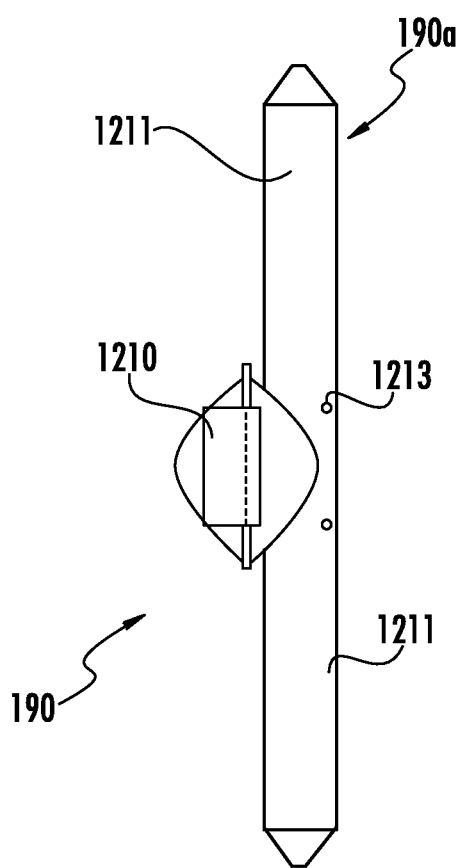
FIGS. 20A & 20B are front and back elevation views of the views of the burner assembly of FIG. 11.
Figure 20B:
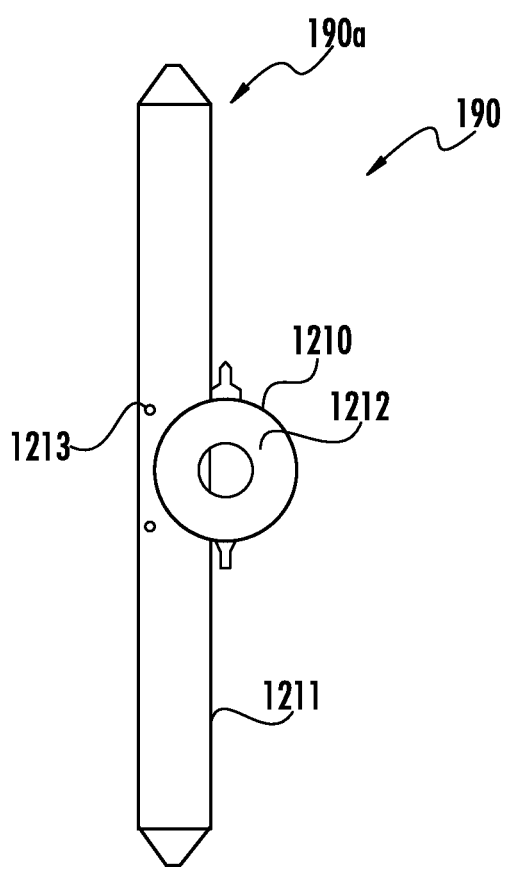

FIGS. 19-20B illustrate an improved gas burner assembly 190. Gas burner assembly 190 may be positionable in firebox 130 and operable to receive a supply of combustible gas. Burner assembly 190 includes a stem 1210 and a plurality of side branches 1211 extending from opposing sides of stem 1210. The side branches 1211 may orthogonally insect the stem 1210 along a central portion of each branch 1211 to extend approximately a same distance from the stem 1210 in two directions. An inlet 1212 is positioned at a first end of stem 1210 through which combustible gas may be delivered into a flow path defined within stem 1210. The flow path extends from the inlet 1212 to an internal venturi 1250 to accelerate combustible gas through the flow path along stem 1210 and side branches 1211.

Internal venturi 1250 includes a mouth 1251 downstream from the inlet 1212 and a restriction orifice 1252 downstream from the mouth. The internal venturi 1250 defines a progressively decreasing volume between the mouth 1251 and the restriction orifice 1252. Stem 1210 and side branches 1211 may each define a plurality of holes 1213 along the flow path to provide exit ports for combustible gas to escape burner assembly 190 as flame. Gas burner assembly 190 may comprise a gas burner manifold 190*a*. In some embodiments, gas burner assembly 190 may include multiple gas burner manifolds 190*a* each including a modular stem 1210 and having a plurality of side branches 1211. For example, with further reference to FIG. 1E, the gas burner assembly 190 includes three burner manifolds 190*a*, 190*b*, 190*c*, each including a stem 1210 and a plurality of side branches 1211. In some preferred embodiments, the grill construction within the firebox 130 is modularized in that each of 2 or more gas burner manifolds 190*a*, 190*b*, 190*c* corresponds to a laterally overlying combination of a radiant tray 200, 200', 200" and a food support module 141, 141', 141", as illustrated in FIG. 1E for example.

In further preferred embodiments, with reference to FIG. 21, any of 2 or more gas burner manifolds 190*a*, 190*b*, 190*c* and radiant trays 200, 200', 200" may be selectively removed and replaced with an IR burner module 180a, which may be similar to IR burner 180. IR burner module 180a may be positioned in firebox 130 in an upward facing orientation to provide the corresponding overlaid food support module 141" as a location along the food support region 108 for quickly searing food with very high heat. In such a location the food may be simultaneously seared on both sides by the downward facing IR burner 180, as well as the upward facing IR burner 180a, which has been inserted in firebox 130 in place of the combination radiant tray 200 and gas burner module 190c shown in FIG. 1E. The food disposed between the IR burners 180a, 180 may also be supported on upper food support grate 140b. The upper food support 140b may be selectively lowered on bracket 122, as described above, to generally dispose the food equidistant from each IR burner 180a, 180 and hence sear both sides at the same time to obtain a more even cooking and heat penetration.

Figure 22B:
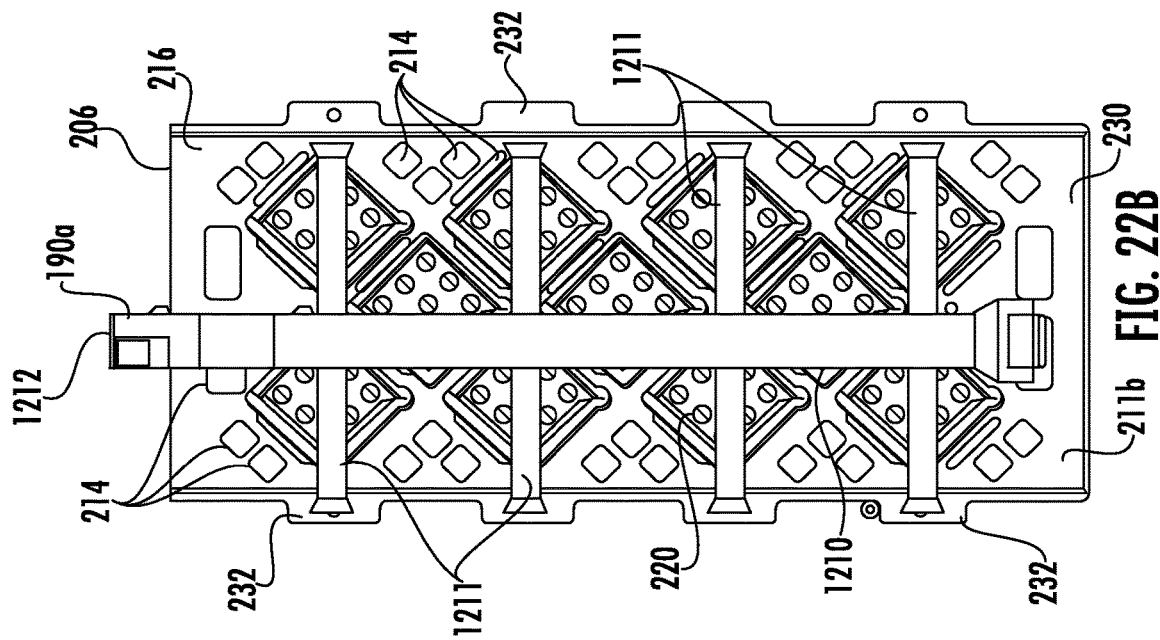
FIGS. 22A & 22B illustrates bottom views of radiant trays positioned over gas burner manifolds according to various embodiments.
Figure 22A:
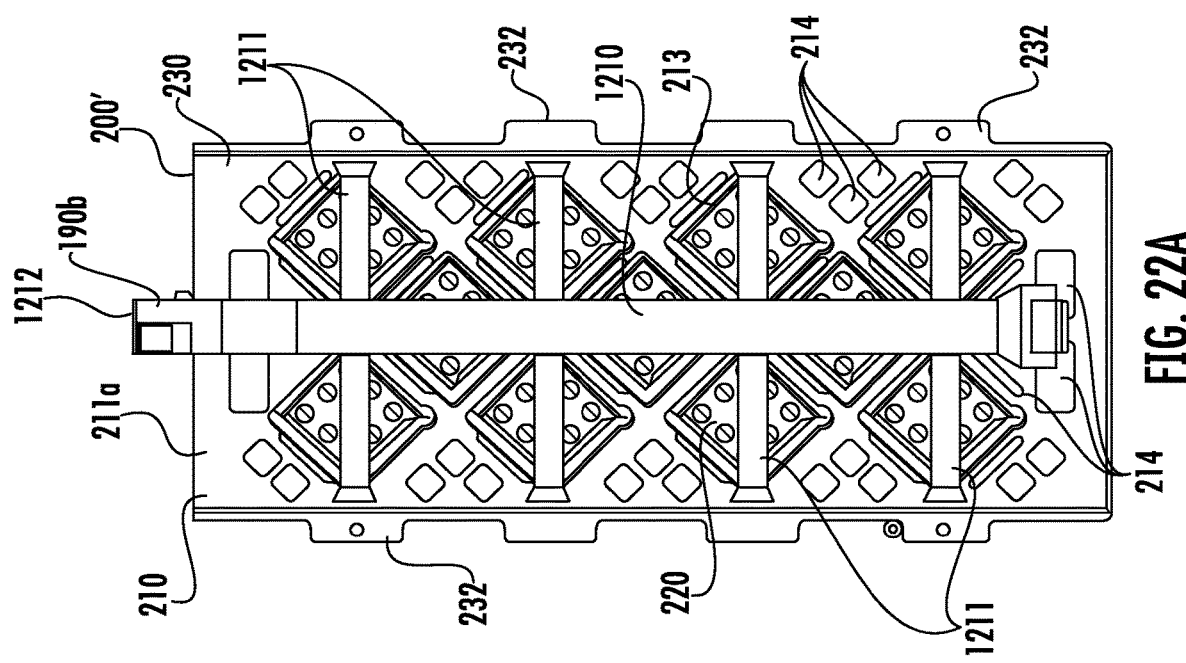

It is generally preferred to construct the radiant tray 200 in such a manner that the ceramic or refractory tile 220 inserts that retain heat are generally disposed immediately above the stem 1210 and side branches 1211 of the underlying gas burner module 190a, 190b, 190c. This provides for more rapid heating of these tiles 220 as well as faster cleaning when they are inverted to facilitate the rapid pyrolysis of food dripping. FIGS. 22A & 22B illustrate bottom views of radiant trays 200 positioned over gas burner modules 190 according to various embodiments. Stems 1210 are disposed below the tiles 220 that run up the middle of the radiant trays 200, while the side branches 1211 run lateral across and under the tiles 220 that run in the cross wise direction. The vent ports 214 in the tray 200 are disposed over the gaps between the side branches 1211. The above arrangement allows for a margin of offsetting of the corresponding burner manifolds 190a, 190b, 190c and trays 200 from center, for example, as shown in FIG. 22B. As can be seen, the trellis configuration of the burner manifolds 190a, 190b, 190c and the tile 220 and vent port 214 configuration of the trays 200 complement to accommodate additional lateral offsetting in either right or left directions. For example, even when stem 1210 is positioned below outer longitudinal tile rows gas ports 1213 (see FIG. 19) and branches 1211 are protected from falling food by flanges 232. Thus, branches 1211 may be spaced apart at distances corresponding to the lateral tile rows across the tray 200. In the illustrated embodiment, the branches 1211 are spaced apart at lengths corresponding to the largest areas occupied by tiles 220 across the width of the trays 200. Flanges 232 may also be positioned along sides at positions corresponding to the distances between branches 1211, lateral tile rows, largest areas occupied by tiles 220 across the width of the trays 200, or combination thereof.

Similarly, having a single food support grate 140a, and upper rim disposed support member associated therewith, disposed to provide corresponding lateral overlap with the upward facing IR burner 180a, also provides an opportunity to use the higher heat of the upward facing IR burner 180a to clean each of the equal sized food support regions as needed, by inverting the dirty side to face the IR burner 180a.

It should be appreciated that an upward facing IR burner 180a is usually covered by a mesh, screen or perforated plate to preclude larger pieces of food or carbonaceous residue from falling on the perforated ceramic elements that acts as miniature gas outlets. Smaller pieces of residue that fall through such mesh or holes are rapidly evaporated by the higher heat of the IR burner surface.

IR burners for gas grills are generally disclosed in further detail in U.S. Pat. No. 4,886,044 (Best, 12 Dec. 1989), U.S. Pat. No. 3,547,097 (Lester, 15 Dec. 1970) and U.S. Pat. No. 6,114,666 (Best, 2 Sep. 2000), all of which are hereby incorporated herein by reference.

The modular construction of the gas burner assembly 190, food support grate 140a, and radiant tray 200 (if deployed) having the same lateral dimensions also facilitates the manufacture of grills and custom grills that deploy common components in which the grills firebox 130 need only be widened or narrower to accommodate more or less of the respective modules.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims. Similarly, it is contemplated that the various features may be suitably modified for beneficial applications to current and future grill designs according to the teachings herein. For example, it is to be understood that the herein disclosed radiant trays and components thereof may be adapted for use with various grill styles. New or existing grills may similarly be adapted for use with the herein described radiant trays and components thereof. Thus, it is to be understood that the illustrated embodiments present but one non-limiting example of the various features and combinations of such various features that may be employed consistent with the present disclosure.

What is claimed is:

1. A radiant tray system for positioning between a burner and a grate of a cooking device, the system comprising:
   a plurality of ceramic tiles each having a first end and a second end;
   a housing including a generally planar first wall and a generally planar second wall and configured to house the tiles therebetween;
   a plurality of tile slots extending through each of the first wall and the second wall, each tile slot through the first wall corresponding to a tile slot through the second wall, wherein each pair of corresponding tile slots is configured to cooperatively grasp a tile and thereby stably position the tile such that at least a portion of the first end of the tile is exposed through the tile slot through the first wall and at least a portion of the second end of the tile is exposed through the corresponding tile slot through the second wall; and
   a plurality of vent ports extending through each of the first wall and the second wall, wherein the housing is symmetrical with respect to a common reference plane disposed between the first wall and the second wall to support selectively invertable use of the housing.

2. The system of claim 1, wherein the housing comprises a first platen comprising the first wall and a second platen comprising the second wall, wherein the first platen and the second platen are attachable along flanges to engage the tiles and form the housing, and wherein the first wall and second wall are spaced apart to define a cavity therebetween through which combustion gases may flow to heat portions of the tiles positioned in the cavity.

3. The system of claim 1, wherein the tile slots in the first wall are offset from the corresponding tile slots in the second wall to position a primary axis of the tiles at oblique angles relative to the central plane of the housing when stably positioned therethrough.

4. The system of claim 1, wherein, when the housing is inverted, the tile slots through the first wall position at same relative locations as the tile slots through the second wall prior to inversion and the tile slots through the second wall position at same relative locations as the tile slots through the first wall prior to inversion.

5. The system of claim 4, wherein each of the first wall and the second wall has lateral and longitudinal reflectional symmetry with respect to position of the tile slots.

6. The system of claim 1, wherein the portion of the first end exposed through the tile slot through the first wall and the portion of the first end exposed through the tile slot through the second end protrude outward of the corresponding tile slots beyond the first and second walls when grasped by the corresponding tile slots.

7. The system of claim 6, wherein the tiles have a generally planar body.

8. The system of claim 7, wherein the first and second ends of the tiles are generally planar, and wherein, when grasped by the corresponding tile slots, the first and second generally planar ends of the tiles position generally parallel to the first wall and second wall.

9. The system of claim 8, wherein each of the first and second ends of the tiles includes a recessed ledge extending around a perimeter to engage respective edges of the corresponding tile slots.

10. The system of claim 9, wherein a chamfer extends around an outer perimeter of each of the recessed ledges.

11. The system of claim 8, wherein a plurality of arcuate convex dimples are disposed along the exposed portion of at least one of the first end or the second end.

12. The system of claim 11, wherein corresponding tile slots are aligned.

13. The system of claim 12, wherein, when stably positioned in the corresponding tile slots in the first and second walls, a first portion of the first end and a second portion of the second end of each tile are exposed through a respective tile slot in the first wall and a second portion of the first end and a second portion of the second end of each title are exposed through the respective corresponding tile slot in the second wall.

14. The system of claim 7, wherein, when grasped by corresponding tile slots, a central axis of each tile positions at an oblique angle with respect to the common reference plane, wherein a second portion of the first end of the tile is exposed through and protrudes outward from the tile slot through the second wall, and wherein a second portion of the second end of the tile is exposed through and protrudes outward of the tile slot through the first wall.

15. The system of claim 14, wherein the housing comprises a first platen including the first wall and a second platen comprising the second wall, wherein the first platen and the second platen are configured to be attached along flanges to engage the tiles therebetween, and wherein the housing includes spacing rods positioned between the first and second platens to maintain a cavity therebetween through which combustion gases may flow to heat portions of tiles positioned in the cavity.

16. The system of claim 14, wherein a first lateral ridge is disposed along a surface of the first end of the tiles and a second lateral ridge is disposed along a surface of the second end of the tiles, wherein a face of the first lateral ridge extends from the respective surface at an oblique angle and faces a first direction and a face of the second lateral ridge extends from the respective surface at an oblique angle and faces a second direction, opposite the first, and wherein the faces of the first and second lateral ridges extend along parallel planes.

17. The system of claim 16, wherein a second face of the first lateral ridge is positioned to engage an edge of the tile slot through the first wall and a second face of the second lateral ridge is positioned to engage an edge of the tile slot through the second wall to position the tile at the oblique angle in a second orientation.

18. The system of claim 17, wherein the tiles define round cross-sections.

\* \* \* \* \*